(12) United States Patent
Anderson et al.

(10) Patent No.: US 12,292,542 B2
(45) Date of Patent: May 6, 2025

(54) ESTIMATING MAGNETIC FIELD USING A NETWORK OF SATELLITES

(71) Applicant: THE JOHNS HOPKINS UNIVERSITY, Baltimore, MD (US)

(72) Inventors: Brian Anderson, Mt. Airy, MD (US); Regupathi Angappan, Baltimore, MD (US); Robin Barnes, Elkridge, MD (US); Sabine Stanley, Finksburg, MD (US); Sarah Vines, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 152 days.

(21) Appl. No.: 18/023,911

(22) PCT Filed: Sep. 2, 2021

(86) PCT No.: PCT/US2021/048833
§ 371 (c)(1),
(2) Date: Feb. 28, 2023

(87) PCT Pub. No.: WO2022/051471
PCT Pub. Date: Mar. 10, 2022

(65) Prior Publication Data
US 2024/0012171 A1    Jan. 11, 2024

Related U.S. Application Data

(60) Provisional application No. 63/073,834, filed on Feb. 28, 2023.

(51) Int. Cl.
*G01V 3/40* (2006.01)
*B64G 1/32* (2006.01)
(Continued)

(52) U.S. Cl.
CPC .............. *G01V 3/40* (2013.01); *B64G 1/32* (2013.01); *G01V 3/36* (2013.01); *G01V 3/38* (2013.01)

(58) Field of Classification Search
CPC ... G01V 3/40; G01V 3/36; G01V 3/38; B64G 1/32
See application file for complete search history.

(56) References Cited

U.S. PATENT DOCUMENTS

| 2011/0297794 | A1 | 12/2011 | Johnson |
| 2013/0221951 | A1* | 8/2013 | Anderson ............ G01R 33/007 324/207.11 |
| 2018/0231686 | A1 | 8/2018 | Basu et al. |

FOREIGN PATENT DOCUMENTS

RU    2436134 C1    12/2011

OTHER PUBLICATIONS

Kadymov, A. (Authorized officer), International Search Report and Written Opinion issued in corresponding International Application No. PCT/US2021/048833 mailed on Nov. 18, 2021, 8 pages.
(Continued)

*Primary Examiner* — Amy He
(74) *Attorney, Agent, or Firm* — MH2 Technology Law Group LLP

(57) ABSTRACT

A computer-implemented method includes: receipt and accession of magnetic field data from a constellation of satellites providing global coverage over the Earth in a time span less than one day; inter-calibrating the magnetic field data from all satellites to a common standard; quantifying the global magnetic disturbance and selecting quiescent intervals at least as short as one day for evaluation of Earth's internally-generated field; calculating global maps of the mean vector magnetic field for each quiet interval from the average of all satellite measurements in angular bins; converting the time sequence of global maps of the mean fields
(Continued)

to time series of angular harmonic coefficients via direct convolution; applying spectral and regression analysis to the harmonic coefficient time series to identify and remove artifacts in the signals; reconstructing a continuous time and spatial representation of the magnetic field continuous in time and angular position globally.

17 Claims, 39 Drawing Sheets

(51) Int. Cl.
G01V 3/36 (2006.01)
G01V 3/38 (2006.01)

(56) References Cited

OTHER PUBLICATIONS

Filei, A.A. et al., "Radiometric cross-calibration of shortwave channels of Multi-Channel Scanning Unit on board Meteor-M No. 2 relative to spectroradiometer AVHRR on board Metop-A", Modern problems of remote sensing of the Earth from space, RU, (Nov. 30, 2015), vol. 13, No. 6, doi:10.21046/2070-7401-2016-13-6-251-263, ISSN 2070-7401, pp. 251-263, XP009535923 [Y] 1-2, 5-10, 13-16.
Lukyanova R. Yu, "Study of the Earth's magnetic field using low-orbit satellites school-seminar "Satellite methods and systems for Earth exploration"", School-seminar "Satellite Methods and Systems of Earth Exploration"; Tarusa, Russland; Apr. 3-7, 2017, Russia, Russia, (Apr. 3, 2017), vol. 13, No. 6, pp. 1-34, XP009535823 [Y] 5, 13.
Wittmann-Regis, A. (Authorized officer), International Preliminary Report on Patentability issued in corresponding International Application No. PCT/US2021/048833 mailed on Mar. 16, 2023, 6 pages.
Acuna, Mario H. "Space-based magnetometers." Review of scientific instruments 73.11 (2002): 3717-3736.
Alken, Patrick et al. "Co-estimation of geomagnetic field and in-orbit fluxgate magnetometer calibration parameters." Earth, Planets and Space 72 (2020): 1-32.
Alken, Patrick et al. "International geomagnetic reference field: the thirteenth generation." Earth, Planets and Space 73.1 (2021): 1-25.
Anderson, Brian J. et al. "Sensing global Birkeland currents with Iridium® engineering magnetometer data." Geophysical Research Letters 27.24 (2000): 4045-4048.
Anderson, Brian J. et al. "Statistical Birkeland current distributions from magnetic field observations by the Iridium constellation." Annales Geophysicae. vol. 26. No. 3. Göttingen, Germany: Copernicus Publications, 2008.
Anderson, Brian J. et al. "Development of large-scale Birkeland currents determined from the Active Magnetosphere and Planetary Electrodynamics Response Experiment." Geophysical Research Letters 41.9 (2014): 3017-3025.
Anderson, Brian J. et al. "Temporal and spatial development of global Birkeland currents." Journal of Geophysical Research: Space Physics 123.6 (2018): 4785-4808.
Aubert, Julien et al. "Geomagnetic jerks and rapid hydromagnetic waves focusing at Earth's core surface." Nature Geoscience 12.5 (2019): 393-398.
Aubert, Julien et al. "Observations and models of the long-term evolution of Earth's magnetic field." Space Science Reviews 155 (2010): 337-370.
Baumjohann, Wolfgang et al. "Magnetospheric contributions to the terrestrial magnetic field." Geomagnetism 5 (2007): 77-92.
Brown, W. J. et al. "Jerks abound: An analysis of geomagnetic observatory data from 1957 to 2008." Physics of the Earth and Planetary Interiors 223 (2013): 62-76.
Buffet, Bruce et al. "Evidence for MAC waves at the top of Earth's core and implications for variations in length of day." Geophysical Journal International 204.3 (2016): 1789-1800.
Chulliat, Arnaud et al. "The US/UK world magnetic model for 2020-2025: Technical report." (2020).
Civet, Francois et al. "Electrical conductivity of the Earth's mantle from the first Swarm magnetic field measurements." Geophysical Research Letters 42.9 (2015): 3338-3346.
Clausen, L. B. N. et al. "Dynamics of the region 1 Birkeland current oval derived from the Active Magnetosphere and Planetary Electrodynamics Response Experiment (AMPERE)." Journal of Geophysical Research: Space Physics 117. A6 (2012).
Coxon, John C et al. "A review of Birkeland current research using AMPERE." Electric currents in geospace and beyond (2018): 257-278.
Finlay, C. C. et al. "Short timescale core dynamics: theory and observations." Space science reviews 155 (2010): 177-218.
Finlay, C. C. et al. "International geomagnetic reference field: the eleventh generation." Geophysical Journal International 183.3 (2010): 1216-1230.
Finlay, C. C. et al. "Recent geomagnetic secular variation from Swarm and ground observatories as estimated in the CHAOS-6 geomagnetic field model." Earth, Planets and Space 68 (2016): 1-18.
Finlay, C. C. et al. "The CHAOS-7 geomagnetic field model and observed changes in the South Atlantic Anomaly." Earth, Planets and Space 72.1 (2020): 1-31.
Hori, K. et al. "Slow magnetic Rossby waves in the Earth's core." Geophysical Research Letters 42.16 (2015): 6622-6629.
Hulot, Gauthier et al. "The magnetic field of planet Earth." Space science reviews 152 (2010): 159-222.
Knipp, D. J. et al. "Comparison of magnetic perturbation data from LEO satellite constellations: Statistics of DMSP and AMPERE." Space Weather 12.1 (2014): 2-23.
Langel, Robert et al. "The MAGSAT mission." Geophysical Research Letters 9.4 (1982): 243-245.
Langlais, Benoit et al. "Crustal magnetic fields of terrestrial planets." Space Science Reviews 152 (2010): 223-249.
Luhr, Hermann et al. "Average characteristics of low-latitude interhemispheric and F region dynamo currents deduced from the swarm satellite constellation." Journal of Geophysical Research: Space Physics 124.12 (2019): 10631-10644.
Lyatskaya, Sonya et al. "Interhemispheric field-aligned currents: Simulation results." Journal of Geophysical Research: Space Physics 119.7 (2014): 5600-5612.
Mandea, Mioara et al. "Geomagnetic jerks: rapid core field variations and core dynamics." Space science reviews 155 (2010): 147-175.
Mandea, Mioara et al. "A new approach to directly determine the secular variation from magnetic satellite observations." Geophysical research letters 33.15 (2006).
Milan, Stephen Eric et al. "Overview of solar wind-magnetosphere-ionosphere-atmosphere coupling and the generation of magnetospheric currents." Space Science Reviews 206 (2017): 547-573.
Olsen, Nils et al. "Investigation of a secular variation impulse using satellite data: The 2003 geomagnetic jerk." Earth and Planetary Science Letters 255.1-2 (2007): 94-105.
Olsen, Nils et al. "LCS-1: a high-resolution global model of the lithospheric magnetic field derived from CHAMP and Swarm satellite observations." Geophysical Journal International 211.3 (2017): 1461-1477.
Olsen, Nils et al. "Measuring the Earth's magnetic field from space: concepts of past, present and future missions." Space science reviews 155 (2010): 65-93.
Olsen, Nils et al. "The Swarm satellite constellation application and research facility (SCARF) and Swarm data products." Earth, Planets and Space 65 (2013): 1189-1200.
Olsen, Nils et al. "A model of Earth's magnetic field derived from 2 years of Swarm satellite constellation data." Earth, Planets and Space 68.1 (2016): 124.
Olsen, Nils et al. "Magnetic signatures of ionospheric and magnetospheric current systems during geomagnetic quiet conditions—An overview." Space Science Reviews 206 (2017): 5-25.

(56) References Cited

OTHER PUBLICATIONS

Plaschke, Ferdinand et al. "Advanced calibration of magnetometers on spin-stabilized spacecraft based on parameter decoupling." Geoscientific Instrumentation, Methods and Data Systems 8.1 (2019): 63-76.

Raeder, J. et al. "Using OpenGGCM to compute and separate magnetosphere magnetic perturbations measured on board low earth orbiting satellites." Space Science Reviews 206 (2017): 601-620.

Roberts, Paul H. et al. "On the genesis of the Earth's magnetism." Reports on Progress in Physics 76.9 (2013): 096801.

Sabaka, Terence J. et al. "A comprehensive model of Earth's magnetic field determined from 4 years of Swarm satellite observations." Earth, Planets and Space 70.1 (2018): 1-26.

Waters, C. L. et al. "Estimation of global field aligned currents using the Iridium® system magnetometer data." Geophysical Research Letters 28.11 (2001): 2165-2168.

Waters, C. L. et al. "Science data products for AMPERE." Ionospheric multi-spacecraft analysis tools: Approaches for deriving ionospheric parameters (2020): 141-165.

Witze, Alexandra. "Earth's magnetic field is acting up and geologists don't know why." Nature 565.7738 (2019): 143-145.

Yamazaki, Yosuke et al. "Sq and EEJ—A review on the daily variation of the geomagnetic field caused by ionospheric dynamo currents." Space Science Reviews 206.1-4 (2017): 299-405.

Bloxham, Jeremy et al. "The origin of geomagnetic jerks." Nature 420.6911 (2002): 65-68.

Filey, A. A. et al. "Radiometric intercalibration of short-wave channels of multi-channel satellite device (onboard Meteor-M N я2) using AVHRR measurements" ISARD (2016): 25-26, English translation attached.

Iijima, Takesi et al. "The amplitude distribution of field-aligned currents at northern high latitudes observed by Triad." Journal of Geophysical Research 81.13 (1976): 2165-2174.

Mandea, Mioara et al. "The varying core magnetic field from a space weather perspective." Space Science Reviews 214 (2018): 1-20.

\* cited by examiner

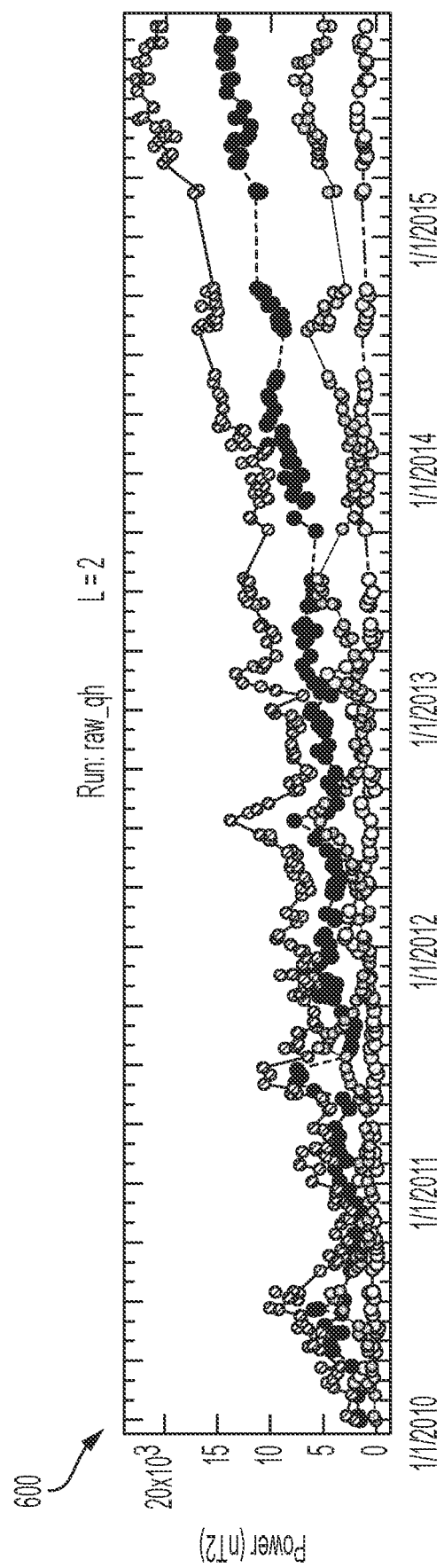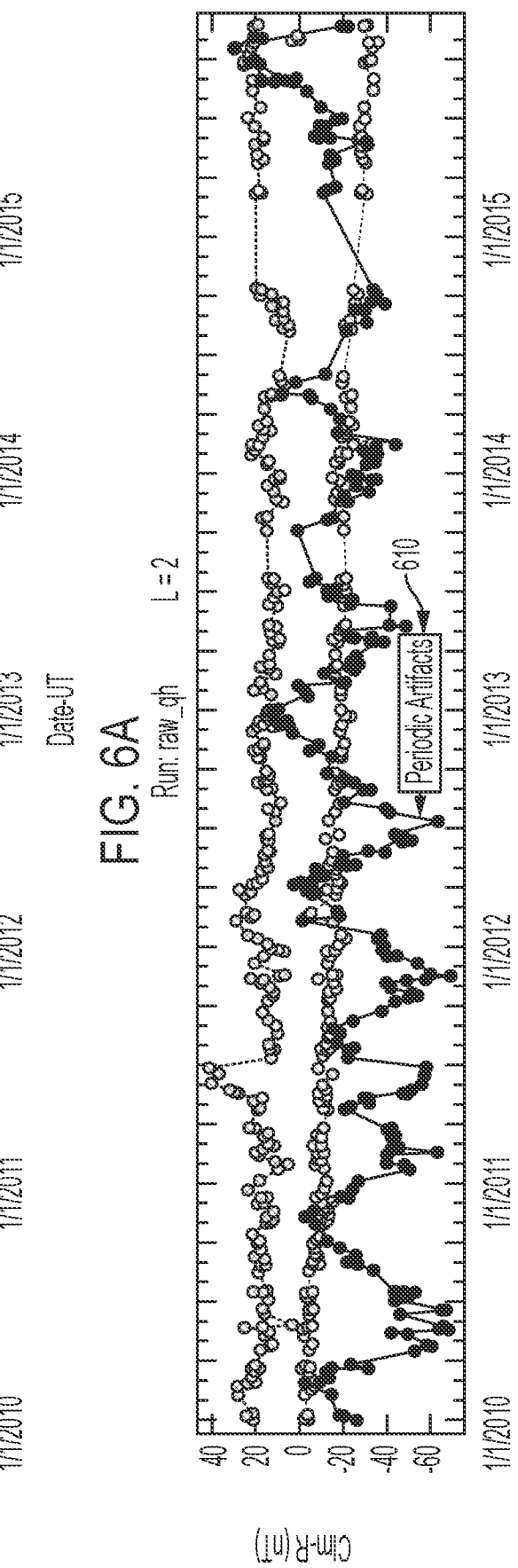
FIG. 6A
FIG. 6B

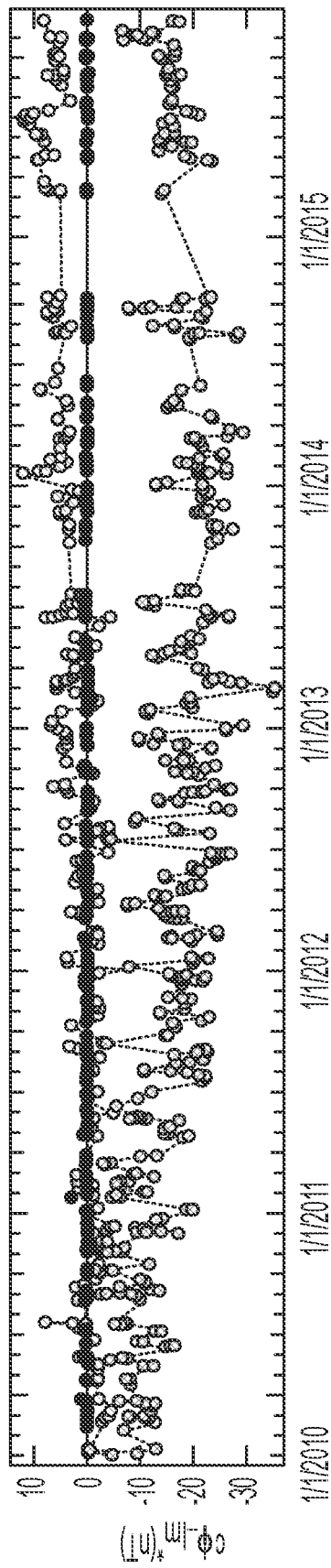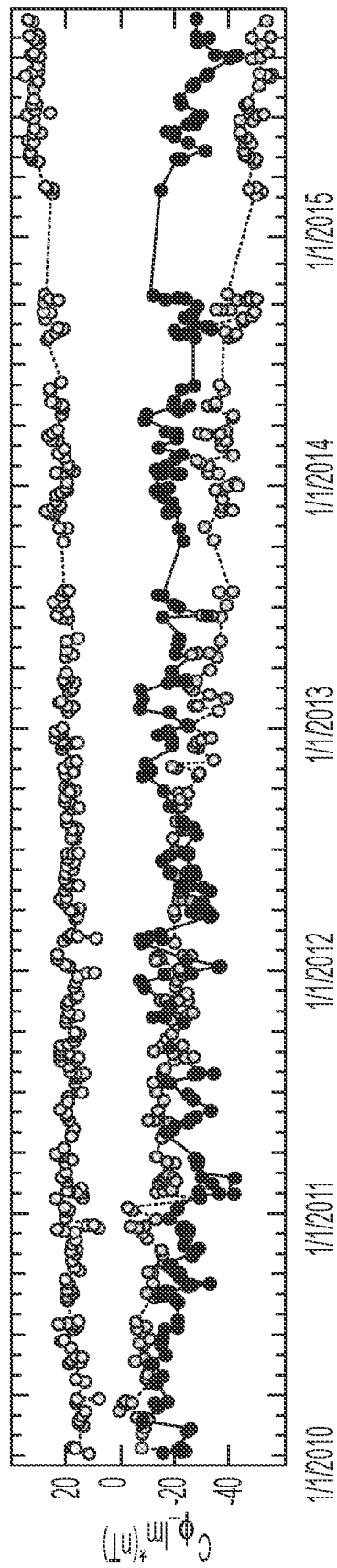
FIG. 24E
FIG. 24F

ESTIMATING MAGNETIC FIELD USING A NETWORK OF SATELLITES

CROSS-REFERENCE TO RELATED APPLICATIONS

This application is the national stage entry of International Patent Application No. PCT/US2021/048833, filed on Sep. 2, 2021, and published as WO 2022/051471 A1 on Mar. 10, 2022, which claims the benefit of U.S. Provisional Patent Application No. 63/073,834, filed on Sep. 2, 2020, both of which are hereby incorporated by reference herein in their entireties.

BACKGROUND

The shape of Earth's magnetic field may be used for a variety of applications, such as navigation, resource exploration, space hazard predictions. As another example application, changes in the magnetic field may indicate the motions of molten iron deep inside Earth's interior, in the outer core. Precise estimates of the magnetic field have to date involved surface measurements together with satellite observations made along one or two orbital planes. Because of orbital precession, the orbits may take several months (e.g., typically four to six months) to span all local times to separate signals of Earth's field from those due to currents external to the Earth.

Near-Earth space satellites may be deployed for a variety of applications and purposes (e.g., providing telecommunications services). For example, the 66 Iridium Communications satellites have operated continuously since 1997 and have recently been replaced with the Iridium NEXT constellation planned to continue operations to 2030 or beyond. Each original (herein, Block 1) and NEXT Iridium satellite is equipped as part of the satellite systems with a magnetometer capable of measuring the magnetic field of Earth and its environment.

SUMMARY

In one aspect, a computer-implemented method includes receiving, by a computing device, magnetometer measurements from a plurality of globally distributed satellites. The magnetometer measurements are received, stored, analyzed and used to produce a map/model of the measured magnetic field. The values recorded are those relative to a pre-defined model stored as a sequence of computer instructions and parameters. Contemporaneous magnetometer measurements from all the satellites distributed globally allows mapping of the magnetic field from measurements acquired over the entire globe. One end result of using a plurality of globally distributed satellites is the capacity to generate a magnetic field model based on magnetic field measurements for Earth corresponding to a time span of less than one day.

In a second aspect, the globally distributed magnetic field measurements, spanning all latitudes between at least 85° S to 85°N and all longitudes with spacings not greater than 45° in longitude at the equator, are used in a computer algorithm to determine the intensity and distribution of electric currents known as Birkeland currents flowing along magnetic lines of force between Earth's ionosphere and space. Data on these currents are used by instructions in a computing device to select only those data intervals of 24-hours duration, which exhibit the lowest levels of the Birkeland currents. The plurality of satellite measurements allow global coverage over the full range of local times relative to noon and spanning all geographic longitudes in a time span as short as one 24-hour period. A computer program selects only the quiet intervals for computation of a global magnetic model ensuring minimal errors due to magnetic fields arising from sources external to the Earth. The collection of data from each quiet 24-hour interval are stored in a computing device memory for subsequent access.

In a third aspect, the sequence of magnetic field data for quiet 24-hour intervals are used in a computing device to average the magnetic field relative to the pre-defined model in ranges of latitude and longitude commensurate with the output new model angular resolution. These averages are saved in a computer storage device as maps for each quiet 24-hour interval in the sequence of intervals. Each map is then read by a set of computer instructions executing on a computing device and the latitude-longitude map is converted to a set of coefficients to orthogonal basis angular functions separating the contributions of all possible latitudinal and longitudinal wavelengths longer than the ranges used for the averaging angle ranges. These coefficients are then converted by instructions on a computing device into time series of signals from each basis function to discriminate and remove spurious signals arising from imperfections in the plurality of satellite magnetic field measuring devices' performance, and used to construct a model stored as a set of coefficients and basis functions in instructions for a computing device to allow computation of the magnetic field at any location at the mean altitude of the input data from the plurality of satellites. The output of these computer instructions are then available to correct the model of Earth's magnetic field to which the analyses are referenced.

BRIEF DESCRIPTION OF THE DRAWINGS

FIG. 24A-FIG. 24G illustrate a time series of the filtered spherical harmonic coefficients $c_{lm}'(t_i)$ and $s_{lm}'(t_i)$ for/=2 after applying the notch and $c_{r,00}$ correlation corrections, in the same format as FIG. 22A-FIG. 22G.

DETAILED DESCRIPTION

Figure 1:
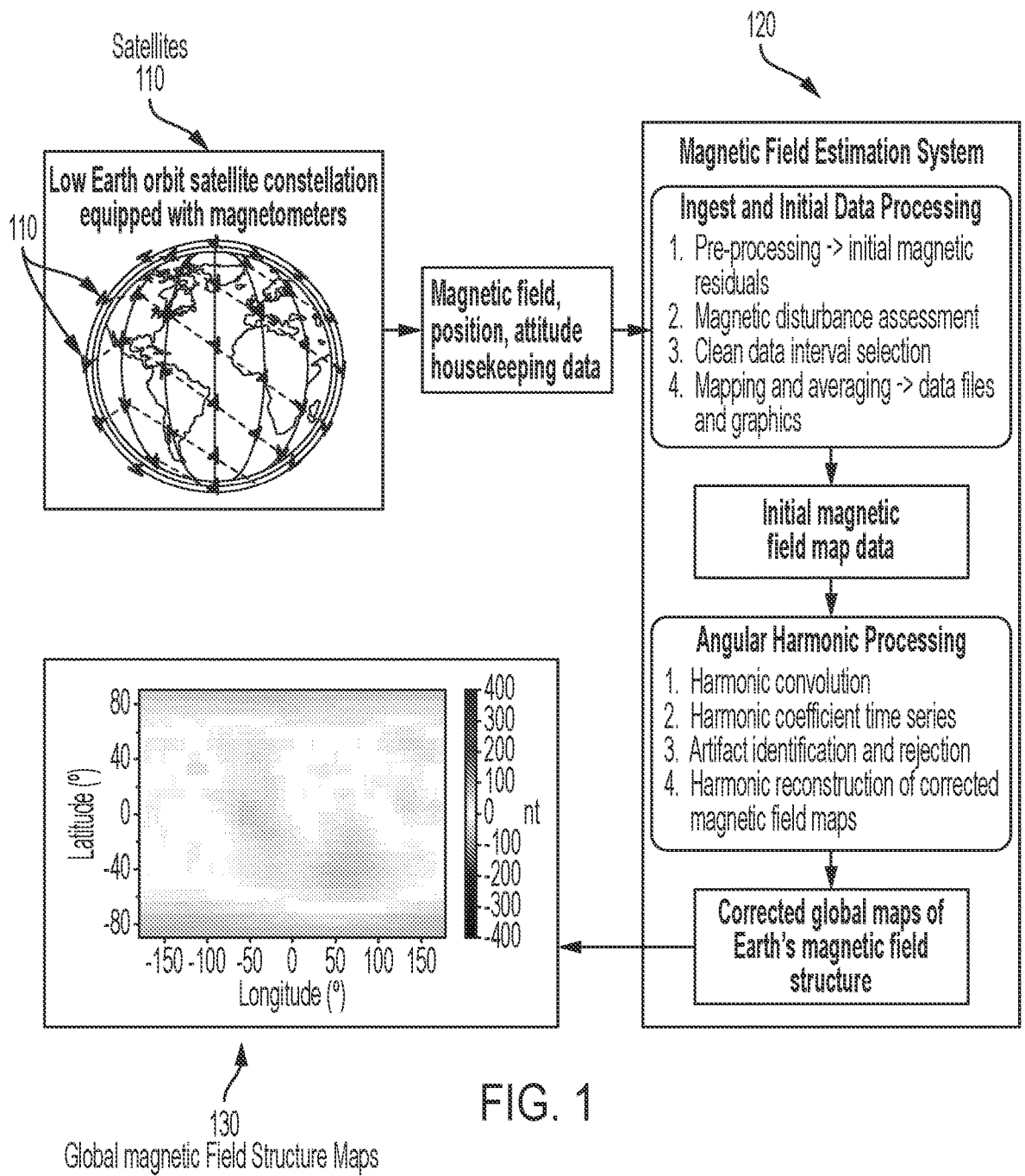
FIG. 1 illustrates a schematic representation of a plurality of satellites in Earth near-space orbit, in this instance of the Iridium Communications constellation.

Existing techniques for estimating the Earth's magnetic field require several months of observations to construct one estimate. For example, satellite observations for estimating the magnetic field are made along one or two orbital planes. Because of orbital precession, these satellite orbits may take several months (e.g., approximately six months) to span all local times. As such, global mapping is often challenging for time scales shorter than six months for all local times whilst being able to correct for seasonal signals and true changes in Earth's magnetic field. Accordingly, aspects of the present disclosure significantly reduce the amount of time needed to determine the detailed shape of the Earth's magnetic field globally, thereby improving the performance of systems and applications that use these estimates as input data. For example, aspects of the present disclosure may analyze and estimate the Earth's magnetic field using a network or constellation of existing satellites (e.g., pre-deployed satellites) that cover the entire globe. As existing satellites and hardware already in deployment may be used, the need to deploy additional hardware or incur costly satellite and/or other hardware deployment expenses could be avoided. The existing satellites may include satellites that were originally designed and deployed for other purposes unrelated to magnetic field estimation (e.g., for providing telecommunications services). As such, the systems and/or methods, described herein, include a novel and economical approach to reducing the amount of time needed to estimate the Earth's magnetic field at any point on the globe without the need for the deployment of additional satellites or instruments.

As described herein, aspects of the present disclosure may include: a system to inter-calibrate magnetometer data from multiple satellites of a satellite network/constellation, subtracting initial model estimates for the field to find residuals relative to an initial model, smooth and refine the residuals by grouping the samples into area (latitude and longitude) bins and taking averages within the bin, applying a convolution calculation to derive spherical harmonic coefficients representing all unique wavelength components in the residual maps, and further correcting the magnetic field model from the time series of the harmonic fit coefficients by filtering out artifacts and other contamination signals. In some embodiments, the magnetometer reading samples may be received from a network of existing satellites (e.g., Iridium Communications satellites, Iridium NEXT constellation satellites) although additional or other satellites with magnetometers may additionally be used. Also, while the systems and/or methods, described herein, may leverage a constellation or network of existing satellites and hardware, the systems and/or methods do not exclude the possibility of being implemented using satellites deployed at a future time.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an overview of an example implementation in accordance with aspects of the present disclosure. More specifically, FIG. 1 illustrates a constellation of satellites 110 that span the entire globe (e.g., the planet Earth). As described herein, the satellites 110 may be existing (e.g., pre-deployed) or deployed in the future, and may host any variety of functions that may be related or unrelated to the function of estimating the Earth's magnetic field. As shown in FIG. 1, the satellites 110 may be globally distributed in a manner that covers the entire globe and such that magnetometer readings from the satellites 110 globally and simultaneously provide magnetic field measurements of an area and capable of encompassing the Earth at all latitudes (e.g., between at least approximately 85° S to 85° N in a short time period), the minimum corresponding to the time required for the Earth to rotate through an angle corresponding to the largest longitude separation between orbit planes of the constellation. Thus, using the techniques described herein it is possible to estimate the Earth's magnetic field by using magnetometer readings from these globally distributed satellites 110 in a drastically shorter timeframe than previous techniques, as described in greater detail herein.

As one illustrative, non-limiting example of the manner in which the satellites 110 are distributed, the constellation of satellites 110 may include approximately 70 satellites in polar (e.g., approximately 86° inclination) orbit. The satellites 110 may be distributed over, for example, six orbit planes, with, for example, 11 satellites in each plane, spaced substantially evenly in longitude such that the entire constellation of satellites 110 provides dense global coverage. It is noted that other numbers or distributions of satellites may be used in practice, provided all and the systems and/or methods described herein are not limited to a particular configuration, quantity, or arrangement of the satellites 110 provided that all longitudes and the required latitude range is encompassed.

The satellites 110 may form a constellation or satellite network in which each satellite 110 may host any variety of functions (e.g., related or unrelated to magnetic field estimations, such as functions related to providing telecommunications services, GPS services, or the like). As described herein, the satellites 110 may be globally distributed in a manner that covers the entire globe and such that magnetometer readings from the satellites 110 may be used to estimate the shape of Earth's magnetic field. In some embodiments, each satellite 110 may include one or more magnetometers.

The magnetic field estimation system 120 may include one or more computing devices that may receive magnetometer readings from the satellites 110. The magnetic field estimation system 120 implements a registration process to register the satellites' locations and orientations at times of magnetometer samples. The magnetic field estimation system 120 may maintain a data structure identifying the registration information for each satellite. In some embodiments, the registration information for a satellite 110 may identify the type of satellite 110, hardware configuration of the satellite 110, the orbit of the satellite 110, and/or any other variety of information regarding the satellite 110.

As described herein, the magnetic field estimation system 120 may intercalibrate the satellites 110 (e.g., the satellites 110 registered to the magnetic field estimation system 120), to allow combination of the magnetometer reading samples from all of the satellites 110. The first processes in the magnetic field estimation system 120 is to remove/subtract a current state of the art reference magnetic field model (e.g. IGRF 2010 or World Magnetic Model, or similar models) at each location in order to identify magnetic field signals that are unaccounted for in current models referred to as residual magnetic field. Next, the magnetic field estimation system 120 may smooth and refine the unaccounted for magnetic field signal (residuals) model by grouping the samples into area bins and averaging all the data that fall into the same area bin. The estimation system 120 may then apply a spherical harmonic fit to the binned residual data to calculate amplitudes of unique functions used in constructing a magnetic field model/map 130, and further corrections to the magnetic field model is done by filtering out artifacts and other contaminates unique to the satellite system 110. In some embodiments, the satellites 110 and the magnetic field estimation system 120 may communicate via a network (e.g., any variety of suitable satellite communications networks).

Figure 2:
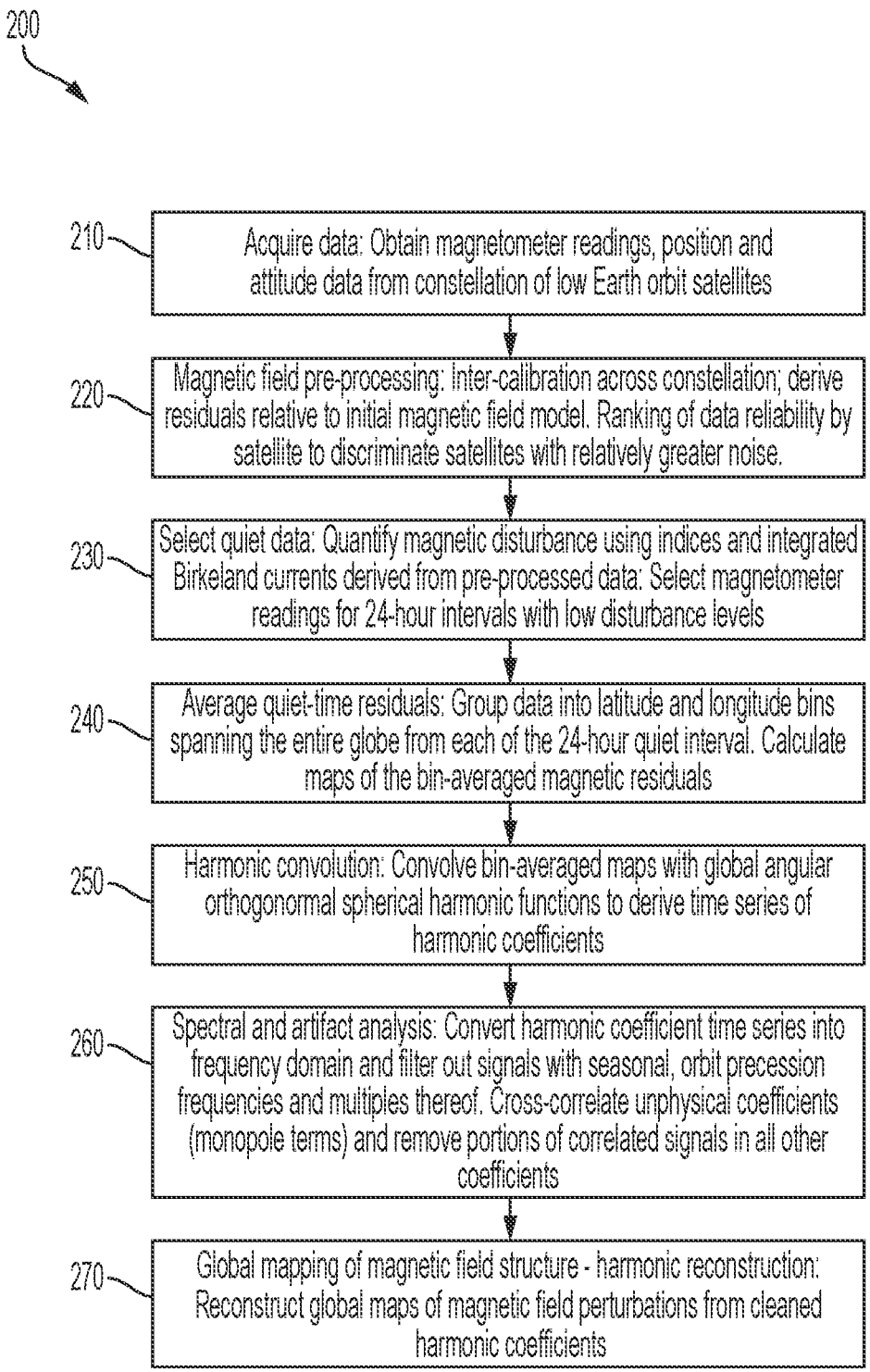
FIG. 2 illustrates an example flowchart of a process for estimating the Earth's magnetic field using a network of satellites as described herein.

FIG. 2 illustrates an example flowchart of a process for estimating the Earth's magnetic field using a network of satellites. The blocks of FIG. 2 may be implemented in the environment of FIG. 1 (e.g., by the magnetic field estimation system 120), for example, and are described using reference numbers of elements depicted in FIG. 1. As noted herein, the flowchart illustrates the architecture, functionality, and operation of possible implementations of systems, methods, and computer program products according to various embodiments of the present disclosure.

As shown in FIG. 2, the magnetic field estimation process 200 may begin with the acquisition of the satellite data together with the position and attitude information from the satellite constellation (block 210). For example, the magnetic field estimation system 120 may obtain satellite information (e.g., magnetometer readings, position and attitude data, etc.) from the satellites 110 (e.g., satellites 110 of low orbit, or within a threshold distance from the Earth).

The process 200 may further include magnetic field pre-processing (block 220). In some embodiments, the magnetic field pre-processing may include inter-calibrating across the satellite constellation (block 220), For example, the magnetic field estimation system 120 may inter-calibrate data between one or more satellites 110 in the constellation against a point of reference, such as the International Geomagnetic Reference Field (IGRF), IGRF2015, the World Magnetic Model, or other reference estimates of Earth's magnetic field, treated as an initial estimate and derives departures of the inter-calibrated constellation data from the initial magnetic field model. Inter-calibrating the satellites 110 may generally involve standardizing magnetometer readings across the satellites 110 against the initial magnetic field model. That is, the initial model may define the expected readings from each satellite 110, and a scaling factor may be determined to correct any deviations between the expected readings and actual readings.

In some embodiments, the magnetic field pre-processing may further include assessing the relative reliability of data from different satellites 110 in the constellation. This may use the variance of the residuals evaluated over a common time interval, which may be a day to ensure comparable sampling over the Earth from each satellite. To minimize the influence of signals in the polar regions due to geomagnetic activity, the data for these variance calculations may be restricted to latitudes within some range of the equator, for example, ±50° latitude. The variances for the plurality of satellites may be organized in rank order and a cutoff of variance above which data from a limited number, perhaps 10%, of the satellites would be discarded for further analysis. The threshold for discrimination may be identified by consideration of the cumulative distribution of the number of satellites with residual variances below a threshold variance as a function of the threshold variance.

Figure 3:
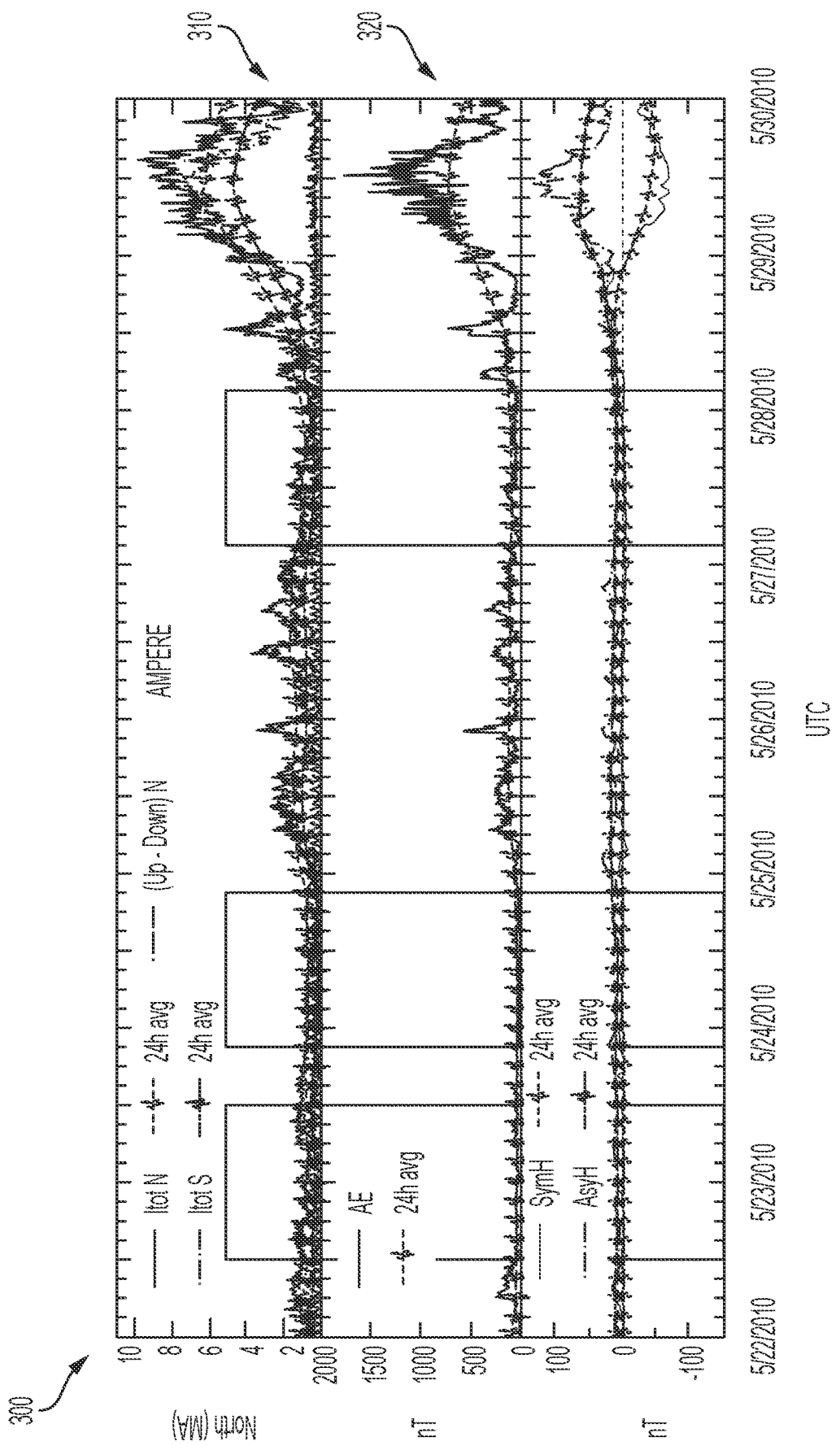
FIG. 3 illustrates metrics for geomagnetic disturbance and selection of quiet intervals, tan shading, appropriate for mapping the magnetic field generated by the Earth as free as possible from contributions from currents external to the Earth derived from signals from the satellite constellation described herein together with metrics derived from publicly available data acquired from fixed ground observatories.
Figure 4:
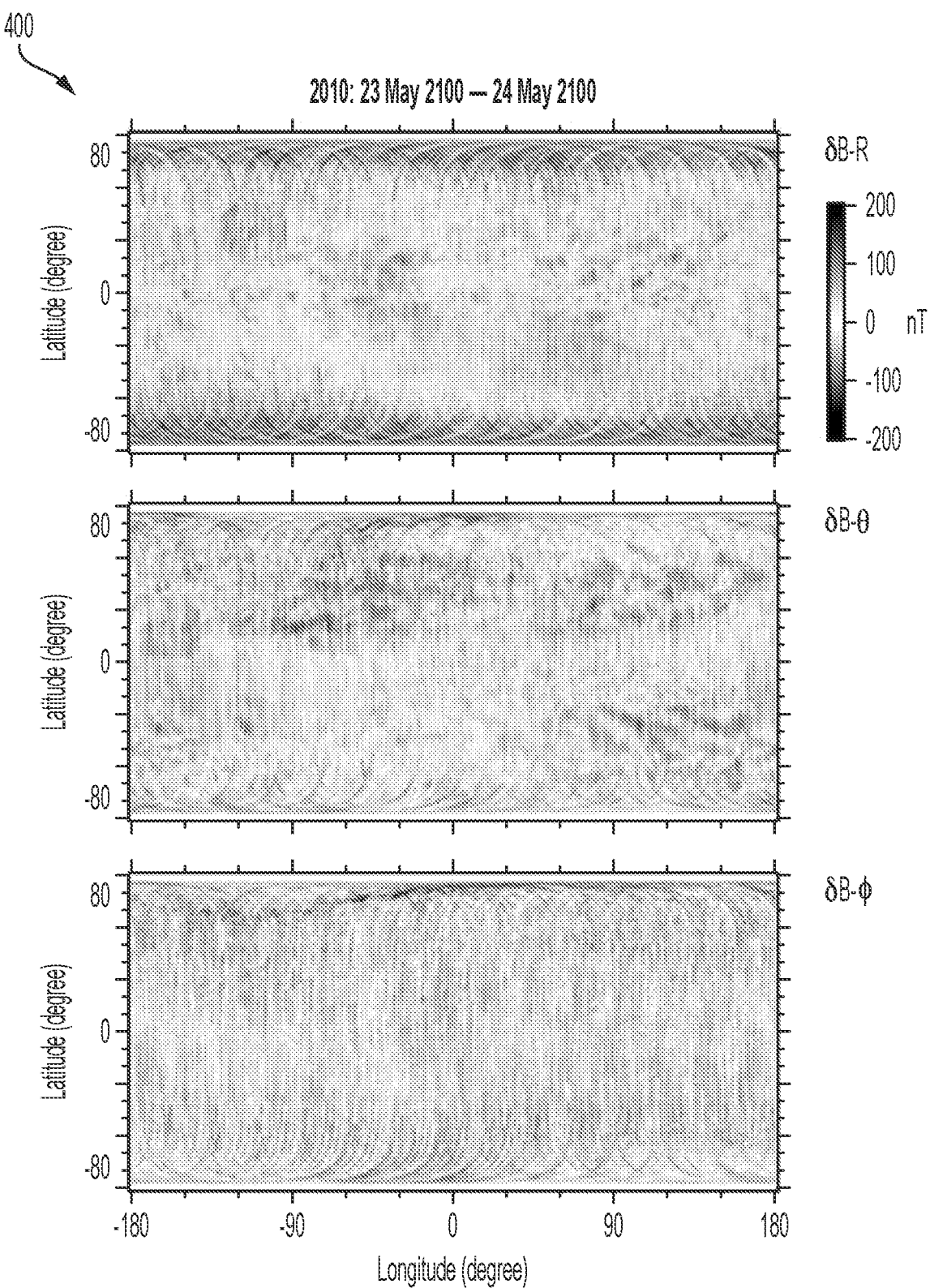
FIG. 4 illustrates coherent patterns in the differences of a reference magnetic field model of the Earth and the inter-calibrated observations from the constellation of satellite-borne magnetometers providing global coverage of measurements in one 24-hour interval of data. Top panel shows the radial direction of the field (positive outward, radial, 'r'), middle panel shows the north-south field direction (positive southward, theta, 'θ'), and bottom panel shows the east-west direction of the magnetic field (positive eastward, phi, 'φ').

The process 200 may further include selecting "quiet" data (block 230). For example, the derived departures from the initial magnetic field model from all satellites identified as having acceptable variances may be used to determine the level of magnetic disturbance as a function of time. Specifically, the derivation of Birkeland currents and their integration to derive a total current may be used to measure the magnetic disturbance level as illustrated in FIG. 3 (e.g., in graph 300) and the total Birkeland current in particular (shown in graph 310 in FIG. 3). Additional indices of geomagnetic disturbance may also be used (shown in graph 320 in FIG. 3). Intervals of time, for example, within 24 hours, may then be selected that are the most "quiet" conditions and magnetic field data may be selected from these "quiet" periods for subsequent processing. FIG. 4 (e.g., in graph 400) illustrates one example of the difference between an initial magnetic field model and the inter-calibrated data (hereinafter, residuals) for one 24-hour "quiet" interval (e.g., May 22, 2010 at 12:00 to May 23, 2010, at 12:00). In some embodiments, the magnetometer reading measurements may be obtained in any appropriate unit (e.g., nano-Tesla) and the magnitudes of the measurements (or residuals between the measured readings and baseline readings) may be represented on the graph by varying colors or shadings (400).

Returning to FIG. 2, the process 200 further may include averaging quite-time residuals. For example, the magnetic field estimation system 120 may average the quite-time residuals by grouping samples into angular bins over the globe (block 240). For example, the magnetic field estimation system 200 may group the magnetometer reading samples or residuals (obtained at block 220) into angular range bins in which each bin represents average readings from the quiet 24-hour hour time period (e.g., determined at block 230) and a particular latitude/longitude range (e.g., a 9-degree wide range) as illustrated for one quiet interval (e.g., as shown in graph 400 of FIG. 4).

Figure 5:
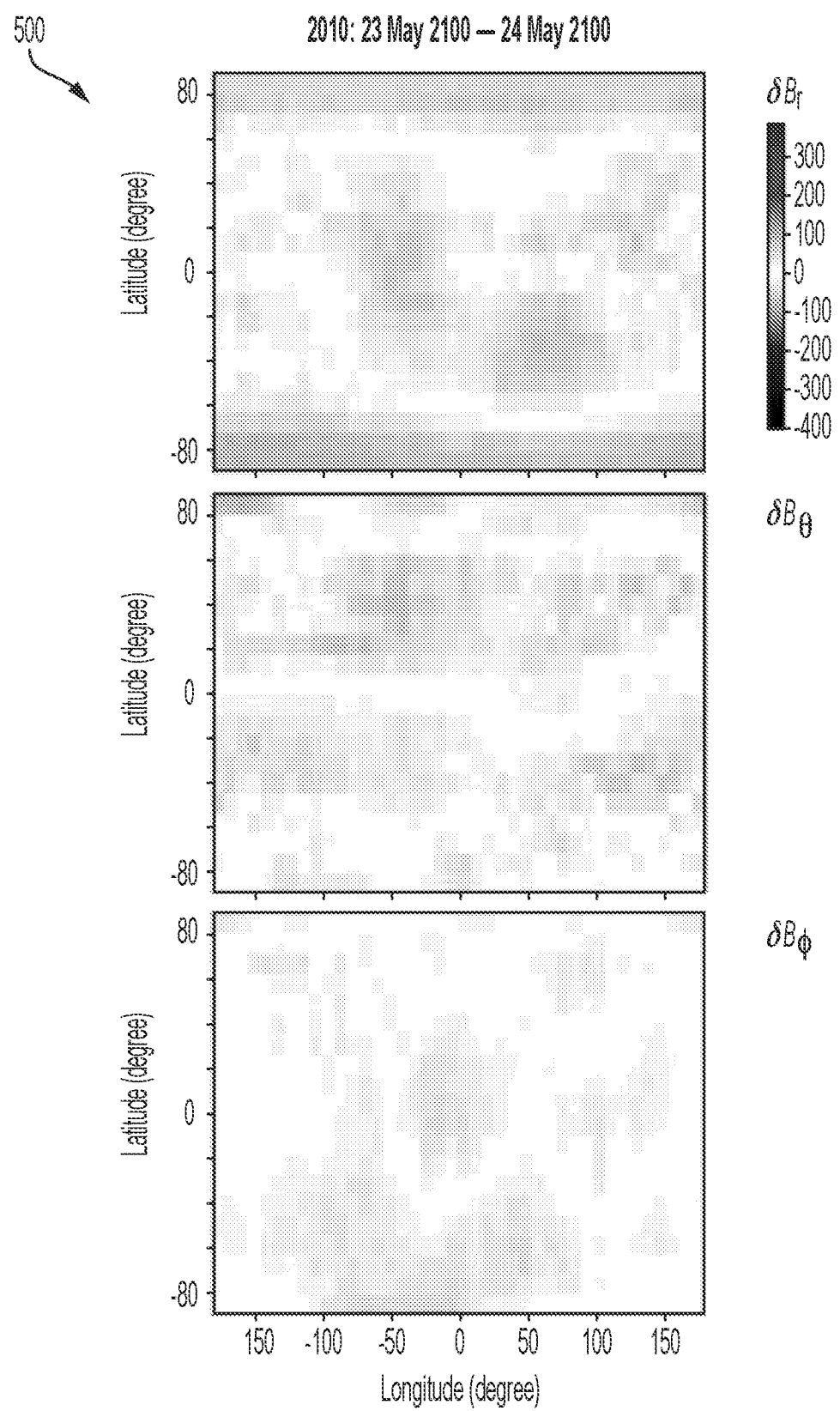
FIG. 5 illustrates derivation of binned averages spanning the entire globe using one 24-hour interval of data.
Figure 6C:
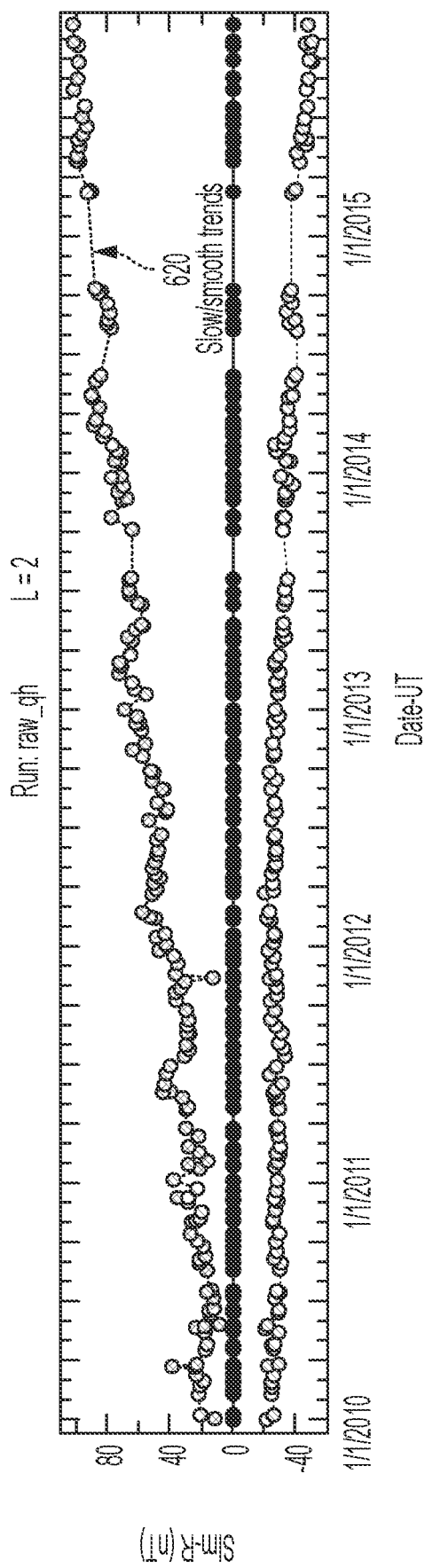
FIG. 6 illustrates spherical harmonic coefficients as time series derived using convolution integrals with the binned averages spanning the entire globe. Top panel (6A) shows the sum of the squares of the coefficients in the three field components (radial, R, southward, Th, eastward, Ph,) and the sum of the powers of all components (black). Panels 2 (6B) and 3 (6C) from top show the coefficients for the radial (R) component cosine and sine functions, respectively. Panels 4 (6D) and 5 (6E) from top show the coefficients for the southward (Th) component cosine and sine functions, respectively. Panels 6 (6F) and 7 (6G) from top (bottom two panels) show the coefficients for the eastward (Ph) component cosine and sine functions, respectively. In panels 2 through 7 from top the black dots show the l=2, m=0 coefficients, the maroon dots show the l=2, m=1 coefficients, and the light maroon dots show the l=2, m=2 coefficients.
Figure 6D:
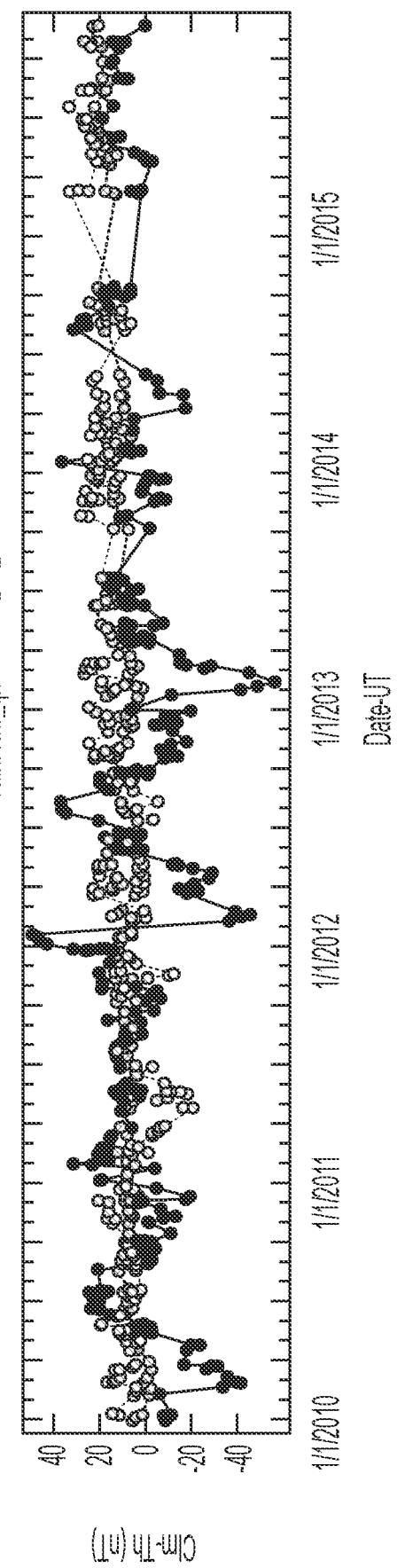
Figure 6E:
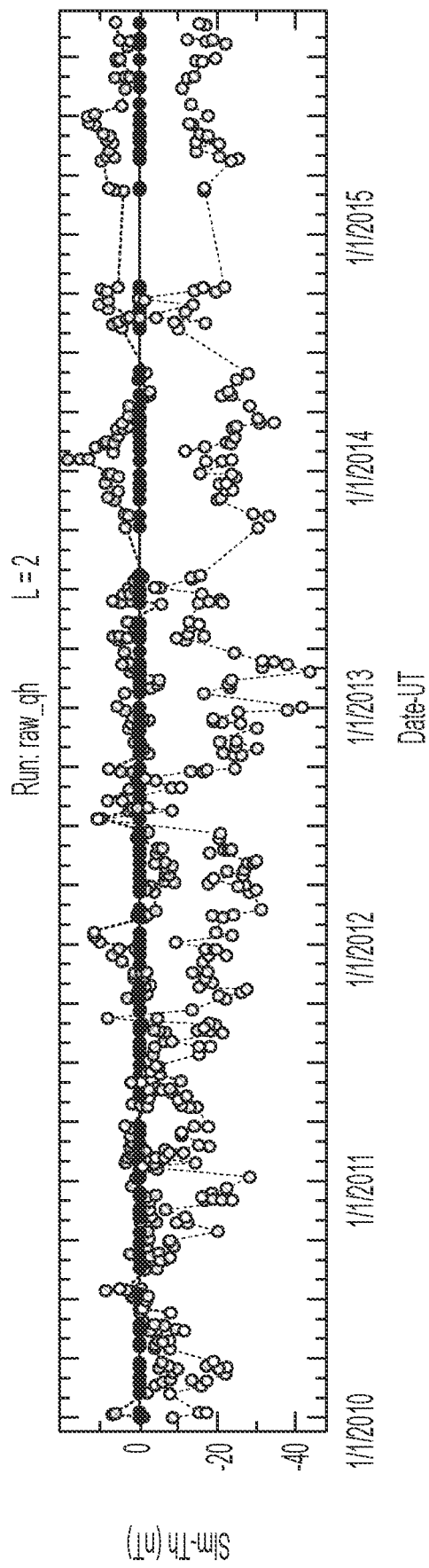
Figure 6F:
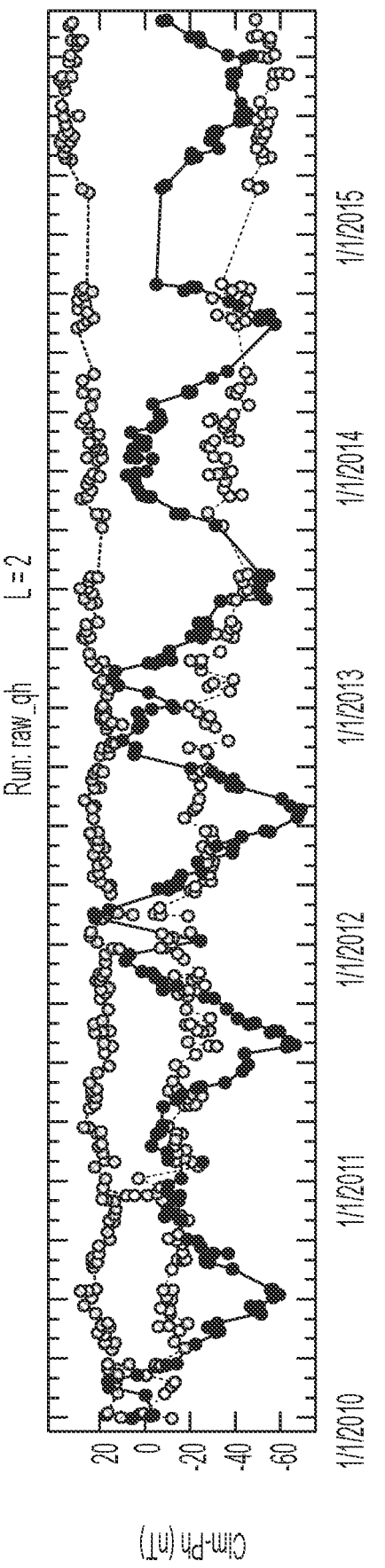
Figure 6G:
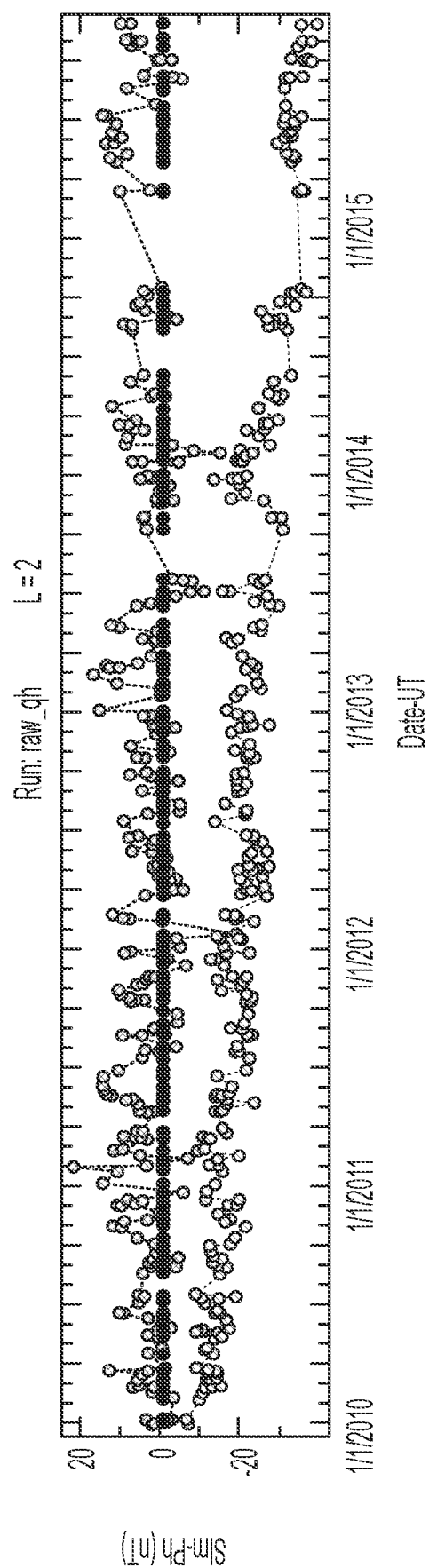

An example global map of the averaged residuals is shown in graph 400 in FIG. 4, after grouping the samples (or observations) into bins. As described herein, each "bin" may be represented a square or rectangle. In the example of FIG. 5, each bin is a square that is 9° wide by 9° long to encompass magnetometer readings within a 9-degree wide latitude/longitude range. The measurements of the readings in each bin may be averaged, either using a simple mean, a median, or a mean over a specified percentile range, and the averages represented by varying colors and shadings. In this way, the errors from outliers from the statistical uncertainty in individual magnetometer readings may be reduced, the variation in the readings relative to the average quantified, and the standard error in the mean determined. Additionally, or alternatively, area averaging may achieve a weighting of the data in subsequent analysis based on equal angular ranges rather than on the number of points so that the products are not skewed in significance to regions with denser sampling owing to the orbital geometry and the spatial density of the magnetic field samples.

Returning to FIG. 2, the process 200 may further include performing harmonic convolution (block 250). For example, the magnetic field estimation system 120 may perform harmonic convolution by converting a time series of the magnetic residuals data, displayed as maps into time series of angular harmonic components using a set of orthogonal basis functions. An example of such conversion is shown in FIG. 5. The global coverage of the observations (e.g., shown in graphs 400 and 500 in FIGS. 4 and 5) allow this to be accomplished by direct convolution of the bin-averaged data with each of the angular basis functions, for example, using standard spherical harmonic functions. The convolution may include integrating the product of the binned average data with a given spherical harmonic function. In some embodiments, the cosine and sine coefficients for $B_r$, $B_\theta$, and $B_\varphi$ are determined by integrating them with the spherical harmonic functions:

$$c_{r,lm}(t) = \int_0^\pi \int_0^{2\pi} B_r(\theta,\varphi,t) P_{lm}(\cos\theta)\cos(\varphi)\sin\theta d\theta d\varphi \quad (1)$$

$$s_{r,lm}(t) = \int_0^\pi \int_0^{2\pi} B_r(\theta,\varphi,t) P_{lm}(\cos\theta)\sin(\varphi)\sin\theta d\theta d\varphi \quad (2)$$

$$c_{\theta,lm}(t) = \int_0^\pi \int_0^{2\pi} B_\theta(r,\varphi,t) P_{lm}(\cos\theta)\cos(\varphi)\sin\theta d\theta d\varphi \quad (3)$$

$$s_{\theta,lm}(t) = \int_0^\pi \int_0^{2\pi} B_\theta(r,\varphi,t) P_{lm}(\cos\theta)\sin(\varphi)\sin\theta d\theta d\varphi \quad (4)$$

$$c_{\varphi,lm}(t) = \int_0^\pi \int_0^{2\pi} B_\varphi(\theta,r,t) P_{lm}(\cos\theta)\cos(\varphi)\sin\theta d\theta d\varphi \quad (5)$$

$$s_{\varphi,lm}(t) = \int_0^\pi \int_0^{2\pi} B_\varphi(\theta,r,t) P_{lm}(\cos\theta)\sin(\varphi)\sin\theta d\theta d\varphi \quad (6)$$

The results of the convolution integrals are the coefficients for each harmonic function used. The convolution integrals can be used to calculate coefficients for wavelengths as short as two bin average dimensions, for example for bins of widths 9° latitude by 9° longitude, to degree and order 10 and spherical harmonic functions (e.g., as shown in graph 500 of FIG. 5).

In an example embodiment, the time series of the orthogonal function coefficients may be inspected to identify signals of artificial origin. For example, the time series for the order 2 harmonic coefficients are illustrated in graph 600 of FIG. 6. FIG. 6 illustrates the total power (top) and in the remaining panels the cosine and sine coefficients for the three components of the magnetic field, $B_r$, $B_\theta$, and $B_\varphi$. The $c_{lm}(t)$ and $s_{lm}(t)$ for any component of the magnetic field may include artifacts at annual (12 month) and orbit precession (e.g., 8 months for the Iridium satellite constellation) periods (610). Longer term and smoother variations are also present (620) but do not have periods characteristic of the satellite constellation orbital dynamics (110).

Returning to FIG. 2, the process 200 further may include spectral and artifact analysis (block 260). In some embodiments, the spectral and artifact analysis filtering out artifacts may include filtering contamination signals in the time series of the orthogonal function coefficients, the $c_{lm}(t)$ and $s_{lm}(t)$. It is noted that any variety or combination of filtering technique may be used. In some embodiments, spectral analysis may be used to identify and remove artificial signals using notch filtering. In some embodiments, spectral and artifact analysis may include converting harmonic coefficient time series into the frequency domain and filtering out signals with seasonal, orbit precession frequencies and multiples thereof. The spectral and artifact analysis may include may further include cross-correlating unphysical coefficients (e.g., monopole terms) and removing portions of correlated signals in all other coefficients. In some embodiments, the spectral and artifact analysis may include mirroring extension of the initial time series to earlier and later times (e.g., as shown in FIG. 7, 710); lossless windowing of the mirror extended time series (e.g., as shown in FIG. 7, 720); and Fourier transformation of the windowed time series, identification of discrete periods and harmonics corresponding to annual and orbit precession periods, and notch filter reconstruction of time series corresponding to these spurious signals (e.g., as shown FIG. 7, 730).

In some embodiments, removing artifacts in the coefficient time series, (e.g., as part of block 260), may use the order zero (l=0) coefficients to identify unphysical signals in the data. The l=0 terms correspond to monopole structure in the field and would indicate a magnetic charge which is unphysical. Non-zero l=0 coefficients therefore indicate artifacts in the observations and the presence of these signals can be used to identify artifacts. In some embodiments this can be done by considering the cosine, l=0, m=0 term for the radial component, $c_{R,00}$, as a proxy for additional artifacts in the data. The time series for $c_{R,00}$ serves as an indicator of erroneous signals and correlation between $c_{R,00}(t)$ and any of the $c_{lm}(t)$ and $s_{lm}(t)$ reflects an unphysical contribution to the $c_{lm}(t)$ or $s_{lm}(t)$. The linear regression between $c_{R,00}(t)$ and $c_{lm}(t)$ or $s_{lm}(t)$ can be used to quantify the erroneous signal remaining in the notch filtered $c_{lm}(t)$ or $s_{lm}(t)$ (740).

Figure 7:
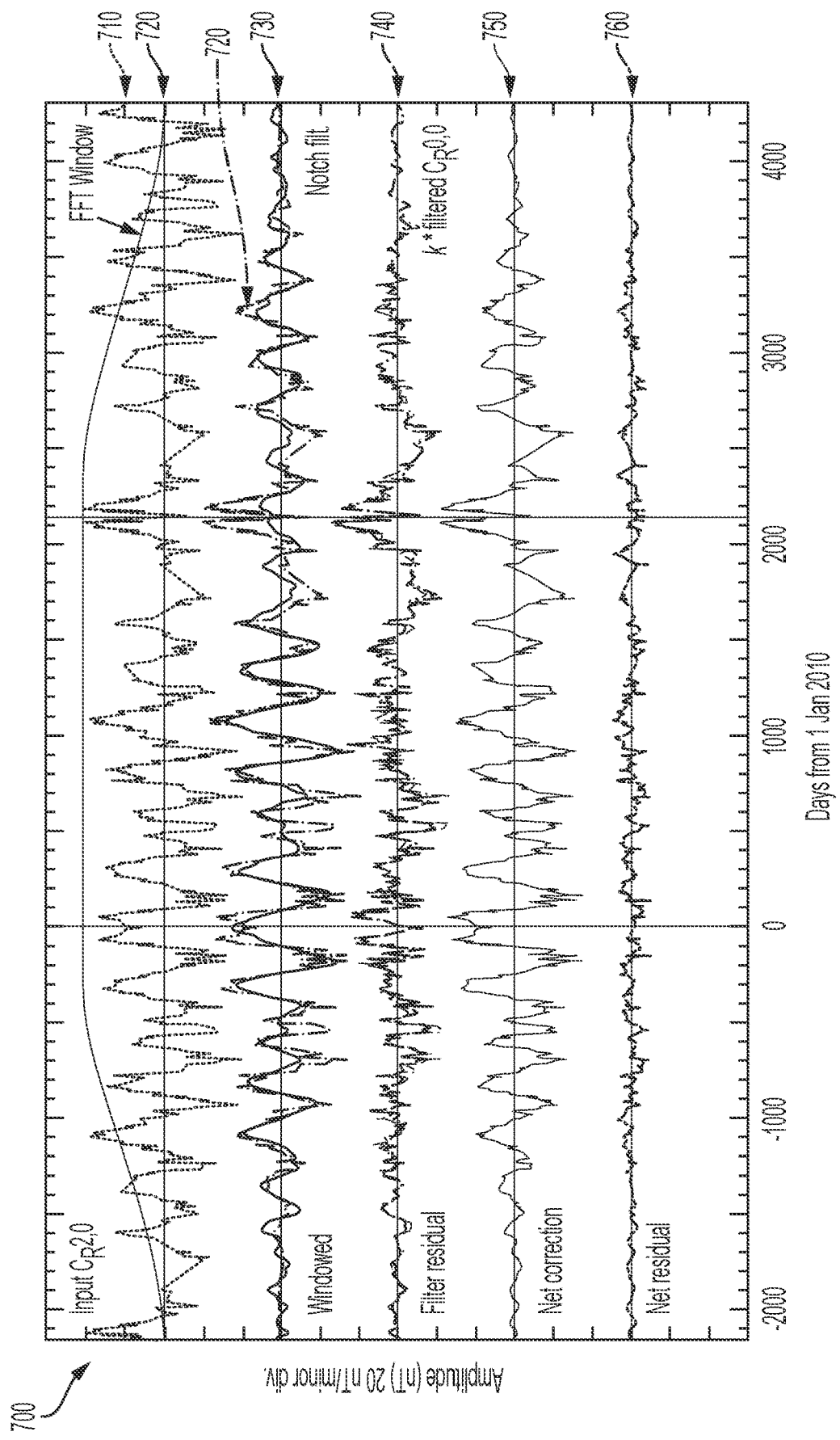
FIG. 7 illustrates time series of a single spherical harmonic coefficient (cosine, l=2, m=0) showing the techniques used to identify and remove artifacts from the harmonic coefficient time series related to measurement periods due to satellite orbit dynamics and those reflecting unphysical signals. Traces are labeled in the figure.

In some embodiments, identifying and removing artifacts (e.g., as part of block 260) may include taking the sum of the linear fit $c_{R,00}(t)$ and the notch filter yields the net correction (e.g., as shown in FIG. 7, 750). This net correction is subtracted to yield the time series for the net residual $c_{lm}*(t)$ and $s_{lm}*(t)$ (e.g., as shown in FIG. 7, 760). These net residual coefficients correspond to that portion of the harmonic coefficient signal which cannot be readily attributed to artifacts and is considered an angular harmonic representation of the actual departure of Earth's magnetic field relative to the reference model.

Figure 8:
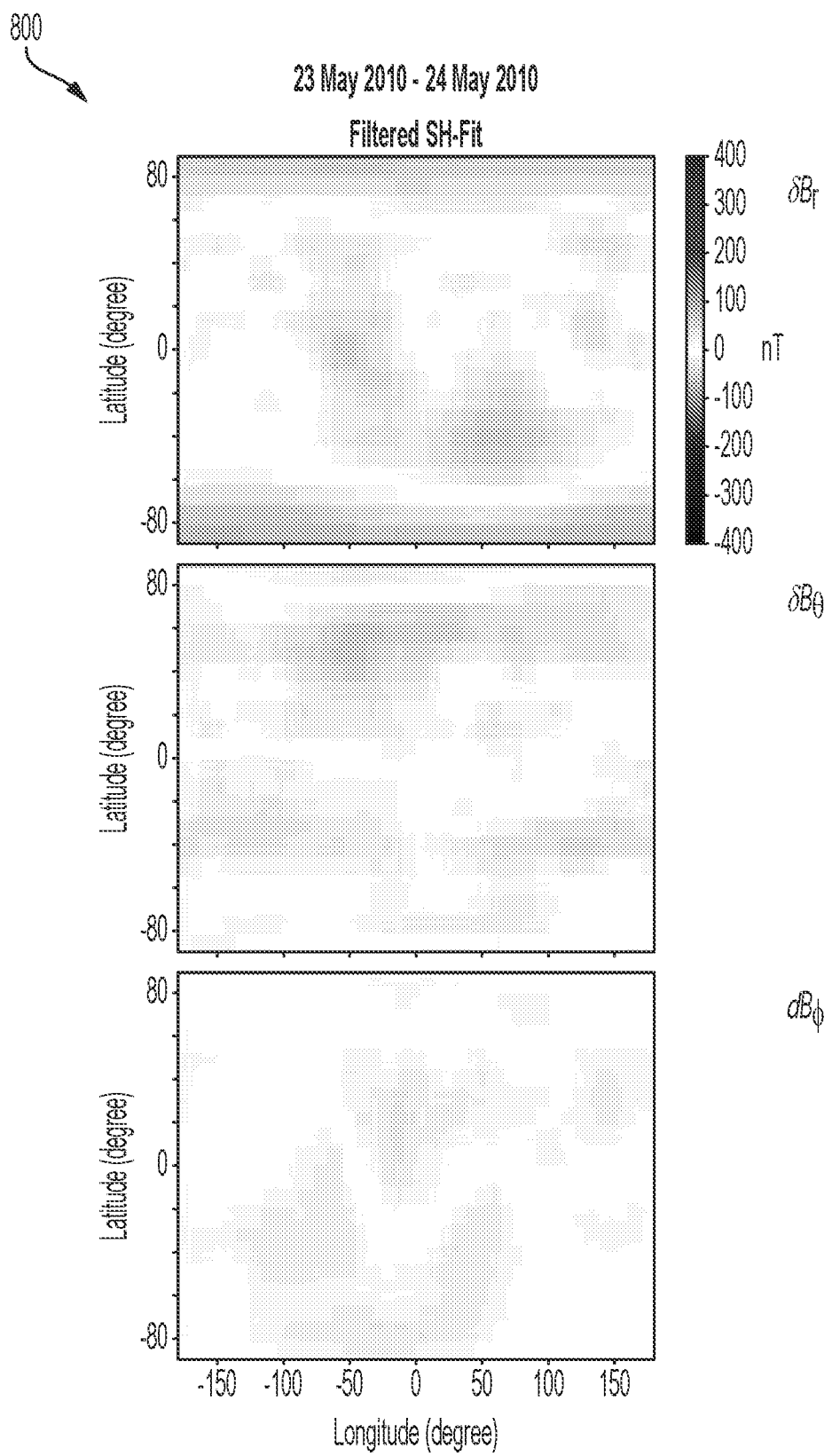
FIG. 8 illustrates maps of the Earth magnetic field departures from the reference model field resulting from removal of artifacts in the spherical harmonic time series and reconstructed to produce corrected, final maps of the structure of Earth's magnetic field.

Returning to FIG. 2, the process 200 may include global mapping for the magnetic field structure (block 270). In some embodiments, the magnetic field estimation system 120 may globally map the magnetic field structure by using the $c_{lm}*(t)$ and $s_{lm}*(t)$ to construct global maps of the magnetic field structure (800) by inverting the angular harmonic time series to calculate global maps of the vector magnetic field on the same surface as the observations obtained from the satellites 110. These results may be stored in the form of the $c_{lm}*(t)$ and $s_{lm}*(t)$ as well as outputting the magnetic field maps at any given time (e.g., as shown in FIG. 1, 130). The global map of the magnetic field structure for the example quiet interval (e.g., from block 230) for 23 May 2010 2100 UT to 24 May 2010 2100 UT is illustrated in FIG. 8. These global maps of the Earth's magnetic field structure (e.g., as shown in FIG. 1, 130) are the end result of the entire process summarized in FIG. 1.

Figure 9:
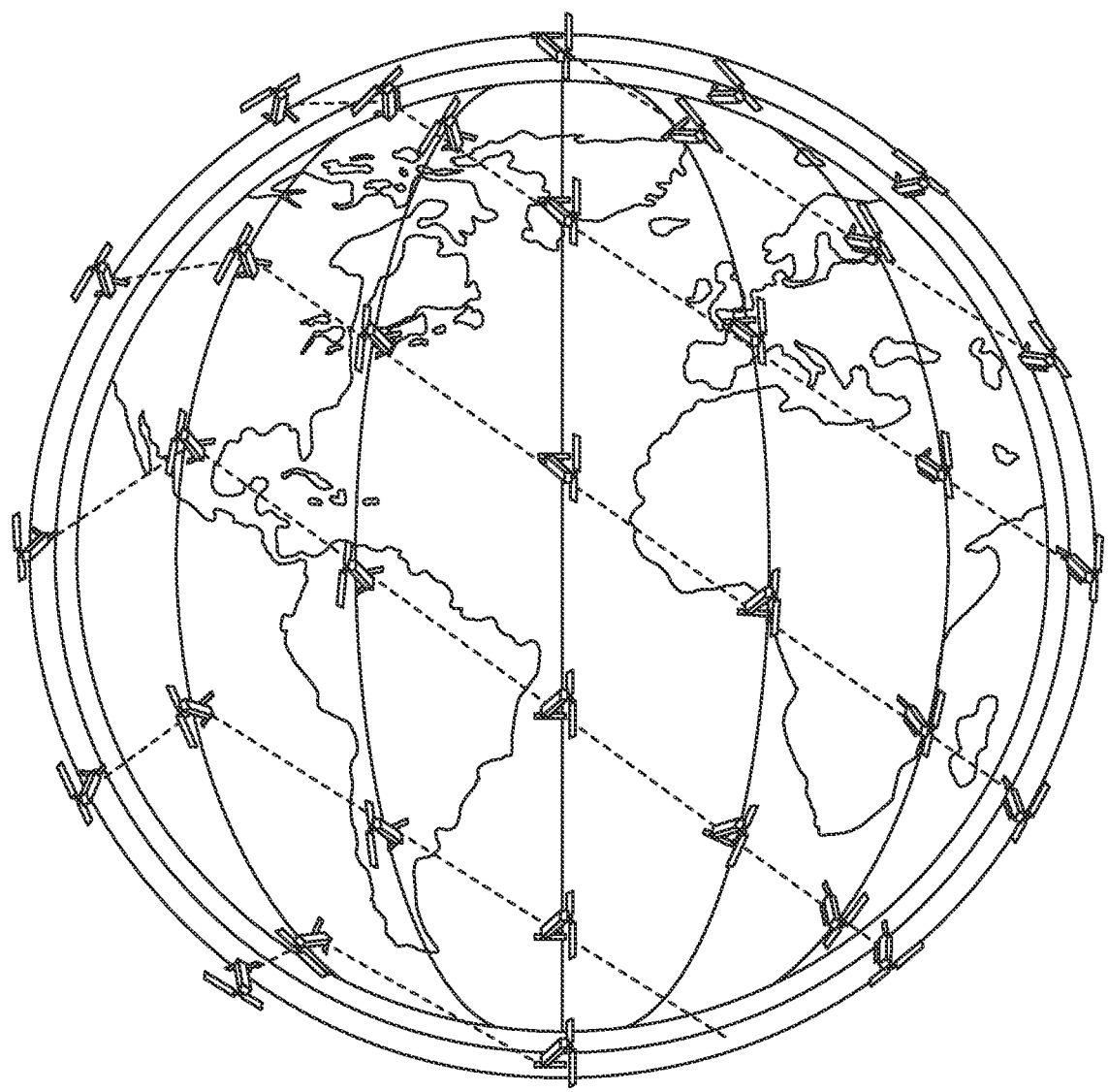
FIG. 9 illustrates a schematic depiction of Block 1 Iridium Communications satellite communications network configuration in low Earth orbit (LEO) at 780 km altitude and 86° inclination. The satellites are configured in six orbit planes with 11 satellites in each plane constituting the communication network from which magnetometer data were acquired for AMPERE beginning 1 Jan. 2010. The solid lines are the orbit planes and the dashed lines depict the radio links between orbit planes.

FIG. 9 illustrates a schematic depiction of Block 1 Iridium Communications satellite communications network configuration in low Earth orbit (LEO) at 780 km altitude and 86° inclination. The satellites are configured in six orbit planes with 11 satellites in each plane constituting the communication network from which magnetometer data were acquired for AMPERE beginning 1 Jan. 2010. The solid lines are the orbit planes and dashed lines depict the radio links between orbit planes.

The satellites constituting the Iridium Communications network are illustrated in FIG. 9. The 66 satellites in Iridium network orbits are distributed over six orbit planes, with 11 satellites in each plane. The orbit planes are evenly spaced in longitude by 30° and the satellites within each plane are also evenly spaced along the orbit track, corresponding to 9-minute (33° orbit angle) separations in ~100-minute period orbits. Additional satellites in each orbit plane serve as on-orbit spares.

The first generation of Iridium satellites, denoted as Block 1, were launched starting in 1997 and continued to operate until 2019, after launch of the constellation of Iridium NEXT satellites was completed. The avionics systems of both the Block 1 and NEXT Iridium satellites include a vector magnetometer. Each of the Block 1 Iridium satellites carried an Ithaco IM-103 vector fluxgate magnetometer as part of the attitude control system. The magnetometers had intrinsic noise below 0.1 nT/√Hz at 1 Hz, absolute accuracy of 0.5% of full scale, and linearity to 1 part in $10^4$. They were read out every 90 ms with 30-nT digitization onboard for closed-loop attitude control. The flight software system was initially configured only to support downlink rates for engineering monitoring, ~200 s between samples corresponding to ~12° in latitude.

Although the Iridium avionics magnetometers have digitization, sampling cadence, and performance substantially coarser than typical science instrumentation (cf. Acuna et al., 2002), they provide resolution sufficient to detect signals of Earth's Birkeland currents that are typically ~300 nT and up to 2000 nT, with a signal to noise ratio of about 10 (Anderson et al., 2000). It is worth noting that the original detection and studies of Earth's Birkeland currents were conducted using the attitude magnetometer on the Triad satellite (cf. Iijima and Potemra, 1976), so the application of utility magnetometers for science has been well demonstrated. However, the coverage afforded by the Iridium Communications constellation enables a dramatic advance in understanding the dynamics of Birkeland currents.

To take advantage of the global-scale, continuous coverage provided by the Iridium constellation configuration, the AMPERE dataset was developed (Anderson et al., 2000; 2014; Waters et al., 2001). This required new flight software to be implemented on the Iridium Block 1 satellites to downlink magnetic field samples at 19.44 s (standard rate) or 2.16 s (high rate) intervals from every satellite in the communications network. Test data were acquired starting in October 2009, and complete AMPERE data were collected beginning 1 Jan. 2010 and have continued to the present.

Processing to produce AMPERE data was developed to ingest, merge, and correct magnetometer data and attitude estimates from each individual satellite to yield time series and gridded maps of de-trended, inter-calibrated magnetic field perturbations reflecting signatures of field-aligned, Birkeland, currents flowing between the ionosphere and magnetosphere (cf. Waters et al., 2020 for details on inversion techniques for AMPERE). Available AMPERE data spans January 2010 through September 2017. The NEXT magnetometer data are being calibrated and processing for science products is in process. The present analysis uses AMPERE data from the Iridium Block 1 satellites from 2010 through 2015.

The global coverage of the magnetic field observations from the Iridium Communications constellation is dramatically different from prior LEO observations of Earth's magnetic field (cf. Olsen et al., 2010, 2013). In the nine minutes between successive Iridium satellite passage over a given geographic latitude, the Earth rotates 2.3°. In two hours, the Earth rotates 30°, so that all longitudes pass under one of the Iridium constellation orbit planes. The sampling interval of 19.44 s corresponds to an along track distance of 1.16° around the orbit, corresponding to the approximate maximum latitude spacing in the near-polar orbits at the equator. Thus, in as little as two hours the observations blanket the Earth with magnetic field samples spaced by 2.3° in longitude and 1.2° in latitude between 86.4° S and 86.4° N. This coverage also spans all local times with 2-hour spacing so that the external current sources are simultaneously tracked and their effects effectively averaged in local time at every geographic longitude over one day.

The motivation to increase the magnetic field data returned from the Iridium satellites was to track and study the dynamics of Birkeland currents reflecting the solar wind-magnetosphere interaction (cf. Milan et al., 2017; Coxon et al., 2018). During development of AMPERE science data processing, discrepancies between geographically registered magnetic field data and the IGRF-11 main field model (Finlay et al., 2010b) were noted but not analyzed in detail since the objective for AMPERE was to remove main field signals to extract the Birkeland current signatures. The simple expedient of a one-quarter orbit period high-pass filter was used to remove remaining residuals (cf. Anderson et al., 2001). Discrepancies between polar cap filtered observations during geomagnetic active times, however, indicate that this approach is not ideal (cf. Knipp et al., 2014) and motivated re-examination of the main field signals in the AMPERE data. The extensive coverage of the data allowed examination of consistency in patterns in departures from IGRF-11 over days, months, and years. There was a surprisingly consistent evolution of the global patterns given the low expectations for the instrumentation stability and accuracy. This result motivated a systematic study to assess whether these data could provide a novel means of monitoring changes in the core-generated field.

The AMPERE data processing flow is presented to set the context for its application to main field characterization. It is useful to consider some examples of AMPERE results from geomagnetically active and quiet conditions to illustrate the character of the Iridium Block 1 data and the data processing and calibration processes applied to these data. One key aspect of the rapid coverage over the entire Earth that Iridium provides is the opportunity to identify data intervals for conditions with the lowest possible contributions from magnetospheric and ionospheric currents driven by interaction with the solar wind.

On the Iridium Block 1 satellites the magnetic field data were used as one input to the attitude determination process and were calibrated using uploaded tables to enable this on-board closed-loop process. The target attitude knowledge accuracy was ~0.1°, sufficient to maintain the inter-satellite communication links upon which the network depended. To specify the scale of the uncertainty that the attitude accuracy implies, we note that a 0.1° attitude error corresponds to an error in the magnetic field measurement of 80 nT perpendicular to the field direction at the altitude of the Iridium satellites. The accuracies needed for auroral science are higher than those required for on-board operations, so post-processing calibrations were used to improve the estimates of the observed field for AMPERE science (Anderson et al., 2000). The attitude and measurement accuracies for study of Earth's magnetic field and the variations in the core-generated field are substantially more stringent than the requirements for AMPERE, necessitating additional processing and analysis to identify artifacts in the data and determine signals most reliably attributed to the main field.

It turns out that the errors in the data are randomly distributed and it is only because the constellation provides a large number of observations that one can determine the mean values to greater precision than the uncertainty of the individual samples. Below we adopt a grid in latitude and longitude with bins extending 9° in longitude and 9° in latitude for a total of 800 bins. In one day, the 66 Iridium satellites returned, on an average, 4,440 samples from each space vehicle (SV) for a total of 293,000 measurements distributed over all latitudes and longitudes, so the number of samples in each 9°×9° bin is ~360. The statistical error in the mean of measurements with uncertainties of 80 nT is therefore a factor of 20 lower, or ~4 nT. This estimate illustrates how the quantity of data returned and the dense coverage provided by the constellation compensate both for the attitude knowledge accuracy and the coarse digitization. This initial estimate is borne out in the analysis and statistics presented below.

The magnetometer post-processing calibration requires determination of 12 different parameters related to the orientations of the three sensing axes (six angles), three offsets or zero levels, and three gain adjustment factors (cf. Plaschke et al., 2018 and references therein). For non-spinning spacecraft in LEO, approaches have been developed to co-estimate a non-linear solution for these parameters together with core model coefficients (cf. Alken et al., 2020). For AMPERE, we adopted a simpler, linear approach to deriving calibrated perturbations relative to a reference model from the reported observations. This was used to derive the perturbation inputs to the science product processing described in detail by Waters et al. (2020).

The AMPERE pre-processing proceeds as follows. First, we write $B_{SC}(t)$ to denote the data returned by the magnetometer in spacecraft coordinates (SC) at the time t, converted to engineering units using a preliminary scale factor. Spacecraft coordinates are defined as +X in the body direction that is nominally ram facing, +Z as the body direction nominally nadir, and +Y in the body direction nominally in the orbit normal direction. The spacecraft and magnetometer coordinates are identical to within mounting and internal magnetometer orientation designs. Departures of the body orientation from these nominal directions are provided in the attitude data in terms of roll, pitch, and yaw angles and these angles are used in transforming between body (magnetometer) coordinates and geophysical systems. The scale factors for Block 1 analysis are those applied on-board the satellite at the time of acquisition. The reference model for Earth's main field in geographic coordinates is written as $B_{model\text{-}GEO}$. In this paper, the reference model is IGRF-11 evaluated at the satellite location of each measurement with a constant secular variation (Finlay et al., 2010b), but we refer to this with the general term 'model' since the analysis can use any reference model. The next step in the analysis is to evaluate the reference model at the location and date-time of each magnetometer sample, denoted $B_{model\text{-}GEO}(r(t), t)$, where r(t) is the location of the satellite at the time t. Using the spacecraft attitude, denoted as a four-element quaternion, q(t), we construct a rotation matrix from GEO coordinates into the SC frame, denoted $A_{GEO\text{-}SC}(q(t))$. We then transform the reference model into the SC frame $$B_{model\text{-}SC}(r(t),q(t),t)=A_{GEO\text{-}SC}(q(t))\cdot B_{model\text{-}GEO}(r(t),t), \quad (1)$$

and calculate the residual between the observed field and the model in the SC frame $$\Delta B_{SC}(t) = B_{SC}(t) - B_{model\text{-}SC}(r(t), q(t), t). \quad (2)$$

Note that because the magnetometer and spacecraft coordinates are identical, an additional rotation from the SC frame into the magnetometer frame is not needed. The calibration is then derived by fitting each component of $\Delta B_{SC}(t)$ to the model field using linear regression. We use an entire day of data to determine best fits to $\Delta B_{SC}(t)$ in the form $$\Delta B_{SC\text{-}fit}(t) = B_0 + M \cdot B_{model\text{-}SC}(r(t), q(t), t) \quad (3)$$

where the offset vector, $B_0$, and matrix, M, are constants for each day. We do not require that these values be the same between different days. The fit can be obtained in closed form since it is a simple linear fit, so it is a fast calculation, which is not an insignificant consideration when processing data from up to 75 satellites. The residual magnetic field signal that cannot be expressed in terms of linear correlations to the reference model is then $$\delta B_{SC}(t) = \Delta B_{SC}(t) - \Delta B_{SC\text{-}fit}(t). \quad (4)$$

To see how this relates to a calibration applied to the $B_{SC}(t)$ to obtain a best estimate for a calibrated $B_{SC}'(t)$, we expand equation (4) to $$\delta B_{SC}(t) = B_{SC}(t) - \{B_0 + (I+M) \cdot B_{model\text{-}SC}(r(t), q(t), t)\}, \quad (5)$$

where I is the identity matrix. Given that the residual, $\delta B_{SC}(t)$ has minimum standard deviation for this form of the calibration, the conversion from $B_{SC}(t)$ to calibrated data $B_{SC}'(t)$ is given by $$B_{SC}'(t) = (I+M)^{-1} \cdot (B_{SC}(t) - B_0). \quad (6)$$

Written this way, it is clear that $B_0$ is the offset vector and $(I+M)^{-1}$ is the calibration matrix. The matrix elements can be expressed in terms of transformations to orthogonalize the sensing axes, rotate from the effective magnetometer frame into the spacecraft frame, and to apply gain corrections to each axis to yield a true vector (cf. Plaschke et al., 2019). Note however that any signals related to sensor or electronics cross-talk between axes is not distinguished from orthogonality corrections so the interpretation of the calibration matrix is to some extent ambiguous. Because it is more efficient and hence faster, while preserving the information given by a non-linear inversion for the orthogonalization parameters that determine the matrix, we leave the calibration in the matrix form since our only interest is in transforming to the best estimate true vector field measurement.

Figure 10:
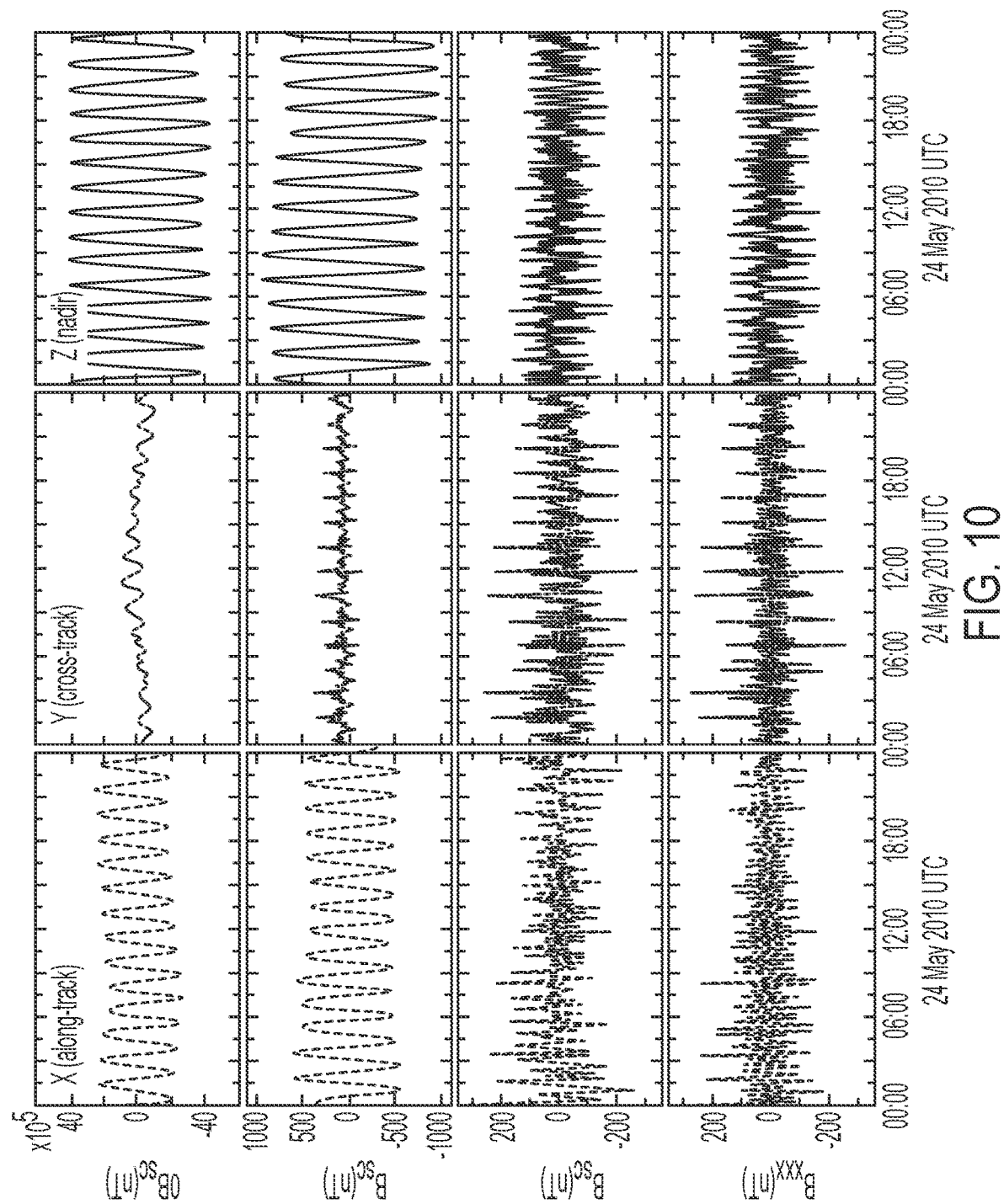
FIG. 10 illustrates one day of data from Iridium Satellite Vehicle 30 (denoted SV030) in satellite body coordinates showing results at four stages of data processing. From left to right: the columns show the magnetic field components in the X-axis (along track in the ram direction, parallel to the satellite velocity, v); Y-axis (cross track in the v×r direction,); and Z-axis (nadir, −r direction). From top to bottom, the rows show: magnetometer readings converted to engineering units, $B_{SC}$; magnetic field residual after subtracting the IGRF-2010 model with secular variations ($B_{IGRF}$), $\Delta B$; residual corrected for offsets, misalignment, and orientation using multi-linear regression between $\Delta B$ and $B_{IGRF}$, $\delta B$; and the corrected residual after applying a high-pass filter with a cut-off period of 25 minutes (~¼ of an orbit period), $\delta B_{filtered}$.

FIG. 10 illustrates one day of data from Iridium Satellite Vehicle 30 (denoted SV030) in satellite body coordinates showing results at four stages of data processing. From left to right: the columns show the magnetic field components in the X-axis (along track in the ram direction, parallel to the satellite velocity, v,); Y-axis (cross track in the v×r direction); and Z-axis (nadir, −r direction). From top to bottom, the rows show: magnetometer readings converted to engineering units, $B_{SC}$; magnetic field residual after subtracting the IGRF-2010 model with secular variations ($B_{IGRF}$), $\Delta B$; residual corrected for offsets, misalignment, and orientation using multi-linear regression between $\Delta B$ and $B_{IGRF}$, $\delta B$; and the corrected residual after applying a high-pass filter with a cut-off period of 25 minutes (~¼ of an orbit period), $\delta B_{filtered}$.

Figure 11:
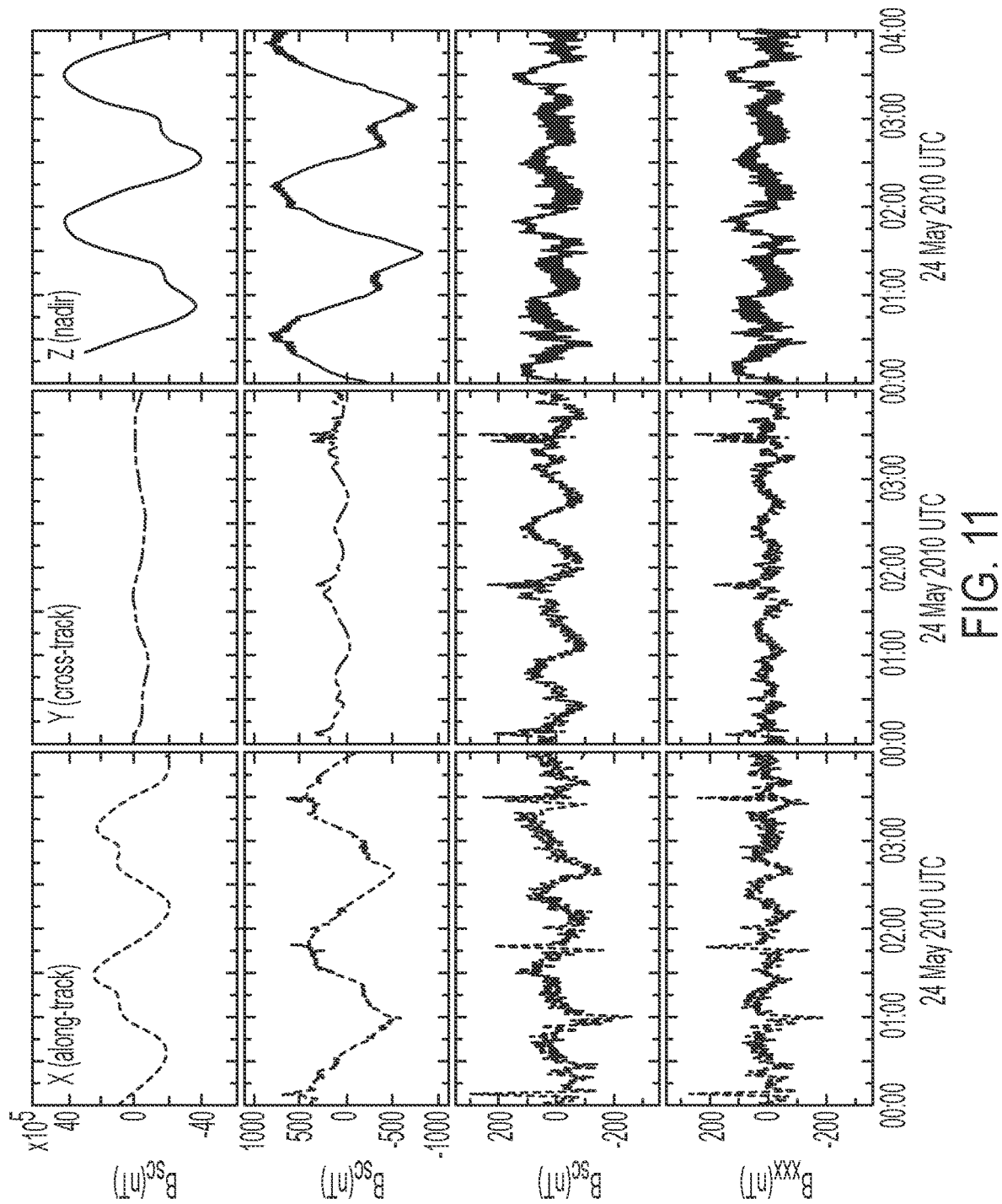
FIG. 11 illustrates magnetic field data from Iridium Satellite Vehicle 30 (SV030) for the first four hours of 24 May 2010 in the same format as FIG. 2, showing slightly more than two orbits of data. The residual signals in $\delta B$ show signals occurring over roughly an orbit period and twice an orbit period, most clearly in the along-track and cross-track components. Short-period spikes in the along and cross-track components most evident in the $\delta B_{filtered}$ time series at ~00:08 UT, ~01:00 UT, ~01:45 UT, and ~03:25 UT are due to Birkeland currents.

FIG. 11 illustrates magnetic field data from Iridium Satellite Vehicle 30 (SV030) for the first four hours of 24 May 2010 in the same format as FIG. 2, showing slightly more than two orbits of data. The residual signals in $\delta B$ show signals occurring over roughly an orbit period and twice an orbit period, most clearly in the along-track and cross-track components. Short-period spikes in the along and cross-track components most evident in the $\delta B$ filtered time series at ~00:08 UT, ~01:00 UT, ~01:45 UT, and ~03:25 UT are due to Birkeland currents.

Results showing the sequence in processing from $B_{SC}$ to $\Delta B_{SC}$ to $\delta B_{SC}$ for 24 May 2010 and Iridium Satellite Vehicle 30, denoted SV030, are shown in FIG. 10 for the entire day. To more clearly see features of the data at each step in the processing, a subset of the data is shown in FIG. 11 for the first four hours of the day. FIG. 10 and FIG. 11 also show the filtered $\delta B_{SC}$ that are used as the inputs to subsequent AMPERE science processing. Comparing the $B_{SC}$ data with the residuals, $\Delta B_{SC}$, there are clear orbit period signals with amplitudes of about 1 to 2% of the original signal. The calibration reduces the residuals to less than about 100 to 200 nT amplitude, making the Birkeland current signatures much more prominent as spikes in the $\delta B_{SC}$ time series (denoted as $\delta B$), especially in the cross-track or Y component. Signals having periods roughly half to one quarter of the orbit period remain in the $\delta B_{SC}$ time series, and with a source for these signals not initially identified. To extract the Birkeland current signals more clearly, we therefore applied a 25-minute period high pass filter to $\delta B_{SC}$. The filtered result is shown in the bottom row as $\delta B_{filtered}$. The filtering reduced the baseline residuals by about a factor of two without obviously distorting the Birkeland current signals. This allowed production of the first version of AMPERE science products (Waters et al., 2001, 2020), which have been applied to a range of questions in auroral and magnetospheric science (cf. Coxon et al., 2018).

During active times when the auroral zones expand equatorward, as far as 40° co-latitude, the 25-minute period can be comparable to the time it takes a polar orbiting satellite to traverse the auroral zone. Substantial discrepancies between $\delta B_{filtered}$ data from near-conjunctions of Iridium satellites do occur (Knipp et al., 2014) that turn out to be due to distortions from this filter. Revisions to the processing are in development to eliminate the filtering step to mitigate this distortion. The data used here for study of the Earth's field are the $\delta B_{SC}$ before this filtering.

Figure 12:
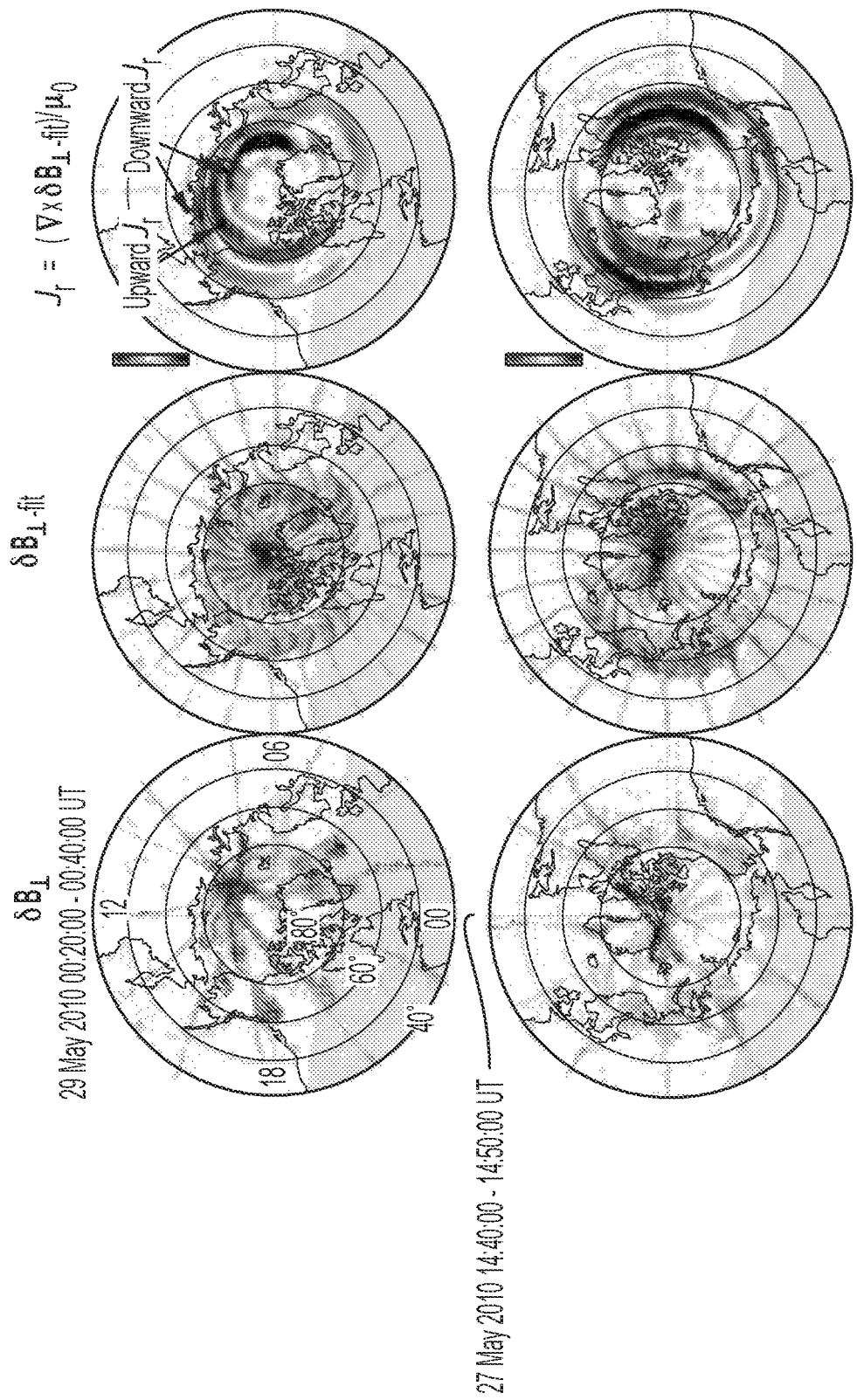
FIG. 12 illustrates an example 10-minute intervals of AMPERE processing steps and products from two intervals during geomagnetic activity on 29 May 2010, 03:30-03:40 UT (top) and 12:00-12:10 UT (bottom). Panels show the view looking down from above the north magnetic pole to 40° magnetic latitude, with magnetic noon at the top and dusk to the left. (Left) horizontal magnetic perturbations ($\delta B_\perp$) along each orbit track, with arrows colored differently for different satellites in the direction of $\delta B_\perp$ and scaled by 500 nT; (middle) continuous fit to the $\delta B_\perp$ data ($\delta B_{\perp\text{-}fit}$) using harmonic functions customized to be normalized over the latitude range shown and evaluated at every hour in local time and degree in latitude; (right) radial electric current density, $J_r$, calculated as $\nabla \times \delta B_{\perp\text{-}fit}/\mu_0$, where red is upward (positive) $J_r$, blue is downward (negative) $J_r$, and the color saturation is set to 1 $\mu A/m^2$.

FIG. 12 illustrates an example 10-minute intervals of AMPERE processing steps and products from two intervals during geomagnetic activity on 29 May 2010, 03:30-03:40 UT (top) and 12:00-12:10 UT (bottom). Panels show the view looking down from above the north magnetic pole to 40° magnetic latitude, with magnetic noon at the top and dusk to the left. (Left) horizontal magnetic perturbations ($\delta B_\perp$) along each orbit track, with arrows colored differently for different satellites in the direction of $\delta B_\perp$ and scaled by 500 nT; (middle) continuous fit to the $\delta B_\perp$ data ($\delta B_{\perp\text{-}fit}$) using harmonic functions customized to be normalized over the latitude range shown and evaluated at every hour in local time and degree in latitude; (right) radial electric current density, $J_r$, calculated as $\nabla \times \delta B_{\perp\text{-}fit}/\mu_0$, where red is upward (positive) $J_r$, blue is downward (negative) $J_r$, and the color saturation is set to 1 $\mu A/m^2$.

The AMPERE products provide an important measure of geomagnetic disturbance and are used here to identify periods of particularly quiet conditions. It is therefore useful to discuss the AMPERE processing to illustrate the relationship between quiet conditions and the input data for the main field analysis. Examples of AMPERE products from two 10-minute intervals during a geomagnetically active period on 29 May 2010 are shown in FIG. 12, for 03:30-03:40 UT (top) and 12:00-12:10 UT (bottom). These data products and tools to generate graphics used here are available via the AMPERE web page (http://ampere.jhuapl.edu). This moderate geomagnetic storm was driven by an interplanetary magnetic cloud with a southward interplanetary magnetic field (IMF) of −13 nT. The auroral electrojet index, AE, reached over 1500 nT and the minimum equatorial storm disturbance index, $D_{st}$, was near −60 nT. The horizontal filtered δB, denoted $δB_⊥$, is shown in the left panel by colored arrows. The center panels show the orthogonal function fit to δB, labeled $δB_{⊥-fit}$, as described in Waters et al. (2020). The anti-sunward magnetic perturbations in the dawn and dusk sectors associated with the Birkeland currents are clear, and the basic Region 1/Region 2 current polarities are evident (cf. Iijima and Potemra, 1976). Currents in the polar cap at latitudes >80° (in the 12:00-12:10 UT interval) are not considered reliable, as they result from discrepancies in the $δB_⊥$ near the orbit plane crossing point. Measurements near the orbit plane crossing point can exacerbate errors in the $δB_⊥$ owing to the small separations between tracks, resulting in spurious filamentary currents. Consistent with the bottom rows of FIG. 10 and FIG. 11, the $δB_⊥$ equatorward of the Birkeland currents are below ~100 nT in magnitude.

The total Birkeland current, $I_{Tot}$, is a convenient measure of the intensity of this high-latitude externally-driven current system and is readily calculated from the AMPERE current density distributions. As described in Anderson et al. (2014), this calculation is done by setting a minimum current density magnitude, $J_{r,min}$=0.16 μA/m², and then separately integrating the upward and downward $J_r$ whose magnitudes exceed $J_{r,min}$ to obtain $I_{Up,h}$ and $I_{Down,h}$, where 'h' is either N or S to indicate the polar hemisphere being integrated. The threshold magnitude $J_{r,min}$ was determined from the noise level in $J_r$ during very quiet geomagnetic conditions and reflects the end-to-end noise in the data and AMPERE analysis process. The thresholding minimizes contributions from lower latitude noise spread over large areas which would otherwise be a significant contribution and thereby allows one to evaluate the integrals for $I_{Up,h}$ and $I_{Down,h}$ without imposing arbitrary latitude boundaries. The total current flowing in the Birkeland system is defined as $$I_{Tot,h}=½(I_{Up,h}-I_{Down,h}), \quad (7)$$

and the net current as $$I_{Net,h}=I_{Up,h}+I_{Down,h}. \quad (8)$$

The $I_{Up,N}$ and $I_{Down,N}$ for the 3:30-3:40 UT interval were 6.08 million Amperes (MA) and −6.12 MA, respectively, yielding an $I_{Net,N}$ of −0.04 MA. For the 12:00-12:10 UT interval $I_{Up,N}$ and $I_{Down,N}$ were 9.25 MA and −8.83 MA, and $I_{Net,N}$ was +0.42 MA, about 5% of $I_{Tot,N}$. The small $I_{Net,N}$ values are taken in the AMPERE results as uncertainties in $I_{Tot,N}$. Inter-hemispheric currents that have been reported at low latitudes (Lühr et al., 2019) range up to 10s of nA/m² and occur well equatorward of the auroral zones. Inter-hemispheric currents in the auroral zone Birkeland currents are thought to range between 0.1 and 0.4 μA/m², (Lyatskaya et al., 2014) comparable to the variability we find in $I_{Net,h}$.

FIG. 13 illustrates an eight-day interval of the parameters and sliding 24-hour averages used to identify geomagnetically quiet intervals, together with the interplanetary magnetic field (IMF) observed by the Advanced Composition Explorer (ACE) spacecraft at the Earth-Sun Lagrange point 1 (L1). From top to bottom the panels show: (a) IMF data; (b) total Birkeland currents (Itot) in the northern and southern hemisphere and their running 24-hour averages together with the net current; (c) auroral electroject (AE) index and its running 24-hour average (magenta); (d) symmetric (SymH) and asymmetric (AsyH) H-indices, respectively) and their 24-hour running averages. Three of the quiet periods occurred during this interval and are indicated by the yellow boxes in the bottom three panels: 2010 May 22/12:00-2010 May 23/12:00; 2010 May 23/21:00-2010 May 24/21:00; and 2010 May 27/03:00-2010 May 28/03:00.

Figure 13A:
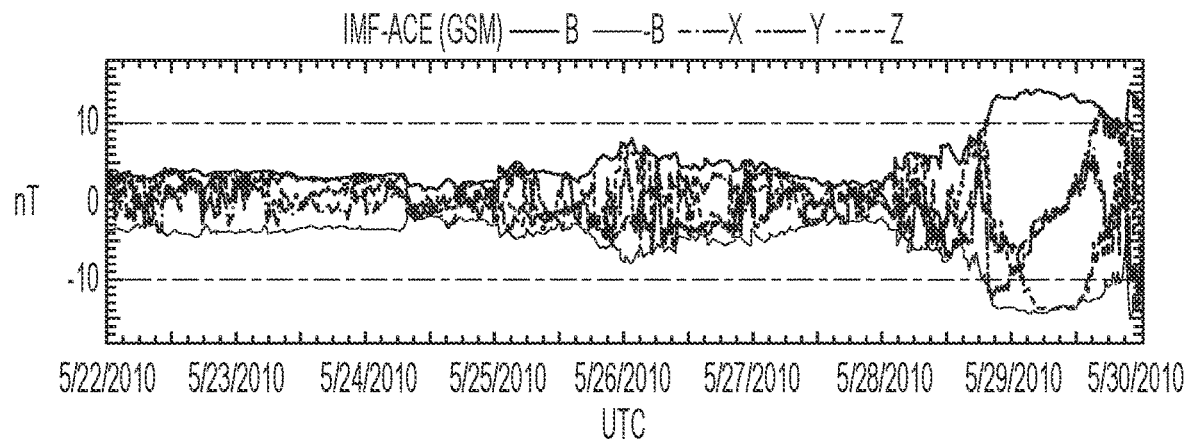
FIG. 13 illustrates an eight-day interval of the parameters and sliding 24-hour averages used to identify geomagnetically quiet intervals, together with the interplanetary magnetic field (IMF) observed by the Advanced Composition Explorer (ACE) spacecraft at the Earth-Sun Lagrange point 1 (L1). From top to bottom the panels show: (a) IMF data; (b) total Birkeland currents (Itot) in the northern and southern hemisphere and their running 24-hour averages together with the net current; (c) auroral electroject (AE) index and its running 24-hour average (magenta); (d) symmetric (SymH) and asymmetric (AsyH) H-indices and their 24-hour running averages. Three of the quiet periods occurred during this interval and are indicated by the yellow boxes in the bottom three panels: 2010 May 22/12:00-2010 May 23/12:00; 2010 May 23/21:00-2010 May 24/21:00; and 2010 May 27/03:00-2010 May 28/03:00.
Figure 13B:
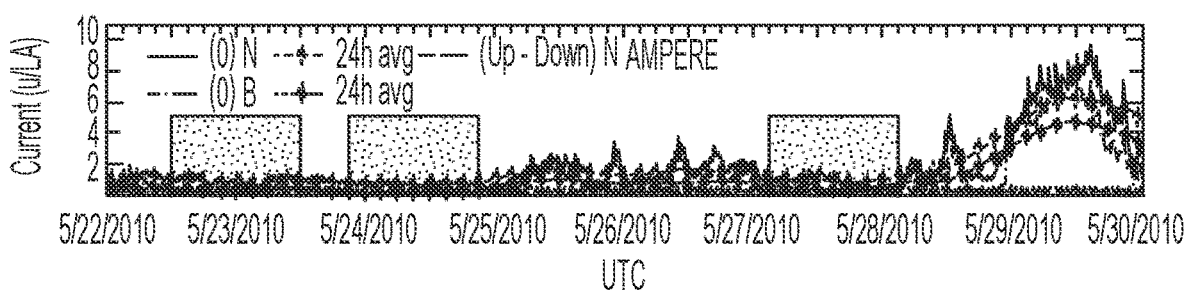
Figure 13C:
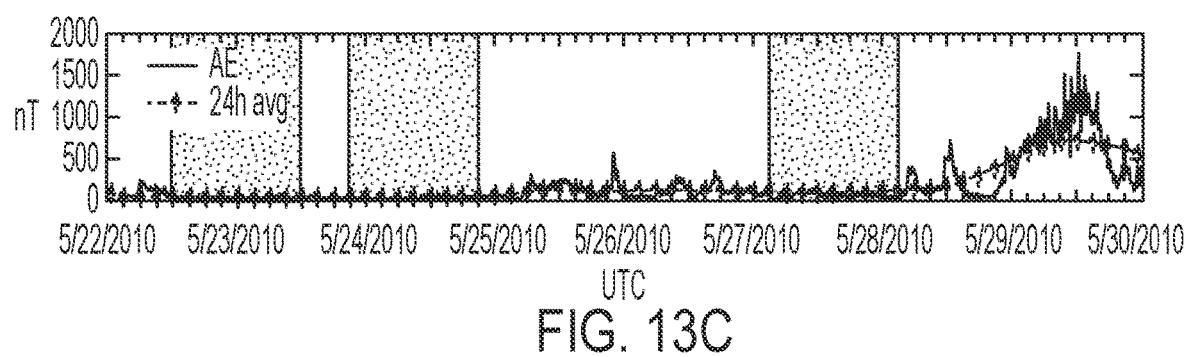
Figure 13D:
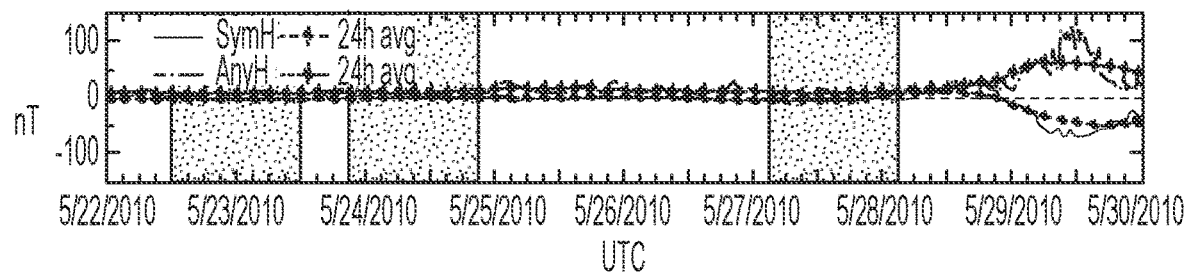

As illustrated in FIG. 12, the coverage of the Iridium constellation allows us to impose strict limits on geomagnetic activity to select intervals as free of external signals as possible. To illustrate how intervals of quiet geomagnetic activity were identified and quantified, FIG. 13 shows the IMF observed by the Advanced Composition Explorer (ACE) spacecraft at the Sun-Earth Lagrange point 1 (L1) together with three sets of geomagnetic disturbance measures for an eight day interval in 2010, from May $22^{nd}$ through the $29^{th}$, which includes the time intervals shown in FIG. 12. The three components of the IMF in solar ecliptic (SE) coordinates are shown in FIG. 13A for $B_{X,IMF}$, $B_{Y,IMF}$, and $B_{Z,IMF}$, respectively. The IMF magnitude ($B_{IMF}$) and the negative of the magnitude ($-B_{IMF}$) are shown in thick and thin black traces, respectively. The magnetic cloud that was responsible for the geomagnetic storm on the 2010 May 29 first arrived at L1 around 1800 UT on 2010 May 28 with peak negative $B_{Z,IMF}$ occurring between 0300 to 1200 UT on the 2010 May 29.

The second, third, and fourth panels of FIG. 13 show the measures of geomagnetic disturbance used in this study for selection of "quiet" periods. Both the AE and H-index datasets are available from the Geomagnetic Data Service of the Kyoto World Data Center for Geomagnetism, Kyoto, Japan, (http://wdc.kugi.kyoto-u.ac.jp/wdc/Sec3.html). The AE index indicates high-latitude magnetic perturbations generally resulting from auroral electrojets, while the SymH and AsyH indices provide a proxy for equatorial magnetic perturbations related to enhancements in the Earth's ring current. The 24-hour running averages of $I_{Tot,N}$, $I_{Tot,S}$, AE, SymH, and AsyH were used to construct a composite measure of geomagnetic activity. The IMF data are shown here for context to illustrate that the active periods correspond to strongly southward IMF as expected, but these data are not needed for the quiet condition determination. The three 24-hour intervals highlighted by light yellow rectangles in FIG. 13b-d indicate a set of quiet intervals selected for analysis of the main field.

To select quiet 24-hour periods, we first constructed normalized quantities from the disturbance measures shown in FIG. 13. The running 24-hour average of a quantity, g, is denoted by angle brackets, <g>. We calculated a total current from the 24-hour averages $$I_{Tot}=<I_{Tot,N}>+<I_{Tot,S}>. \quad (9)$$

Using both $<I_{Tot,N}>$ and $<I_{Tot,S}>$ rather than just one hemisphere has the advantage of muting seasonal influence on the Birkeland currents driven by polar ionospheric illumination variations. We also used both SymH and AsyH since these indices represent different sets of external currents: SymH primarily represents the symmetric ring current and symmetric magnetospheric compressions, while AsyH reflects the storm-time asymmetric ring current, at times with substantial contribution of from the cross-tail current. We therefore calculated $$H=|<SymH>|+|<AsyH>|, \quad (10)$$

to capture all of these effects. We then normalize the $I_{Tot}$, <AE>, and H values by constructing z-distributions for each using one month of data to define the distributions. For example, from a month of $I_{Tot}$ values we evaluated the average, $m_{ITot}$, and the standard deviation, $\sigma_{ITot}$, and calculated a normalized value as $$V_{Itot} = (I_{Tot} - m_{ITot})/\sigma_{ITot}, \quad (11)$$

known as the z-score. This was similarly done for <AE> and H to obtain $V_{AE}$ and $V_H$, respectively. We then took the average of these three normalized disturbance parameters to derive a single composite disturbance parameter, Q, $$Q = (V_{Itot} + V_{AE} + V_H)/3, \quad (12)$$

which is positive (negative) for conditions that are more (less) disturbed than the average taking into account Birkeland currents, auroral electrojets, and ring current-tail-compression dynamics.

The time series for Q were then used to determine quiet 24-hour intervals. We then identified the quietest 7 periods in each month. This was done by finding the minimum Q), logging it, removing all Q-values within this period, and then searching for a new minimum Q in the remaining data until 7 non-overlapping 24-hour periods were identified and logged. To ensure that there is at least some quiet data from every month, we also selected the three quietest periods in each month. Then, because not all months were equally quiet, we collected from the remaining periods, the 12 second quietest ones for each quarter of the year centered on solstice or equinox months (i.e., November-January, February-April, May-July, August-October). Thereafter we selected the quietest 4 from these 12. Altogether, the above selection criteria yielded 263 quiet 24-hour periods for January 2010 through November 2015. As of this writing, 8 months of Iridium Block 1 magnetometer data during this span are not currently available. Hence, data for August and September 2013, June and July 2014, and November 2014 through February 2015 are not included in the analysis. For quarters with missing months, the number of additional quiet periods were reduced to 2 periods if only two months were available or 1 period if only one month was available. No quarter was devoid of data. The three quiet periods occurring during the interval marked in FIG. 13 by the yellow boxes were 2010 May 22/12:00-2010 May 23/12:00; 2010 May 23/21:00-2010 May 24/21:00; and 2010 May 27/03:00-2010 May 28/03:00. Table 1 lists all 263 intervals together with parameters used to derive the z-scores and the final values for Q for each interval. For one quiet interval, Apr. 16, 2010 18:00 to Apr. 17, 2010 18:00, a complete 24-hour interval of data was not available so it was not included in the subsequent analysis.

Figure 14:
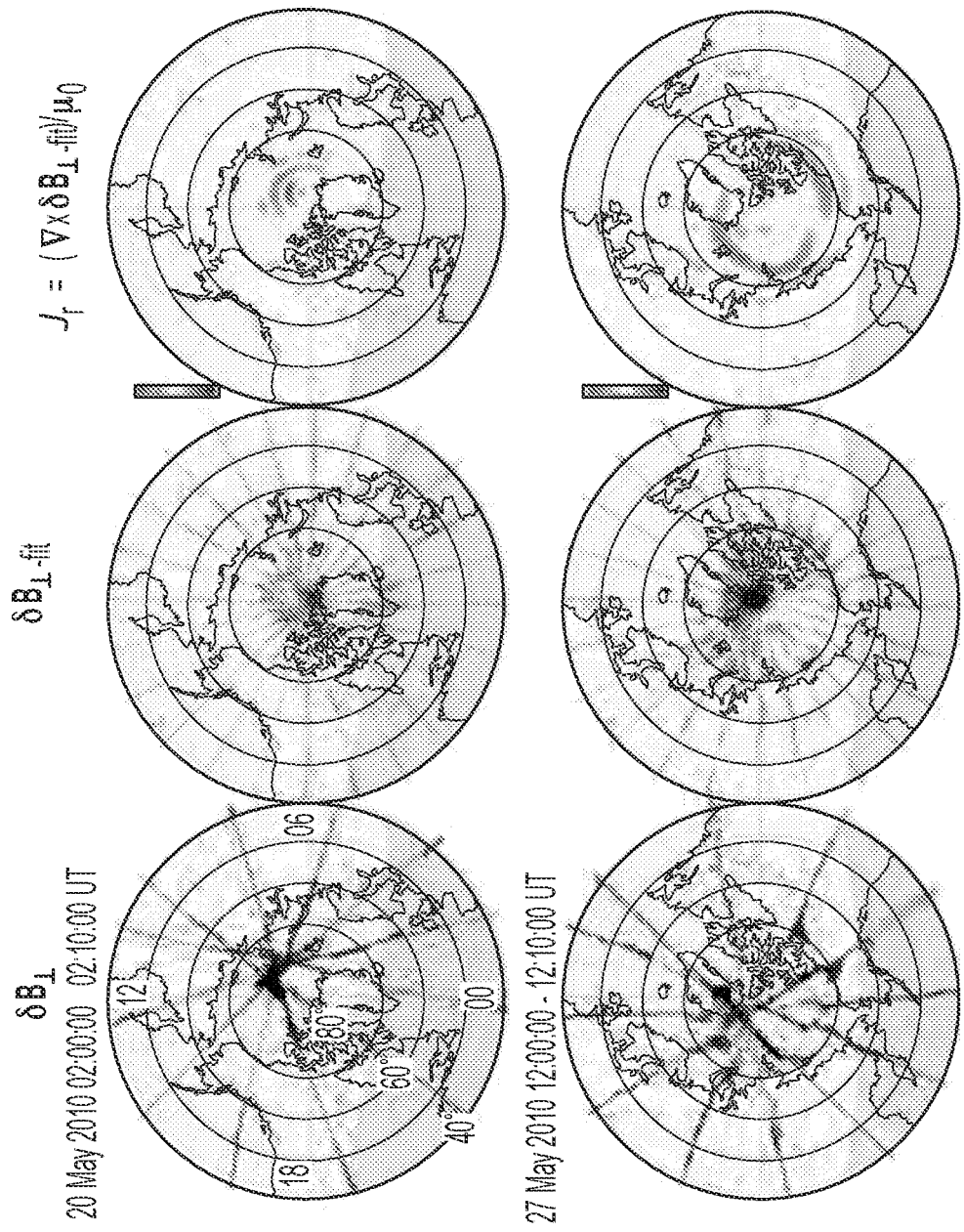
FIG. 14 illustrates example 10-minute intervals of AMPERE products in the same format as FIG. 12 from 23 May 2010 at 02:00-02:10 UT (top) during the quietest 24-hour period in FIG. 13 and 27 May 2010 at 12:00-12:10 UT (bottom) during the most active interval during the third quiet 24-hour period in FIG. 13.
Figure 27:
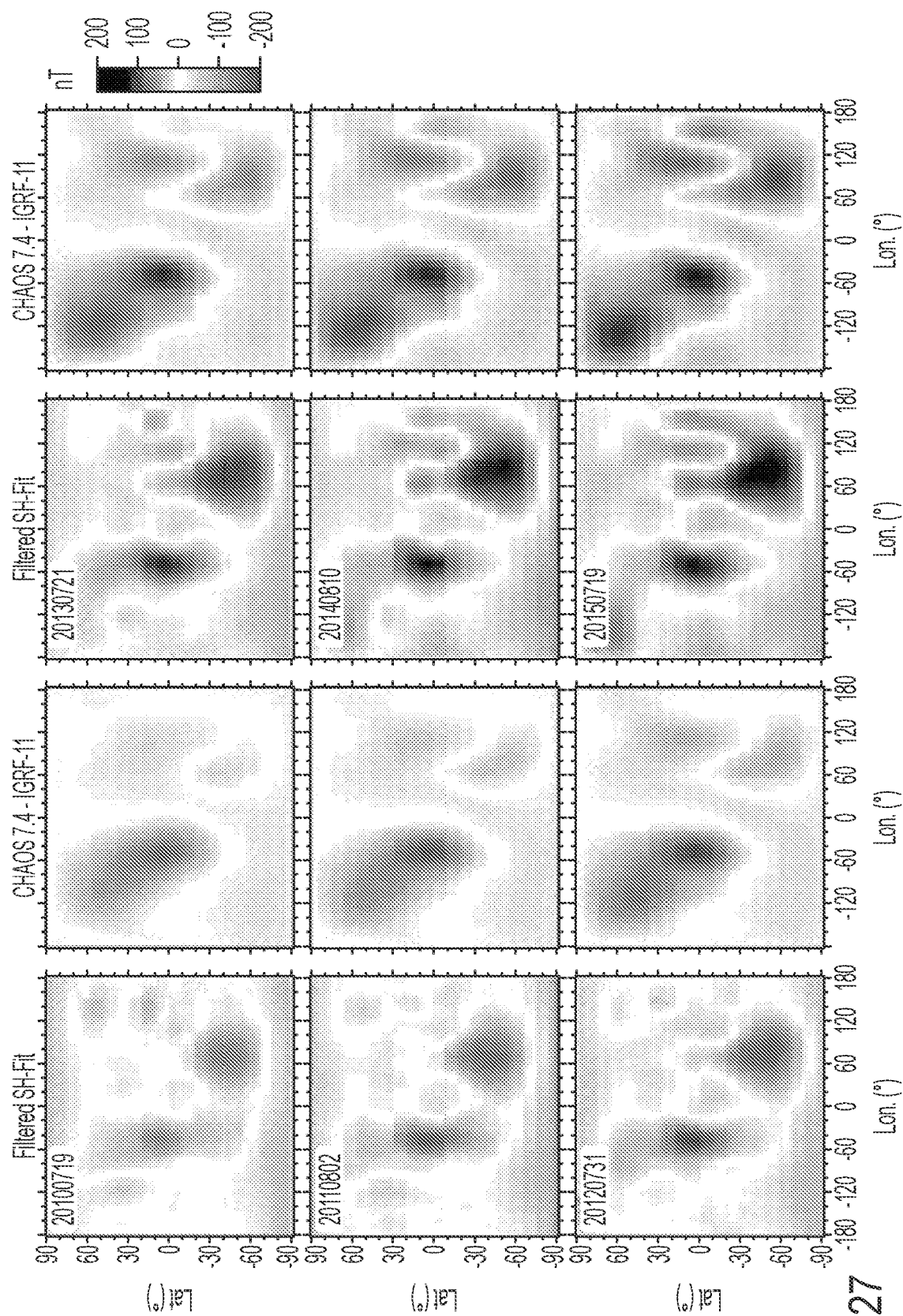
FIG. 27 illustrates maps of the radial component magnetic residuals, $\delta B_r$, relative to IGRF-11 from the filtered spherical harmonic coefficient time series and of CHAOS 7.4 minus IGRF-11 for six different quiet days, one for each year from 2010 through 2015. Dates were chosen to be close to 1 August of each year so the interval between successive maps is approximately one year. The Iridium results are shown in the first and third columns ('Filtered SH-Fit') and the CHAOS 7.4 results in the second and fourth columns ('CHAOS 7.4-IGRF 11'). The Iridium and CHAOS 7.4 results are shown side-by side for each date in columns one and two for 19 Jul. 2010, 2 Aug. 2011, and 31 Jul. 2012, and in columns three and four for 21 Jul. 2013, 10 Aug. 2014, and 19 Jul. 2015. Corresponding figures for the polar and azimuthal components, $\delta B_\theta$ and $\delta B_\phi$, are provided as shown in FIG. 28 and FIG. 29.

FIG. 14 illustrates example 10-minute intervals of AMPERE products in the same format as FIG. 12 from 23 May 2010 at 02:00-02:10 UT (top) during the quietest 24-hour period in FIG. 13 and 27 May 2010 at 12:00-12:10 UT (bottom) during the most active interval during the third quiet 24-hour period in FIG. 13.

It is instructive to contrast these quiet periods with the moderate storm time interval shown in FIG. 12. The examples of FIG. 14, in the same format as FIG. 12, are for 2010 May 23 at 02:00-02:10 UT (top) during the quietest interval of the 8-day span shown in FIG. 13 and for 2010 May 27 at 12:00-12:10 UT (bottom) during the least quiet of the three identified quiet periods. The first interval exhibits a cluster of perturbations near noon around 80°N magnetic latitude, typical of Birkeland currents during northward IMF (cf. Anderson et al., 2008), but there are no systematic signals equatorward of ~70° N magnetic latitude. The relatively small signals, <100 nT, at lower latitudes are typical for uncorrectable, that is, unidentified, noise and variations consistent with vehicle attitude uncertainty. For the case of 2010 May 27 at 12:00-12:10 UT, there are evident R1/2 currents poleward of ~67° N, at significantly higher latitudes than the active time currents in FIG. 12 but with signals below ~300 nT, which are less than $\sim 1/5^{th}$ of the more active time signals. This 2010 May 27 interval in FIG. 14 represents the most active conditions included in the quiet interval database, while the 2010 May 23 case in FIG. 14 is more typical of the quiet conditions for the database.

Figure 15:
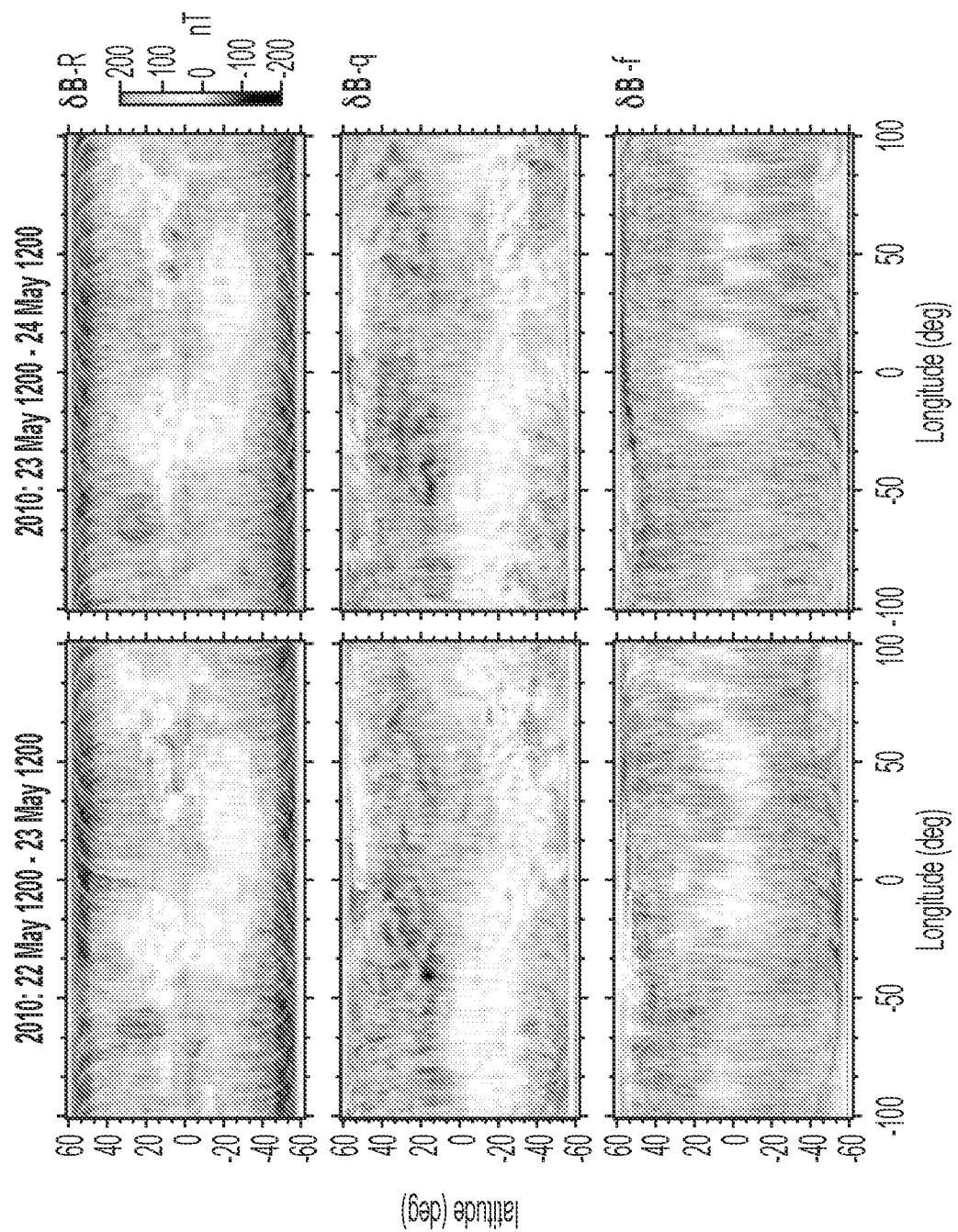
FIG. 15 illustrates calibrated magnetic field residuals from all Iridium Block 1 satellites in geographic spherical coordinates versus geographic latitude and longitude for 2010 May 22/12:00-2010 May 23/12:00 on the left and 2010 May 23/21:00-2010 May 24/21:00 on the right. The panels show all of the samples from every satellite, ~290,000 points, plotted as dots. From top to bottom the panels show $\delta B_r$, $\delta B_\theta$, and $\delta B_\phi$, all using the same scale.

FIG. 15 illustrates calibrated magnetic field residuals from all Iridium Block 1 satellites in geographic spherical coordinates versus geographic latitude and longitude for 2010 May 22/12:00-2010 May 23/12:00 on the left and 2010 May 23/21:00-2010 May 24/21:00 on the right. The panels show all of the samples from every satellite, ~290,000 points, plotted as dots. From top to bottom the panels show $\delta B_r$, $\delta B_\theta$, and $\delta B_\phi$, all using the same scale.

The first step in pre-processing the calibrated Iridium data for study of Earth's main field is to transform the data into geographic coordinates and assess whether the data seem to be ordered by geographic location. The second step is to examine the distributions of the residuals to assess whether the errors appear to be random, and to evaluate their averages in suitable latitude-longitude ranges and estimate the errors in the means for each bin. The first indication that the Iridium constellation data may record useful information on Earth's main magnetic field was the presence of consistent patterns when plotting the residuals transformed to spherical geographic coordinates, $\delta B_r$ (radial), $\delta B_\theta$ (polar angle positive southward), and $\delta B_\phi$ (azimuthal positive eastward), and registered in geographic latitude and longitude. Two examples of the residuals obtained from the two nearly consecutive quiet intervals shown in FIG. 13 are shown in FIG. 15. The plot shows all of the samples from every satellite, totaling ~290,000 points, plotted as colored dots for 2010 May 22/12:00-2010 May 23/12:00 on the left and 2010 May 23/21:00-2010 May 24/21:00 on the right. One significant point to note is that the distributions of $\delta B$ in FIG. 15 are not a random mixture of positive and negative values but appear to be organized into coherent regions. For example, the $\delta B_r$ pattern for both quiet periods show several broad, 60°-wide longitude bands of positive values, one from -90° to -30° E and 0° to 30° N latitude, another from 0° to 90° E and -45° to 0° N, and a third from about 120° to 180° E and 0° to 60° N. The $\delta B_\theta$ distributions show a broad positive band in the southern hemisphere and a region of northward (negative) field from -90° to 0° E and 20° to 60° N. In addition, these general patterns are consistent between the two quiet periods. The signals that are the least consistent between the two days are at high latitudes, poleward of 70° N in $\delta B_\phi$ in the northern hemisphere, arising from the Birkeland current signals (cf. FIG. 14).

Figure 16:
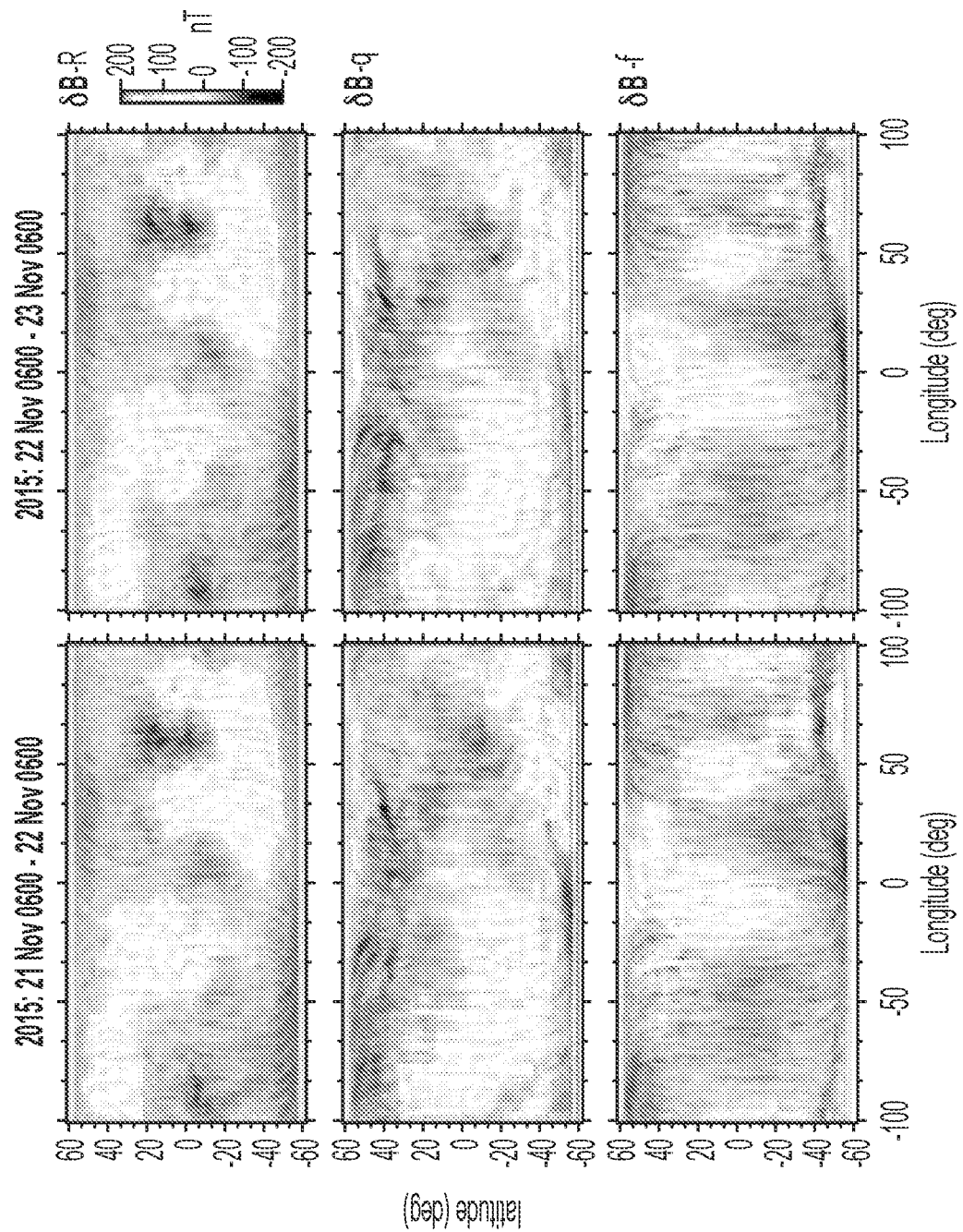
FIG. 16 illustrates calibrated magnetic field residuals from all Iridium Block 1 satellites in the same format as FIG. 15 for 2015 Nov. 21/06:00-2015 Nov. 22/06:00 on the left and 2015 Nov. 22/06:00-2015 Nov. 23/06:00 on the right. As for FIG. 15, but more evident here owing to the larger residual magnitudes, the dots are small enough that the white space between tracks of points are predominantly blank spaces between tracks of samples.

FIG. 16 illustrates calibrated magnetic field residuals from all Iridium Block 1 satellites in the same format as FIG. 15 for 2015 Nov. 21/06:00-2015 Nov. 22/06:00 on the left and 2015 Nov. 22/06:00-2015 Nov. 23/06:00 on the right. As for FIG. 15, but more evident here owing to the larger residual magnitudes, the dots are small enough that the white space between tracks of points are predominantly blank spaces between tracks of samples.

Results from two additional consecutive quiet periods from November 2015 are shown in FIG. 16. These intervals from 2015 Nov. 21/06:00-2015 Nov. 22/06:00 and 2015 Nov. 22/06:00-2015 Nov. 23/06:00 exhibit larger residuals with very clear patterns consistent between the two days, but ones that are quite different from the patterns shown in FIG.

15. In $\delta B_r$ distributions there are three regions of positive residuals, one between 40°-70° N and −180° to −90° E, a second centered on −45° E and 10° N spanning about 40° in longitude and latitude, and a third roughly 'U'-shaped region from 30° E to 180° E with a strongest band at about 50° S spanning 60° to 120° E. In the equatorial zone, 30° S to 30° N, the $\delta B_r$ has a roughly 3-wave structure with longitude. The $\delta B_\theta$ distributions show intense positive residuals at high southern latitudes, poleward of 60° S from 30° E to 120° E, a broad zone of moderately positive residuals from −180° E to 0° E south of about 30° N, and an arc of negative $\delta B_\theta$ from ~70° N at −180° E extending across 0° E at 60° N and to 20° S at 90° E. The slightly sinusoidal shaped high-latitude Birkeland current signatures are most evident in the southern polar region in $\delta B_\phi$ poleward of 60° S, but $\delta B_\phi$ also exhibits a roughly wave-like pattern of residuals across all longitudes extending from about 30° S to 30° N. The peaks in the equatorial $\delta B_\phi$ residuals correspond roughly to midpoints between extrema in a similar 3-wave pattern in the $\delta B_r$. As with the pair of quiet intervals from May 2010, these two periods in November 2015 illustrate a highly coherent pattern in the $\delta B$ when registered in geographic latitude and longitude, as well as a remarkable consistency between the two periods. The magnitudes of the residuals are substantially greater in November 2015 than they were in May 2010, indicating that the secular variation extrapolation from 1 Jan. 2010 used in the IGRF-11 model may be departing more substantially in the later years. The remarkable feature of these examples is that these global maps were obtained in just a single day of observations and yield highly consistent results.

Figure 17:
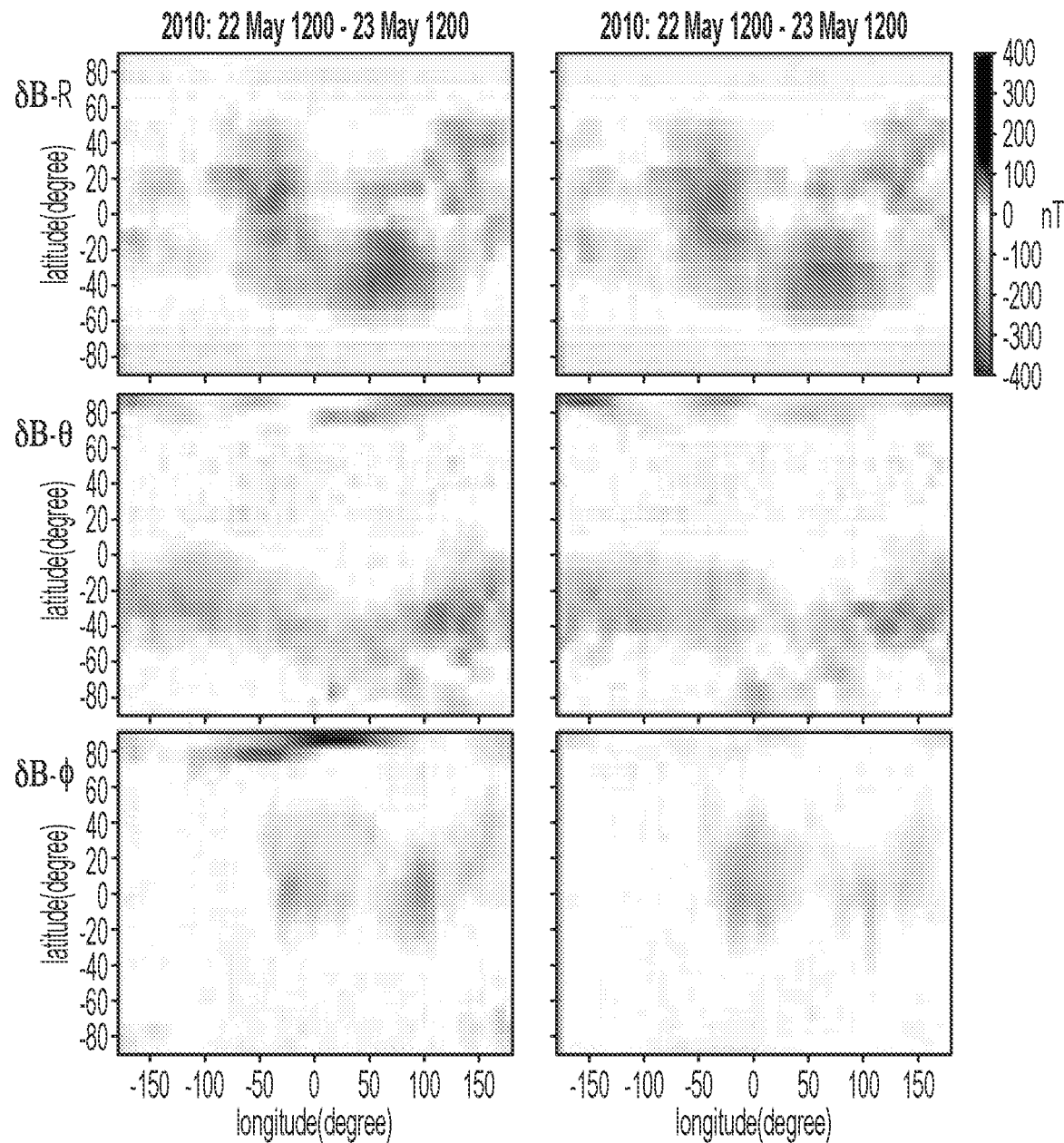
FIG. 17 illustrates global maps of averaged magnetic field residuals relative to IGRF-11 in geographic spherical coordinates from all Iridium Block 1 satellite observations in 9° by 9° latitude-longitude bins. Left panels show results for the 24-hour quiet period starting at 12:00 UT on 22 May 2010 and the right panels show results for the 24-hour quiet period immediately following, starting at 21:00 UT on 23 May 2010.

FIG. 17 illustrates global maps of averaged magnetic field residuals relative to IGRF-11 in geographic spherical coordinates from all Iridium Block 1 satellite observations in 9° by 9° latitude-longitude bins. Left panels show results for the 24-hour quiet period starting at 12:00 UT on 22 May 2010 and the right panels show results for the 24-hour quiet period immediately following, starting at 21:00 UT on 23 May 2010.

Figure 18:
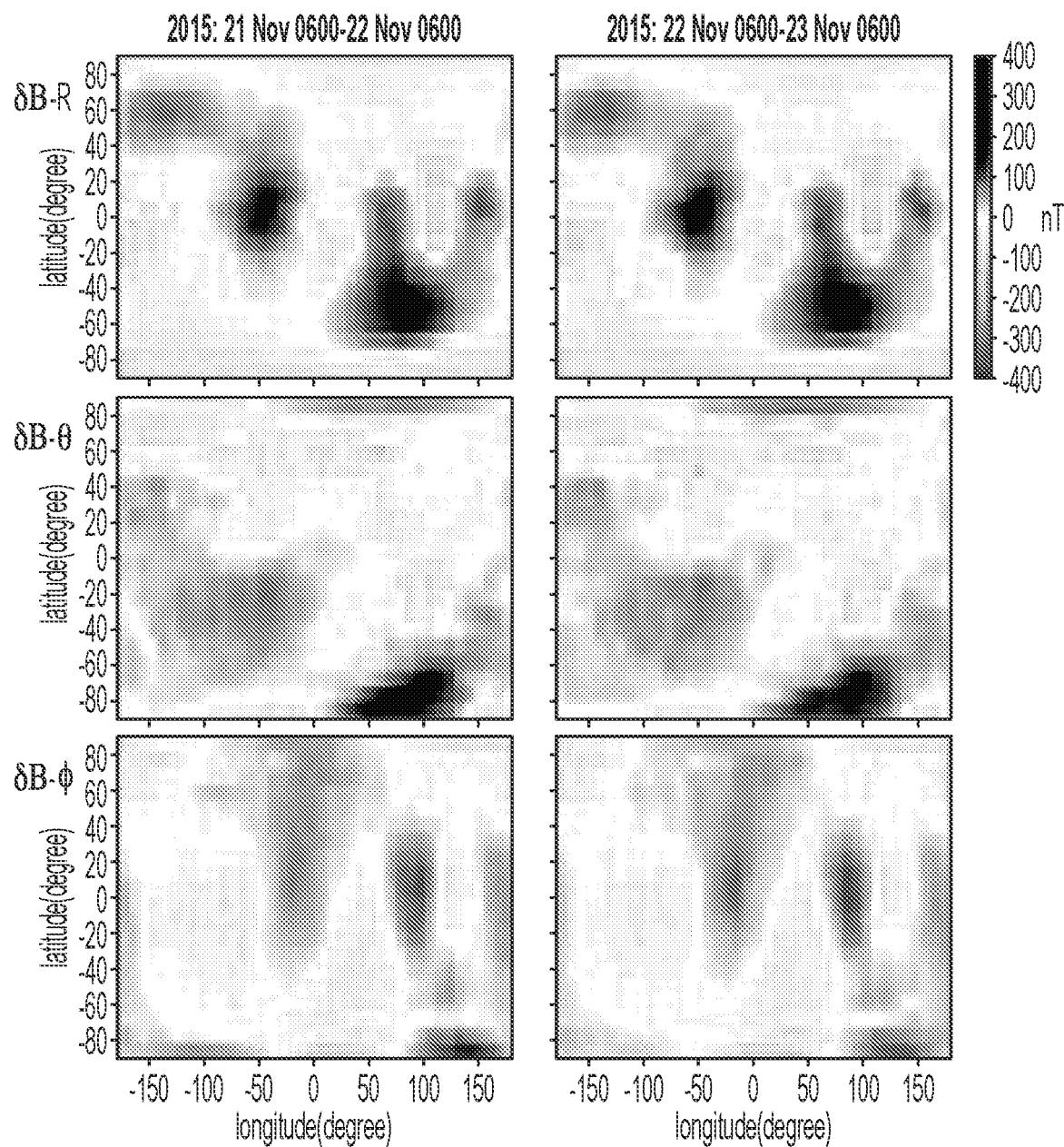
FIG. 18 illustrates global maps of averaged magnetic field residuals in the same format as FIG. 9. Left panels show results for the 24-hour quiet period starting at 06:00 UT on 21 Nov. 2015 and the right panels show results for the next 24-hour quiet period, starting at 06:00 UT on 22 Nov. 2015.

FIG. 18 illustrates global maps of averaged magnetic field residuals in the same format as FIG. 9. Left panels show results for the 24-hour quiet period starting at 06:00 UT on 21 Nov. 2015 and the right panels show results for the next 24-hour quiet period, starting at 06:00 UT on 22 Nov. 2015.

To assess the statistical uncertainties and confidence of the mean perturbations in the geographical patterns found in FIG. 15 and FIG. 16, we first divided the observations into 20 latitude and 40 longitude bins, each 9° in latitude by 9° in longitude. The bin size is a trade-off between maximizing the statistics in each bin, which favors larger bins, and retaining enough spatial resolution to resolve wavelengths at least as short as the distance from the core to the satellite altitude. For Iridium altitude, the core is about 3800 km below the satellites, and this wavelength corresponds to an azimuthal order of ~12 at the equator. The 9°×9° bin size allows a harmonic decomposition up to degree and order 20. Given the average number of samples obtained in one day by the 66 Iridium Block 1 satellites, a typical number of ~360 samples comprise each latitude-longitude bin. All of the $\delta B$ measurements within each bin are averaged for each quiet period. Because the Iridium satellites are in near polar orbits, the number of samples in each bin is nearly uniform with latitude even though the area of the bins decreases toward the poles. The bin averages for the 2010 May 22-23 and 2010 May 23-24 quiet intervals are shown in FIG. 17. Similarly, averages for 2015 Nov. 21-22 and 2015 Nov. 22-23 are shown in FIG. 18. For both sets of quiet periods, the bin averages reveal that the patterns from the individual observations throughout the satellite orbits are consistently present in the means. The perturbation regions are also more clearly evident, and there is consistency, even in relatively small-scale features (i.e., below 20° in latitude and longitude), between successive days.

Figure 19:
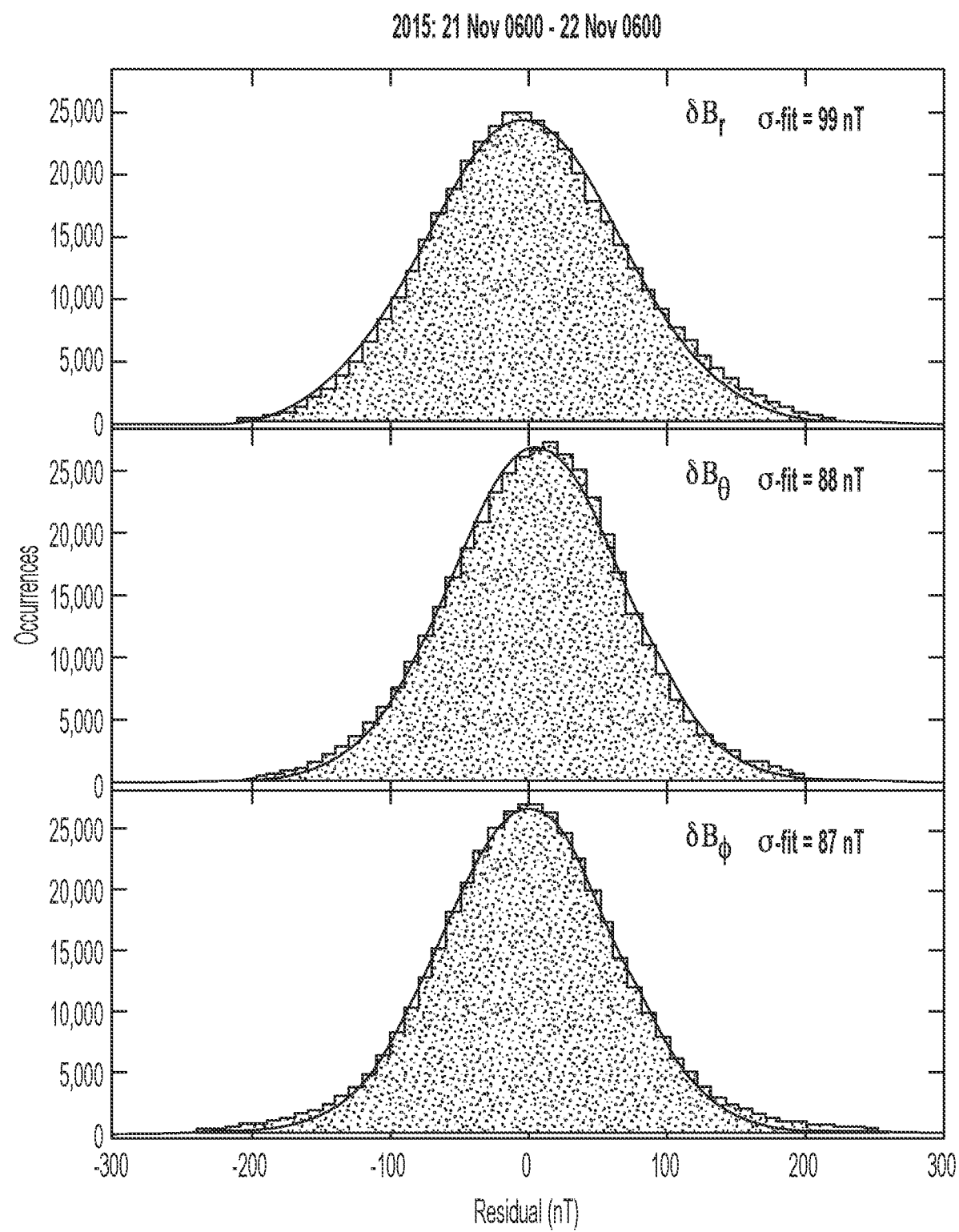
FIG. 19 illustrates histogram distributions of residuals for $\delta B_r$, $\delta B_\theta$, and $\delta B_\phi$ for the geomagnetically quiet period from 2015 Nov. 21/06:00 to 2015 Nov. 22/06:00. The probability distribution for each component (bars) is fit with a Gaussian distribution (line). The standard deviation of each fits is given in each panel.

FIG. 19 illustrates histogram distributions of residuals for $\delta B_r$, $\delta B_\theta$, and $\delta B_\phi$ for the geomagnetically quiet period from 2015 Nov. 21/06:00 to 2015 Nov. 22/06:00. The probability distribution for each component (bars) is fit with a Gaussian distribution (line). The standard deviation of each fits is given in each panel.

Figure 20:
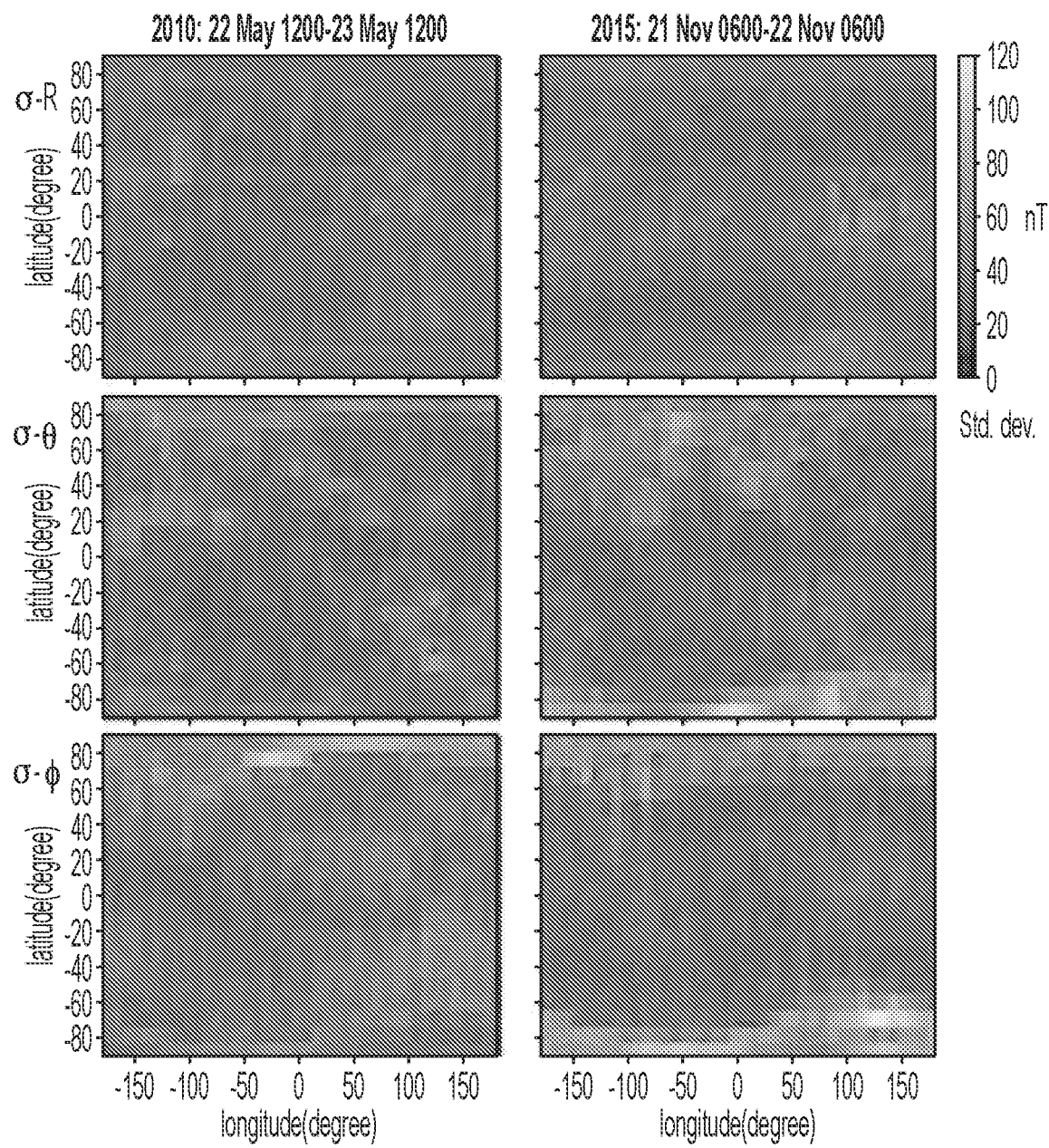
FIG. 20 illustrates standard deviations, $\sigma$, of the magnetic field residuals within each latitude-longitude bin for the 2010 May 22/12:00-2010 May 23/12:00 (left panels) and 2015 Nov. 21/06:00-2015 Nov. 22/06:00 quiet intervals (right panels). The standard deviation value for each component for both quiet periods is indicated by the scale.

FIG. 20 illustrates standard deviations, $\sigma$, of the magnetic field residuals within each latitude-longitude bin for the 2010 May 22/12:00-2010 May 23/12:00 (left panels) and 2015 Nov. 21/06:00-2015 Nov. 22/06:00 quiet intervals (right panels). The standard deviation value for each component for both quiet periods is indicated by the scale.

To assess the residual distributions relative to the means we examined the distribution of all residuals for individual quiet periods. As an example of this assessment, the distributions for all measurements of $\delta B_r$, $\delta B_\theta$, and $\delta B_\phi$ are shown for a quiet interval from 2015 Nov. 21-22 in FIG. 19. The Gaussian fit to each distribution very closely follows the actual data distribution, indicating that the data are primarily normally distributed. Similar Gaussian distributions are obtained when considering the averaged data within each latitude-longitude bin. The normal character of the distributions is consistent with a random error due to the attitude determination uncertainty of ~80 nT. The standard deviations for each latitude-longitude bin for 2010 May 22/12:00-2010-05-23/12:00 and for 2015 Nov. 21/06:00-2015 Nov. 22/06:00 are shown in FIG. 20. The standard deviations within each bin range from about 40 nT to 100 nT with the highest values in the polar latitudes (i.e., higher than ±60°), corresponding to the auroral zones and so reflecting the variability of the natural signals there. For the 262 quiet day events with complete data, there were two days for which the standard deviation of the residuals were more than five times greater than all of the other days which was attributed to operations activities on the satellites. Excluding these two days from the data set leaves 260 quiet days with complete data and distributions comparable to those shown here.

Figure 21:
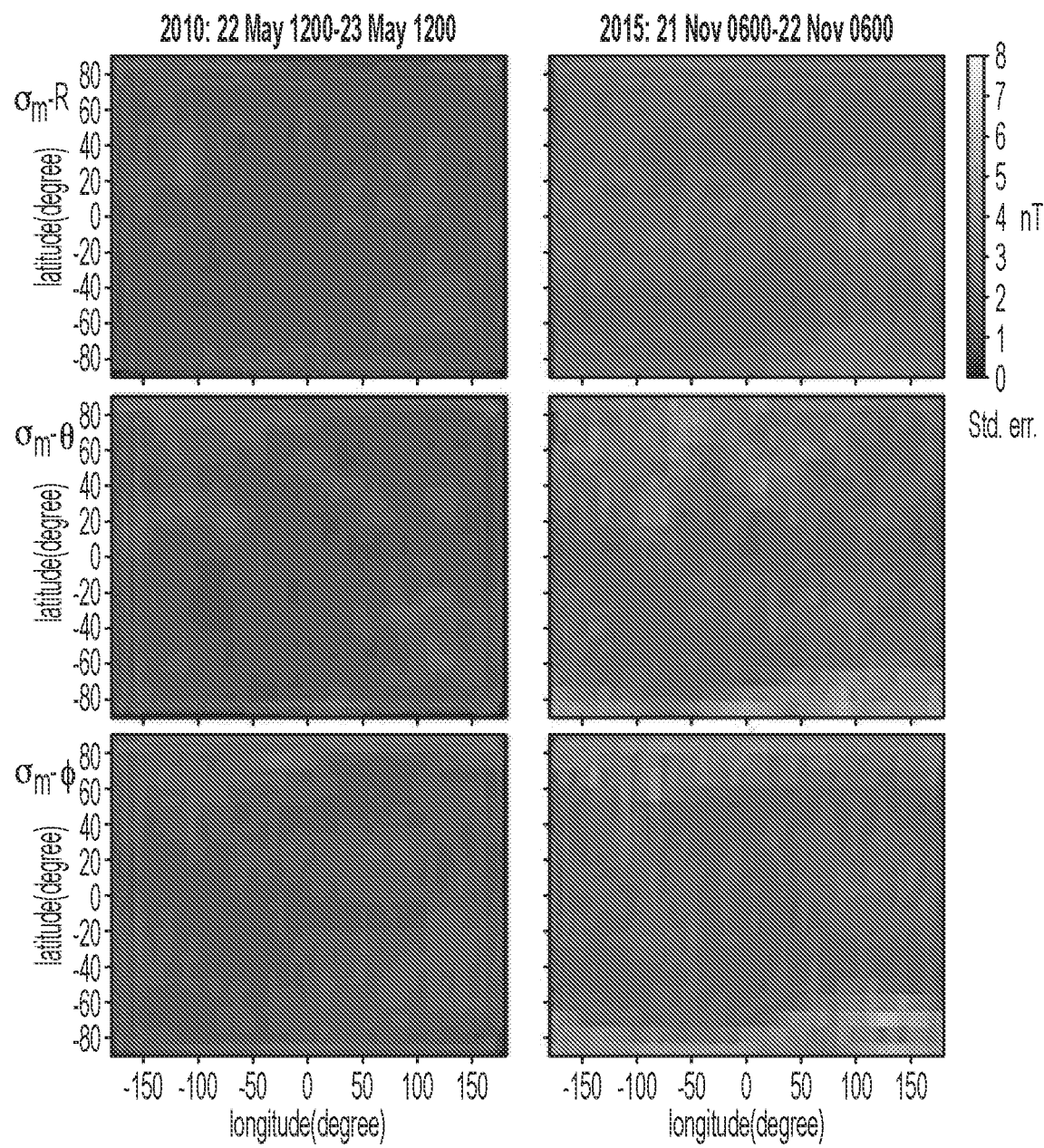
FIG. 21 illustrates standard error of the mean, $\sigma_m$, of the averaged magnetic field residuals within each latitude-longitude bin for the 2010 May 22/12:00-2010 May 23/12:00 (left panels) and 2015 Nov. 21/06:00-2015 Nov. 22/06:00 quiet intervals (right panels). The standard error value for each component for both quiet periods is indicated by the scale.

FIG. 21 illustrates standard error of the mean, $\sigma_m$, of the averaged magnetic field residuals within each latitude-longitude bin for the 2010 May 22/12:00-2010 May 23/12:00 (left panels) and 2015 Nov. 21/06:00-2015 Nov. 22/06:00 quiet intervals (right panels). The standard error value for each component for both quiet periods is indicated by the scale.

For potential use in specifying the main field, the standard deviation of measurements in each bin is less important than the uncertainty of the mean. With about 350 points in each bin, the standard error in the mean is roughly a factor of 18 smaller than the standard deviation. Maps of the standard errors in the mean are shown in FIG. 21 for the same two intervals and in the same format. The standard errors are generally below 3 nT for the May 2010 case and between 3 and 5 nT for the November 2015 case shown in FIG. 20. The increase in the standard errors is primarily due to the fact that there were somewhat fewer satellites operating in fine attitude control mode as the Block 1 satellites were experiencing degraded performance of some subsystems, and hence there were somewhat fewer magnetic field measurements in the analysis.

To examine the temporal behavior of the patterns in the residuals we constructed spherical harmonic representations of each quiet period and investigated the time dependence of the harmonic coefficients. The spherical harmonic functions $Y_{lm}(\theta,\phi)$ are orthonormal basis functions on a spherical surface which means the following:

$$\int_0^{2\pi} d\phi \int_0^{\pi} \sin(\theta) d\theta Y_{l_1 m_1} Y_{l_2 m_2} = \delta_{l_1 l_2} \delta_{m_1 m_2} \quad (13)$$

where * denotes the complex conjugate and $\delta_{ij}$ is the Kronecker delta function. Expressing $Y_{lm}$ in terms of the associated Legendre function, $P_{lm}(x)$, $$Y_{lm}(\theta,\phi) = a_{lm} P_{lm}(\cos\theta) e^{im\phi} \quad (14)$$

where the $a_{lm}$ are the normalization coefficients, one can also write $$\int_0^{2\pi} d\phi \int_0^{\pi} \sin(\theta) d\theta a_{l_1 m_1} P_{l_1 m_1}(\cos\theta) \cos(m_1\phi) a_{l_2 m_2} P_{l_2 m_2}(\cos\theta) \cos(m_2\phi) = \delta_{l_1 l_2} \delta_{m_1 m_2} \quad (15a)$$

$$\int_0^{2\pi} d\phi \int_0^{\pi} \sin(\theta) d\theta a_{l_1 m_1} P_{l_1 m_1}(\cos\theta) \sin(m_1\phi) a_{l_2 m_2} P_{l_2 m_2}(\cos\theta) \sin(m_2\phi) = \delta_{l_1 l_2} \delta_{m_1 m_2} \quad (15b)$$

which explicitly separates the sine and cosine terms. Here we use the convention that m=0 to l (rather than m=−l to l), so the normalization coefficients are $$a_{l0} = \sqrt{\frac{(2l+1)}{4\pi}} \quad \text{for } m = 0 \quad (16a)$$

$$a_{lm} = \sqrt{\frac{(2l+1)(l-m)!}{2\pi(l+m)!}} \quad \text{for } m > 0. \quad (16b)$$

The convenience of equation 15 is that it allows one to calculate the coefficients contributing to the patterns of the residuals directly from convolution integrals. Given the maps for $\delta B_r(\theta,\phi,t_i)$, $\delta B_\theta(\theta,\phi,t_i)$, and $\delta B_\phi(\theta,\phi,t_i)$ for each quiet interval, denoted $t_i$, the harmonic coefficients for each pattern are given by $$c_{lm}(t_i) = \int_0^{2\pi} d\phi \int_0^{\pi} \sin(\theta) d\theta \delta B(\theta,\phi,t_i) a_{lm} P_{lm}(\cos\theta) \cos(m\phi) \quad (17a)$$

$$s_{lm}(t_i) = \int_0^{2\pi} d\phi \int_0^{\pi} \sin(\theta) d\theta \delta B(\theta,\phi,t_i) a_{lm} P_{lm}(\cos\theta) \sin(m\phi) \quad (17b)$$

These integrals were evaluated by summing the average $\delta B$ in each 9° by 9° bin multiplied by the spherical harmonic evaluated at the bin center latitude and longitude and multiplied by the bin solid angle. The integrals are evaluated using a discrete sum which was checked with a unity argument in the integrand which yielded $4\pi$ to within 0.1%. The coefficient values are mostly below 10 nT and all below ~50 nT, so the errors in the coefficients are typically less than 0.01 nT and all less than 0.05 nT. The convolution also assumes that all of the data are from the same spherical shell, which is not strictly true. The Iridium satellites are in slightly eccentric orbits: the maximum and minimum altitudes differ from the mean by 9 km, a difference in geocentric distance of 0.13%. For the low degree coefficients for which the amplitudes reach 50 nT, this leads to errors not larger than ~0.2 nT. For l=13, the maximum error from the spherical shell approximation increases to 1.9% but the coefficients are all below 5 nT so the errors in the results are below 0.1 nT. The bin angular sizes allow for evaluation of coefficients up to degree and order 20, but the time series in the coefficients above degree 13 did not exhibit systematic trends above the noise level in the results over the five years analyzed here.

The coefficients given by these convolution integrals are the coefficients of the expansion of the patterns in each component in terms of spherical harmonics and must be distinguished from the conventional Gauss coefficients that are used to express the Earth's field in IGRF, WMM, and other main field models. Neither a radial dependence nor constraints that the coefficients in Equation 17a-b correspond to physical solutions for Earth's field are implied. For instance, there is no constraint that the $c_{00}(t_i)$ be zero, which allows for identification of spurious signals in the results. The $c_{lm}(t_i)$ and $s_{lm}(t_i)$ are a convenient way to represent the patterns for each quiet period and allow us to examine the time variation of the coefficients to identify systematic behavior of different angular and temporal scales. From the time series of the coefficients, artifacts in the dataset can be pinpointed and removed from the $c_{lm}(t_i)$ and $s_{lm}(t_i)$. Revised maps of field perturbations, from which unphysical artifacts are subtracted can also be reconstructed.

Figure 22A:
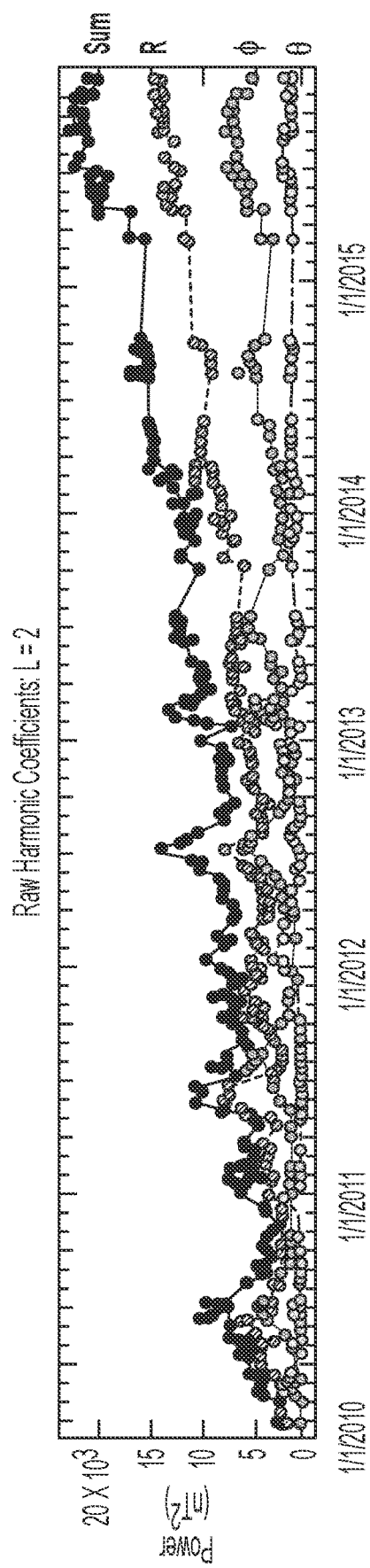
FIG. 22A-FIG. 22G illustrate a time series of the spherical harmonic coefficients $c_{lm}(t_i)$ and $s_{lm}(t_i)$ for/=2. Top panel (FIG. 22A) shows the total power in $nT^2$ summed over m=0, 1, and 2 for all components, r only, $\theta$ only, and $\phi$ only. The bottom six panels show in order from top: $c_{r,lm}$, $s_{r,lm}$ (FIG. 22B and FIG. 22C), $c_{\theta,lm}$, $s_{\theta,lm}$ (FIG. 22D and FIG. 22E), and $c_{\phi,lm}$, $s_{\phi,lm}$ (FIG. 22F and FIG. 22G). The coding in the bottom six panels are for m=0, for m=1, and for m=2. Panel 2 also shows the l=0 cosine coefficient, $c_{r00}$, which is an unphysical signal.
Figure 22B:
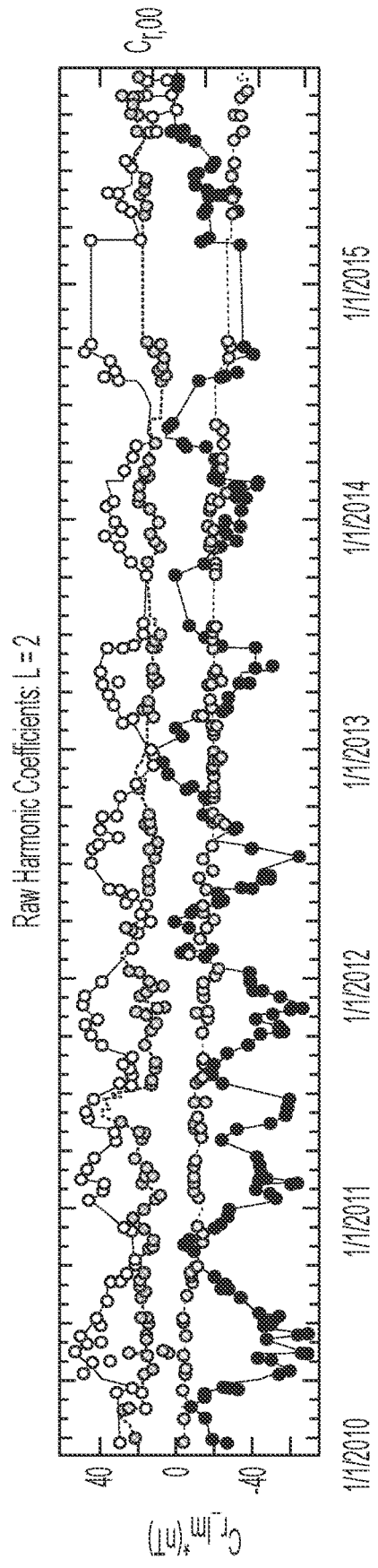
Figure 22C:
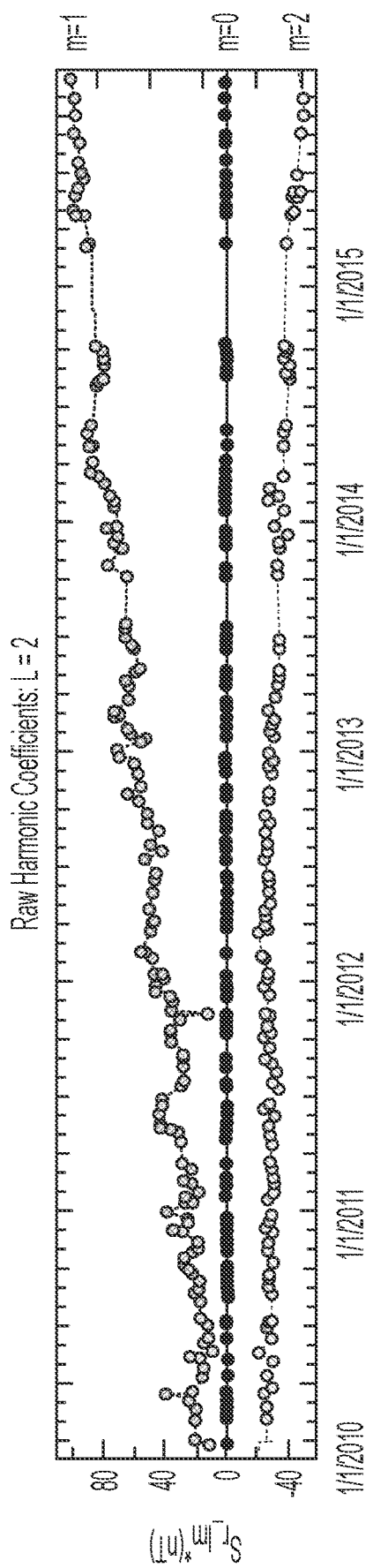
Figure 22D:
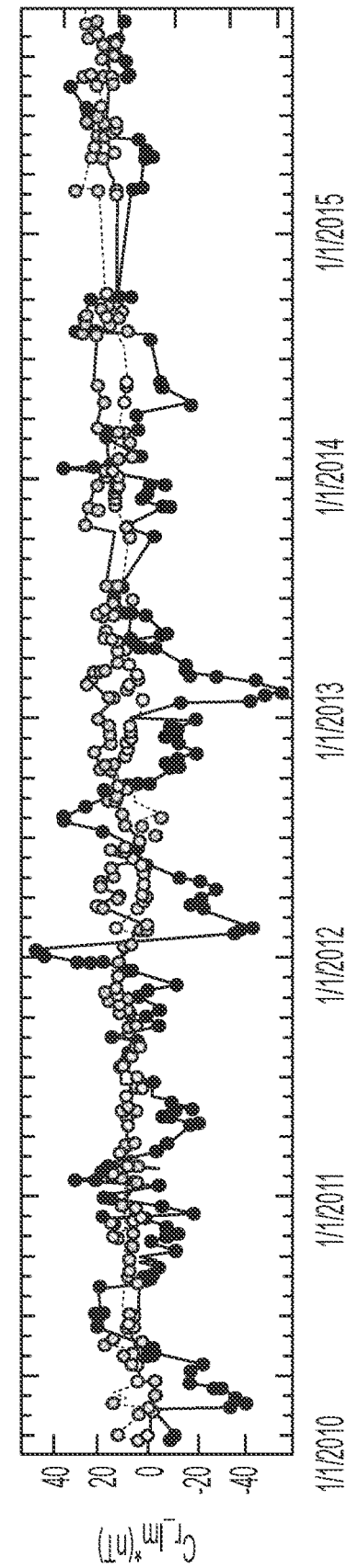
Figure 22E:
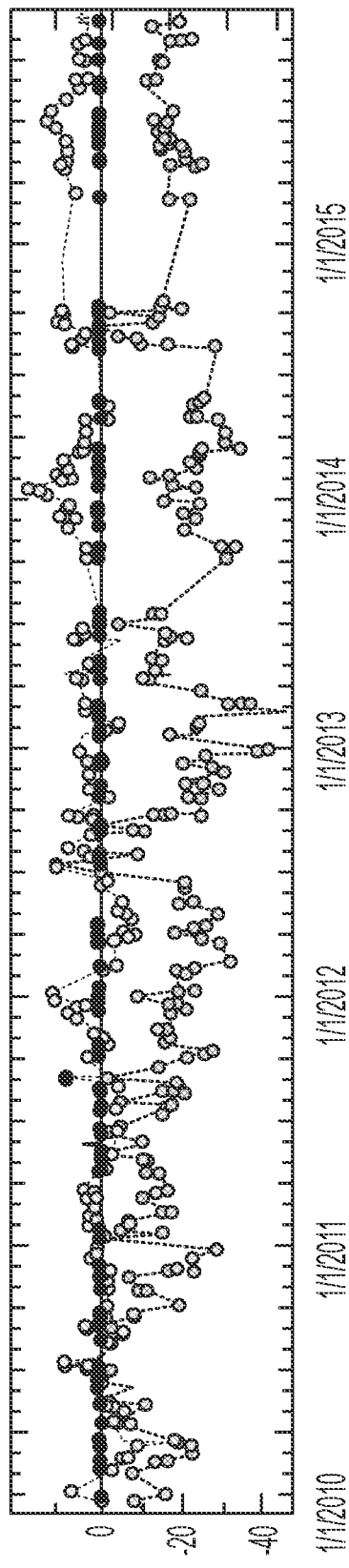
Figure 22F:
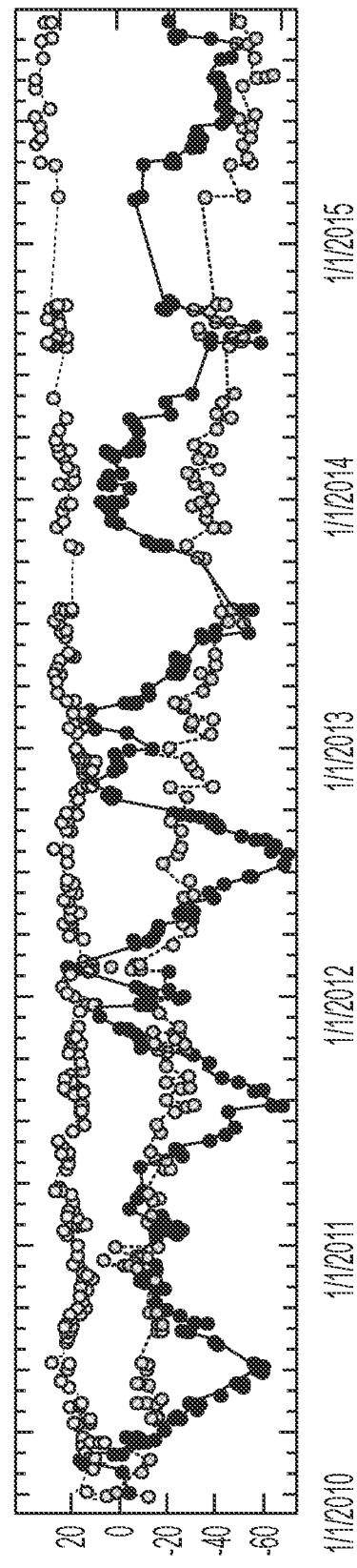
Figure 22G:
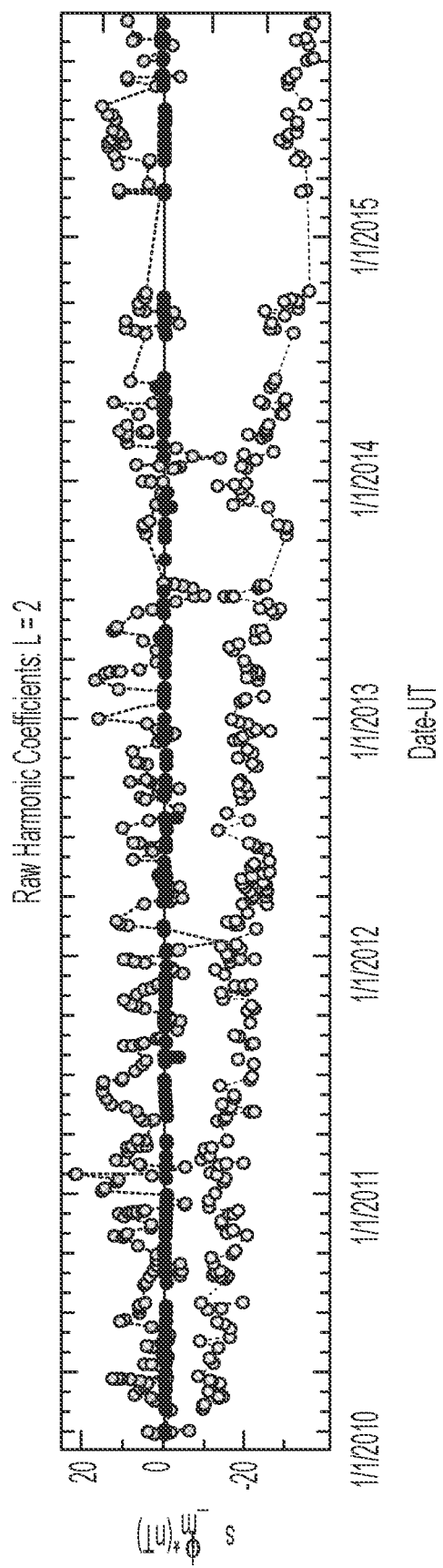

FIG. 22A-FIG. 22G illustrate a time series of the spherical harmonic coefficients $c_{lm}(t_i)$ and $s_{lm}(t_i)$ for l=2. Top panel (FIG. 22A) shows the total power in $nT^2$ summed over m=0, 1, and 2 for all components, r only, $\theta$ only, and $\phi$ only. The bottom six panels show in order from top: $c_{r,lm}$, $s_{r,lm}$ (FIG. 22B and FIG. 22C), $c_{\theta,lm}$, $s_{\theta,lm}$ (FIG. 22D and FIG. 22E), and $c_{\phi,lm}$, $s_{\phi,lm}$ (FIG. 22F and FIG. 22G). The coding in the bottom six panels are m=0, m=1, and lm=2. Panel 2 also shows the l=0 cosine coefficient, $c_{r00}$, in gray, which is an unphysical signal.

As an example, the time series of $c_{lm}(t_i)$ and $s_{lm}(t_i)$ for l=2 over the entire span of the quiet interval data are shown in FIG. 22A-FIG. 22G. The figure also shows the $c_{r,00}$ time series with gray lines and open circles. Because $c_{r,00}$ corresponds to a magnetic charge it is clearly unphysical and we use the time series of $c_{r,00}$ as one indicator of artifacts in the signals. One of the most striking features of the time series are annual and shorter period (~8 months) variations in the coefficient amplitudes, primarily in the m=0 coefficients. The annual signal is most clear in the $c_{\phi,20}$ (black dots and lines in FIG. 22F). (Note that hereinafter we omit the '$(t_i)$' for simplicity although the time series is always implied.) The shorter period, 8-month signal, is clearest in $c_{r,20}$ (black dots and lines in FIG. 22B). We note that the $s_{20}$ are identically zero by definition. Other non-zero coefficients indicate variations at similar periods, for example $c_{\theta,20}$, $s_{r,21}$, $s_{\theta,21}$, and $c_{\phi,22}$. Other coefficients show very little of these periodicities and exhibit slower trends, indicative of departures from secular variation, for example in $c_{r,22}$, $s_{r,21}$, $s_{r,22}$, $c_{\phi,21}$, and $s_{\phi,22}$. The amplitudes of the slow variations and of the periodic signals are all on the order of ~10 to 80 nT, down to levels below the magnetometer digitization of 30 nT, consistent with the several nT statistical errors of the means of the average field in each latitude-longitude bin.

The 12-month period suggests a variation in magnetometer response with season, that is, with mean solar exposure around the orbit. The 86° inclination orbits have an 8-month local time precession period, so that this is the periodicity in the local time of orbital ascending/descending node. The 8-month period variation in $c_{r,20}$ suggests that there is a bias in the magnetometer response with the solar illumination history around the orbit and this is confirmed by a very similar signal in $c_{r,00}$. A possible contribution to this bias is the temperature calibration for the magnetometers, which was applied in Iridium pre-processing on board the satellites. However, we found no systematic variation of the $\delta B_{SC}$ with magnetometer temperature, consistent with the correct application of this calibration. Nonetheless, a response with the annual and precession periods is evident in many coefficients and might be related to temperature gradients at the magnetometer or other dynamic thermal characteristics of the vehicles. With the data available at this time it is not possible to fully diagnose what causes these signals, but the correlation with the 8-month orbit and 12-month seasonal periods imply that these signals are most likely artifacts, and in an abundance of caution we treat them as such. That artifacts are present in the data was clear as the $c_{q,00}$ were not identically zero. Particularly for $c_{r,00}$, the $c_{00}$ have amplitudes and periods comparable to those of FIG. 20.

The presence of a monopole signal may seem alarming at first, although one must remember that the convolution approach applies no physical constraints on the coefficients. In fact, the l=0 terms are useful diagnostics. The $c_{r,00}$ signals are attributed to offsets in $\delta B_{r,SC}$: since the spacecraft fly maintaining a nadir orientation, the r-component is always radial and hence an error in the zero level will appear in $c_{r,00}$. It is worth noting that the calibration approach which identifies the zero levels from the time series data can give a spurious baseline since the convolution integral of Equation 16 for l=0 is essentially a mean, weighted by the solid angle since $Y_{00}$ is a constant. Hence, the time series analysis for the offsets and $c_{r,00}$ are actually different, and this accounts for the residual artifact in $c_{r,00}$ arising from time variations in the zero level around the orbit. If the instrument zero levels were constant, the time series offset would be correct and the convolution results would be zero. This information therefore serves as a diagnostic of these orbit variation artifacts.

Figure 23:
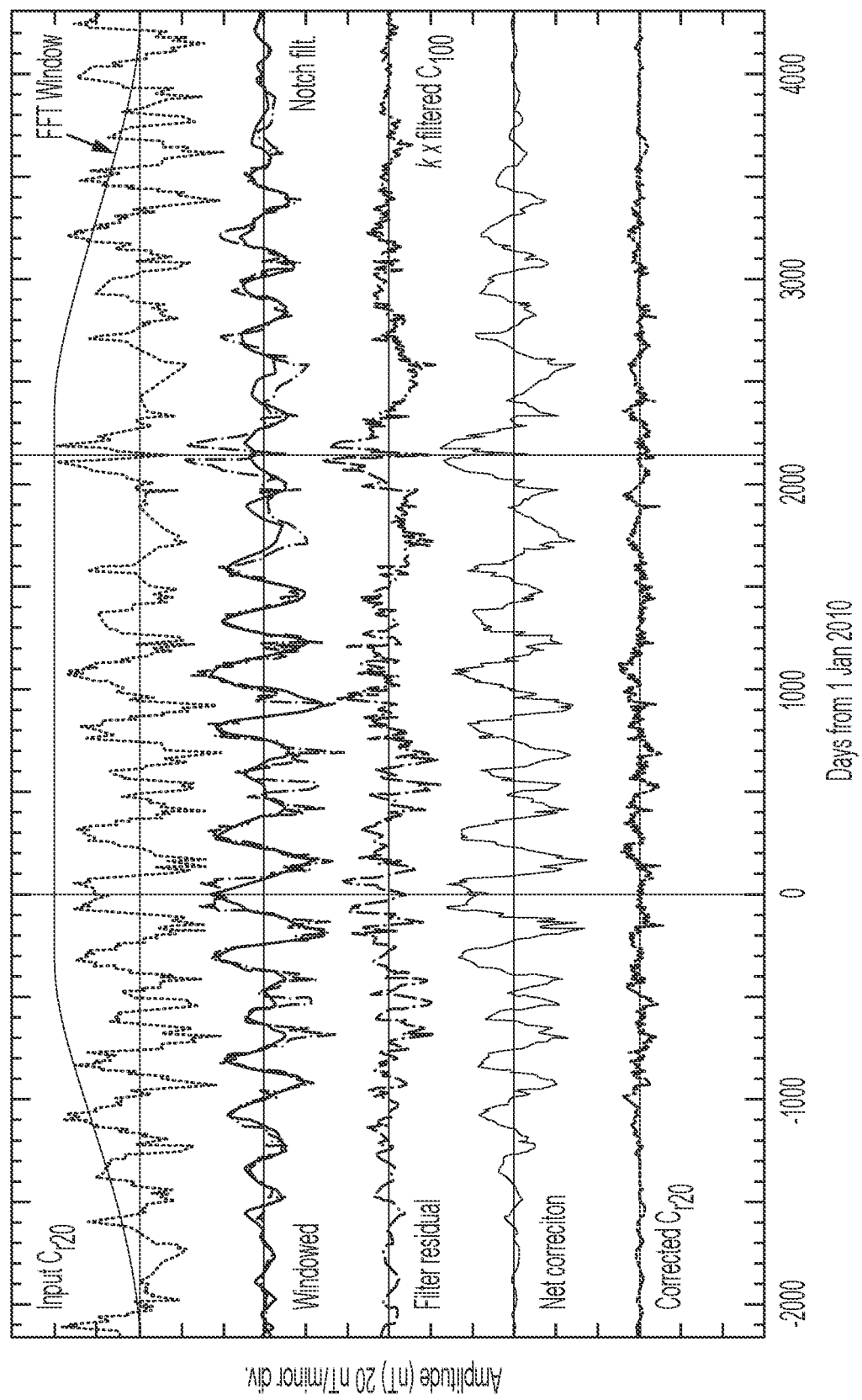
FIG. 23 illustrates correction analysis sequence for $c_{r,20}$. Vertical lines indicate the time span of the original input data (i.e., 0 to 2190 days from 1 Jan. 2010). From top to bottom the traces show: detrended and mirrored time series (red, 'Input $c_{r20}$') together with the custom time window function ('FFT Window'); windowed extended time series data, 'Windowed') and notch filter signal ('Notch filt.'); time series with notch filtering applied, i.e., the residual between the traces ('Filter residual') and the linear correlation with the $c_{r,00}$ time series where k is the slope fit coefficient ('k×filtered $c_{r00}$'); net correction for the input time series (thin black line, 'Net correction'); and the net signal with identified artifacts removed ('Corrected $c_{r20}$').
Figure 24A:
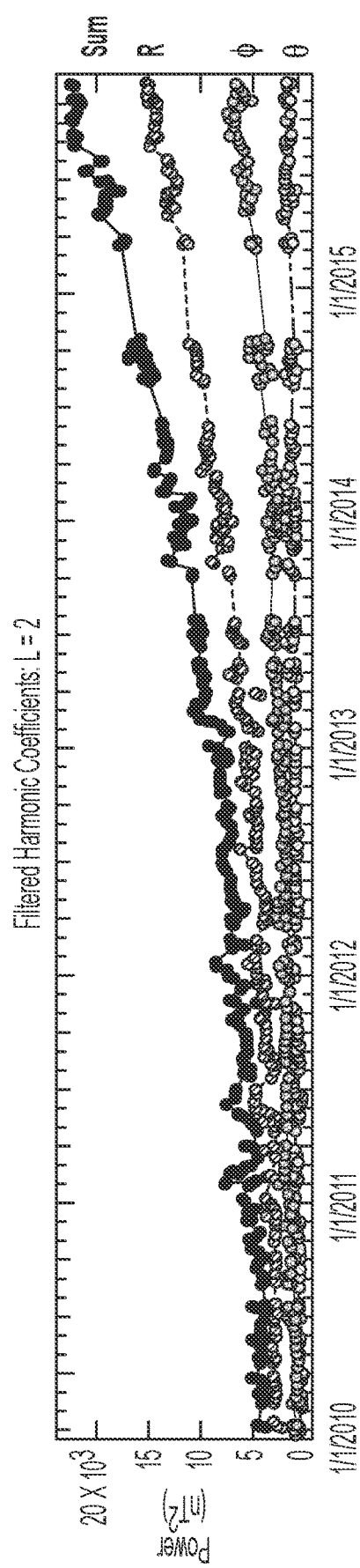
Figure 24B:
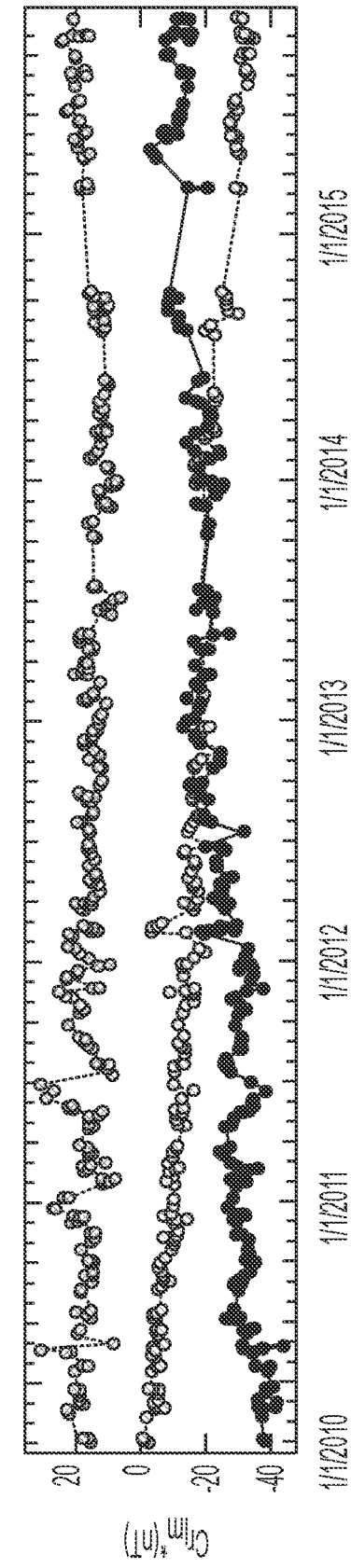
Figure 24C:
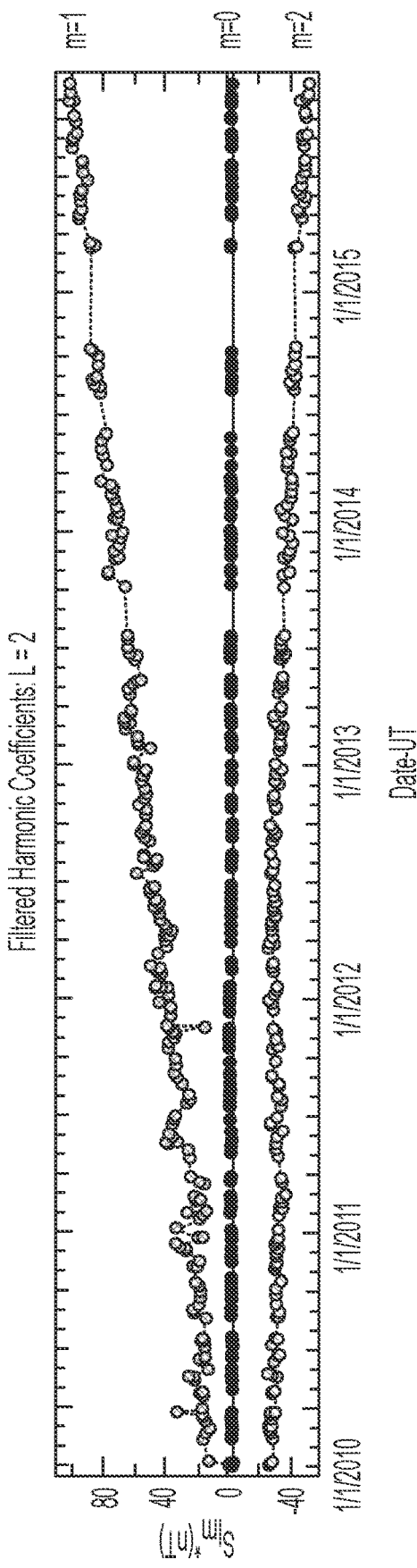
Figure 24D:
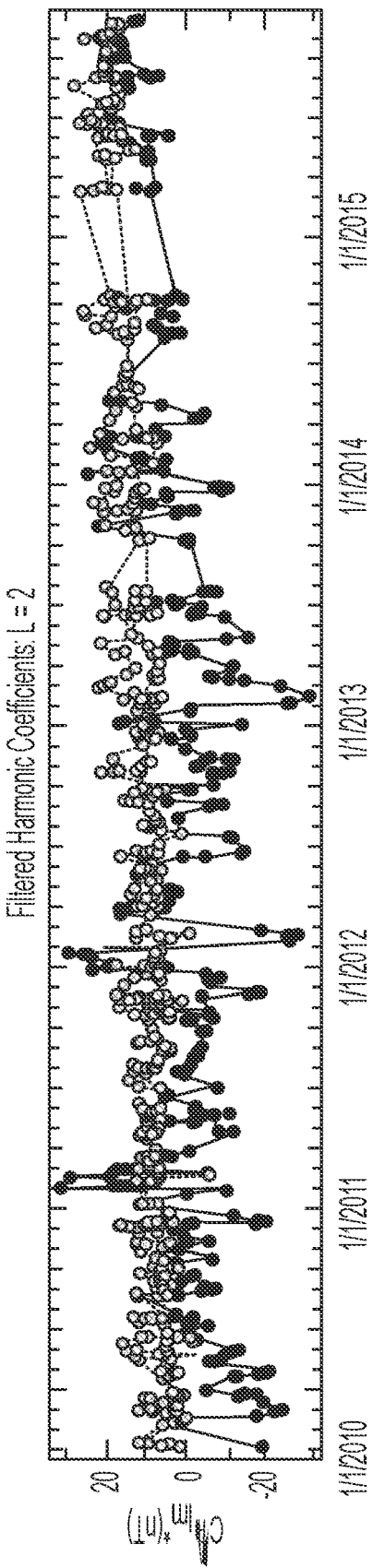
Figure 24G:
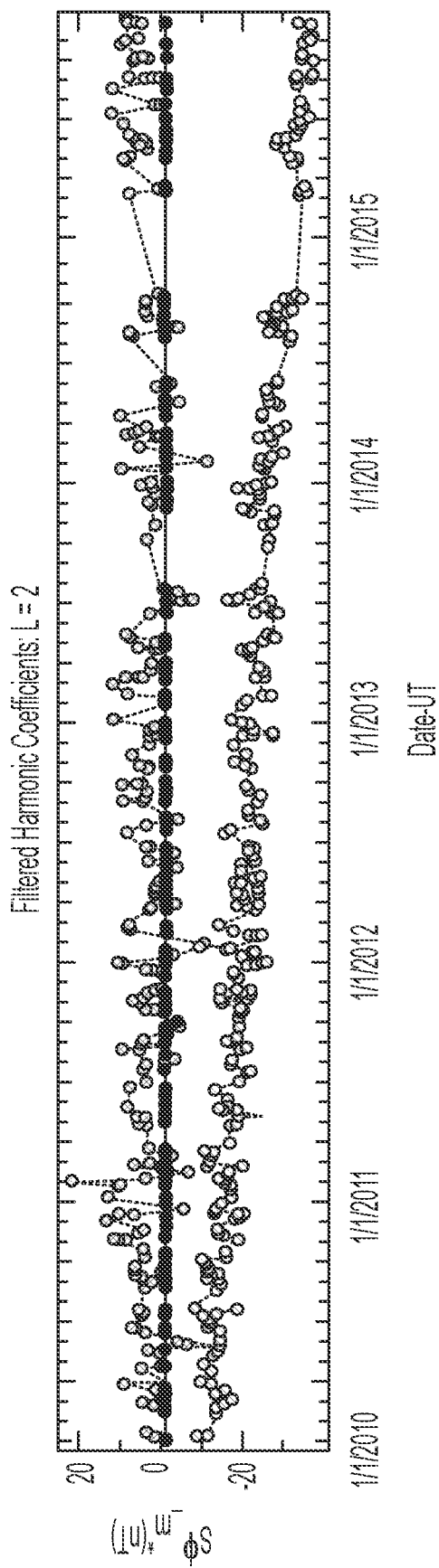

FIG. 23 illustrates correction analysis sequence for $c_{r,20}$. Vertical grey lines indicate the time span of the original input data (i.e., 0 to 2190 days from 1 Jan. 2010). From top to bottom the traces show: detrended and mirrored time series (red, 'Input $c_{r,20}$') together with the custom time window function (grey, 'FFT Window'); windowed extended time series data ('Windowed') and notch filter signal (black, 'Notch filt.'); time series with notch filtering applied, i.e., the residual between the traces ('Filter residual') and the linear correlation with the $c_{r,00}$ time series where k is the slope fit coefficient ('k×filtered $c_{r,00}$'); net correction for the input time series (thin black line, 'Net correction'); and the net signal with identified artifacts removed ('Corrected $c_{r,20}$').

The $c_{r,00}$ and any other signals at 12- or 8-month periods and their harmonics are considered as artifacts and were removed as follows. Great care was used in preparing the time series of the $c_{lm}$ and $s_{lm}$ for spectral analysis with the objective to notch filter only the frequencies of the orbital period artifacts and then reconstruct the time series without disturbing the slower trends or introducing distortions from windowing. The first step was to detrend the time series by fitting them with a $5^{th}$ order polynomial fit and then subtracting this fit. This same fit was added back in to preserve these non-periodic trends after removing the periodic signal artifacts. The second step was to construct longer time series from the detrended $c_{lm}$ and $s_{lm}$ by reflecting the original time series about the first and last time sample. We denote the span of the original time series as $T_{data}$. This yielded a pseudo time series that is three times longer than the original but which could be windowed, notch filtered, and inverted back to a time series without applying any windowing distortion to the original time series in the center third of the new pseudo time series. The mirroring ensures that the extension of the original time series did not introduce discontinuities that would have generated artificial harmonic series in the Fourier transforms. An example of this mirrored pseudo time series is shown in the top red trace of FIG. 23, for $c_{r,20}$.

The first step in the Fourier analysis was the application of the fast Fourier transform (FFT) window shown by the gray trace in the top of FIG. 23. The ends of the window are half-cosines extending 0.8 $T_{data}$ from the ends. The center of the window is constant at 1 from −0.27 $T_{data}$ to 1.2 $T_{data}$. The data multiplied by this window function are shown by the blue trace in FIG. 23. This windowed time series was then converted into a continuous, evenly sampled time series by interpolating to a 3-hour spaced time series, corresponding to the smallest time increment in the original quiet interval selection. The resulting windowed and oversampled data was then transformed using an FFT. To produce the "notch" filter, the Fourier coefficients nearest the 12-month and 8-month periods and their harmonics (up to the sixth harmonic), along with one frequency bin above and below those nearest bins, were set to zero. The notched transform was then inverted to obtain the filtered residual signal shown by the light green trace in FIG. 23. The fraction of frequency bins notched in this way was less than 10% of the number of frequencies, so that the fraction of true signal removed was not larger than 10% even though the contamination signal is much larger than this. In addition, the notched Fourier coefficients were extracted and transformed to the time domain to construct a time series of this artifact signal. The thick, black trace labeled 'Notch filt.' in FIG. 23 shows the time series of the signal that was removed. The signal in the $c_{r,20}$ at the 8- and 12-month periods and harmonics is a large fraction of the original signal, but for the majority of the $c_{lm}$ and $s_{lm}$ the notch filtered signal is much smaller.

After notch filtering to remove artifacts related to orbital dynamics, the filtered residual $c_{lm}$ and $s_{lm}$ were compared to the filtered residual $c_{r,00}$. To do this comparison, the same filtering process was first applied to the $c_{r,00}$, and where the residual signals in the filtered $c_{r,00}$ were considered to be erroneous as well. We then evaluated and subtracted from the filtered $c_{lm}$ and $s_{lm}$ the linear correlation between the filtered $c_{r,00}$ and the filtered $c_{lm}$ and $s_{lm}$, where the slope of the linear fit is denoted by 'k' in FIG. 23. This subtracted signal for $c_{r,20}$ is shown by the orange trace overlaid on the light green filter residual signal in FIG. 23. This resulting signal shows that a substantial fraction even of the filtered signal in this case was highly correlated with the filtered $c_{r,00}$. The total correction, arising from the sum of the notch filter signal with the correlated $c_{r,00}$ signal, is shown by the thin black trace FIG. 23, labeled 'Net correction'. The final corrected time series of $c_{r,20}$ with this correction subtracted is shown in the bottom dark green trace, labeled as 'Corrected $c_{r,20}$'.

FIG. 24A-FIG. 24G illustrate a time series of the filtered spherical harmonic coefficients $c_{lm}'(t_i)$ and $s_{lm}(t_i)$ for l=2 after applying the notch and $c_{r,00}$ correlation corrections, in the same format as FIG. 22A-FIG. 22G.

The corrected $c_{lm}$ and $s_{lm}$, resampled at the dates of the original data and to which the long-term trends have been added back in (removed before frequency analysis and notch filtering), are denoted by a prime as $c_{lm}'$ and $s_{lm}'$. The $c_{lm}'$ and $s_{lm}'$ for l=2 are shown in FIG. 24A-FIG. 24G using the same format as FIG. 22. The most prominent features of these corrected time series are now the slow trends evident in the power (FIG. 24A), with the largest slow variation in $s_{r,21}'$, and also present in most of the coefficient time series. The noisiest time series are $c_{\theta,20}'$ and $s_{\theta,21}'$ which exhibit ~40 nT and ~20 nT peak-to-peak variations, respectively, between just a few samples. These variations are likely spurious but not corrected with the process implemented, as these signals did not display any clear periodicities and so were not clearly attributable to any particular source. The other time series have peak-to-peak noise levels of between 5 nT and 20 nT which we consider the limit of the present Iridium Block 1 data and the processing described here. The long-term trends appear to be well resolved and the rapid variations between successive quiet periods could be mitigated with modest low pass filtering to resolve variations on time scales as short as one or two months.

Figure 25:
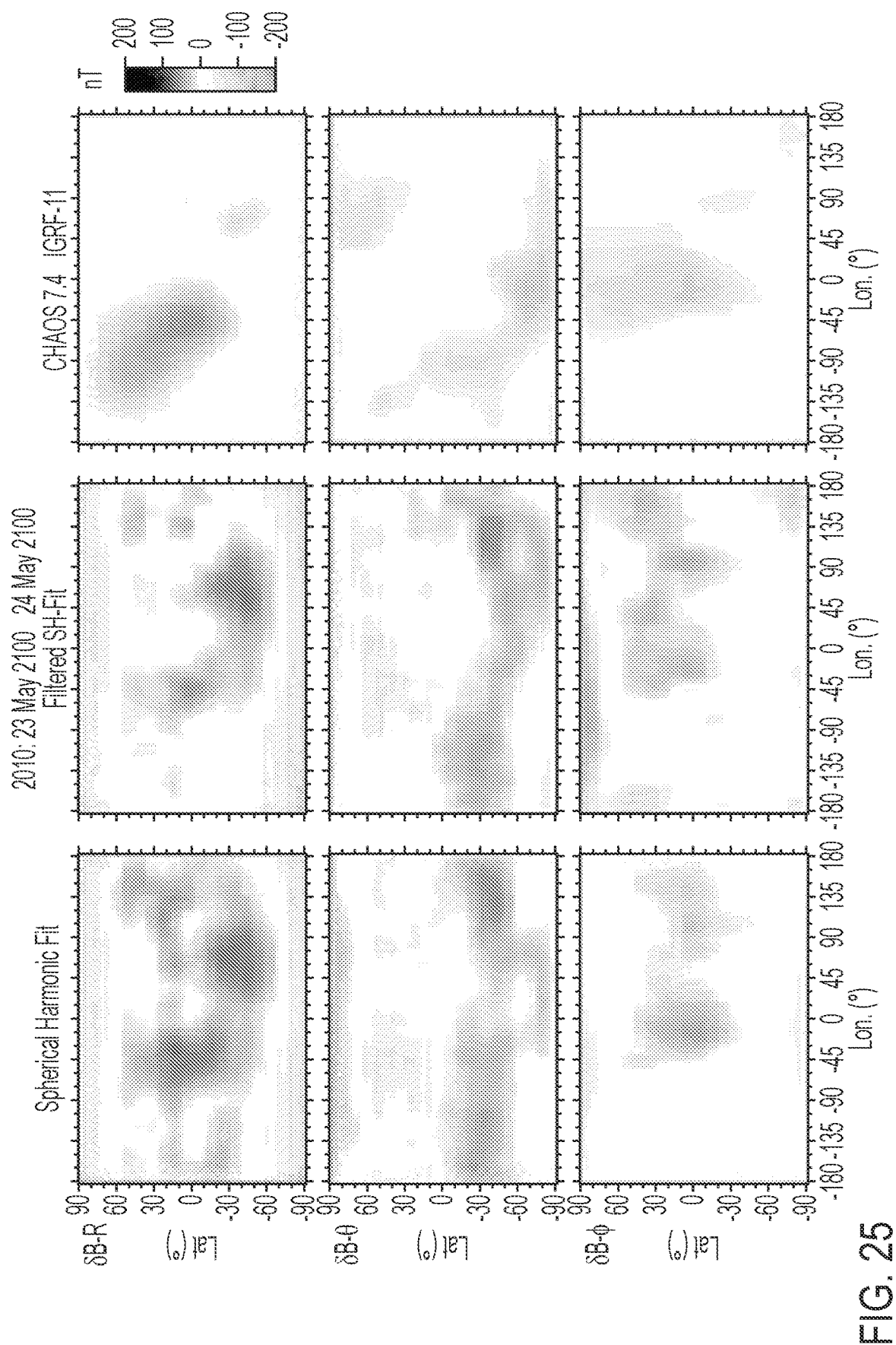
FIG. 25 illustrates magnetic field residuals relative to IGRF-11 reconstructed from the spherical harmonic coefficient time series and of the CHAOS 7.4 model relative to IGRF-11 versus geographic latitude and longitude for the quiet period of 2010 May 23/21:00 UT to 2010 May 24/21:00 UT. The columns show the original spherical harmonic fit on the left, the filtered spherical harmonic results in the center, and the residual of CHAOS 7.4 relative to IGRF-11 on the right. From top to bottom the rows show maps for the $\delta B_r$, $\delta B_\theta$, and $\delta B_\phi$ magnetic field components.

FIG. 25 illustrates magnetic field residuals relative to IGRF-11 reconstructed from the spherical harmonic coefficient time series and of the CHAOS 7.4 model relative to IGRF-11 versus geographic latitude and longitude for the quiet period of 2010 May 23/21:00 UT to 2010 May 24/21:00 UT. The columns show the original spherical harmonic fit on the left, the filtered spherical harmonic results in the center, and the residual of CHAOS 7.4 relative to IGRF-11 on the right. From top to bottom the rows show maps for the $\delta B_r$, $\delta B_\theta$, and $\delta B_\phi$ magnetic field components.

Figure 26:
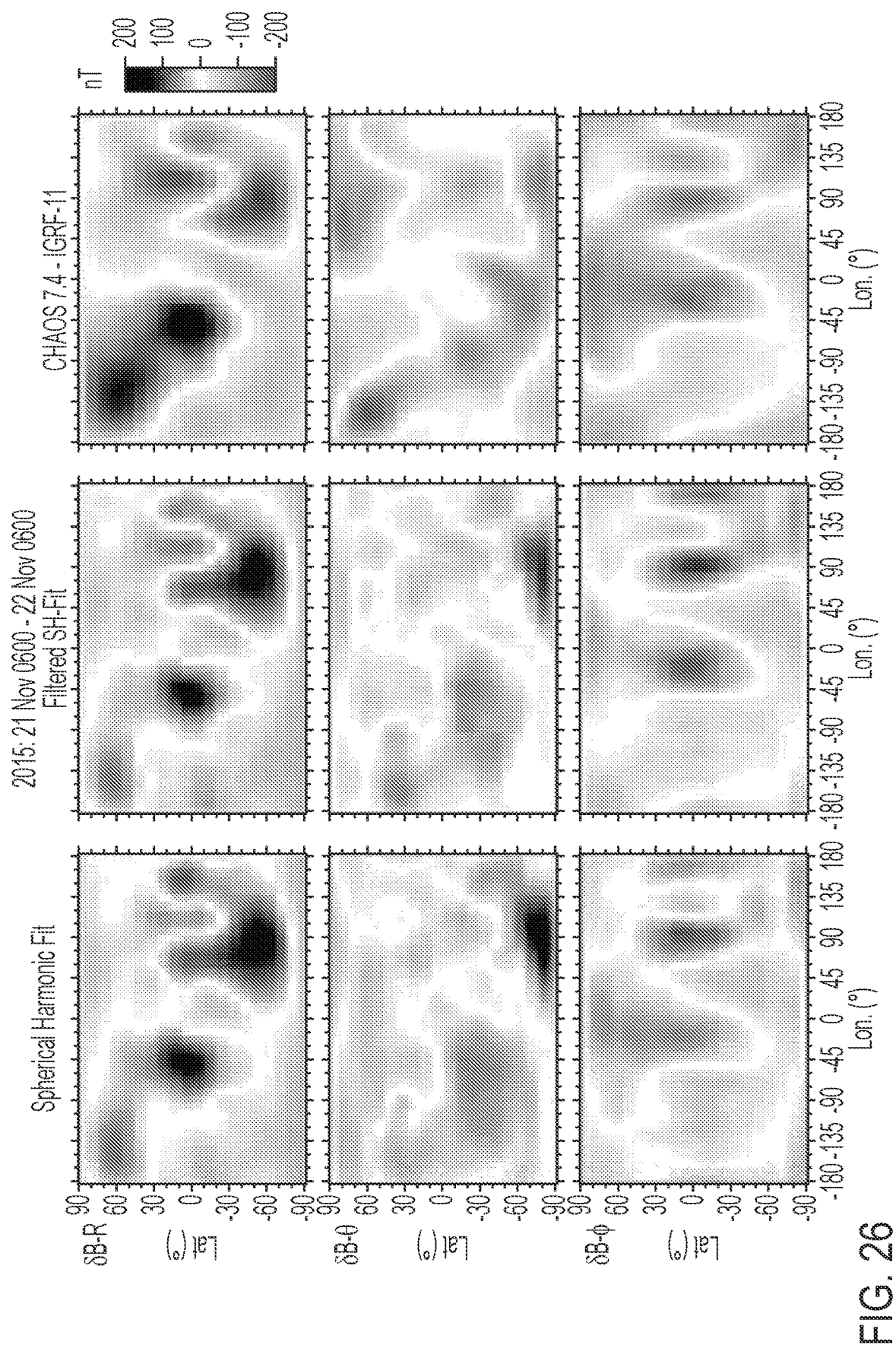
FIG. 26 illustrates magnetic field residuals relative to IGRF-11 reconstructed from the spherical harmonic coefficient time series and of CHAOS 7.4 for 2015 Nov. 21/06:00 UT to 2015 Nov. 22/06:00 UT in the same format as FIG. 25.

FIG. 26 illustrates magnetic field residuals relative to IGRF-11 reconstructed from the spherical harmonic coefficient time series and of CHAOS 7.4 for 2015 Nov. 21/06:00 UT to 2015 Nov. 22/06:00 UT in the same format as FIG. 25.

To assess how much artifact signals contribute to the patterns of the $\delta B$ shown in FIG. 15-FIG. 18, we used the $c_{lm}'$ and $s_{lm}'$ up through l=13 to reconstruct the $\delta B$ maps. The results of the reconstructed $\delta B$ maps from the $c_{lm}$ and $s_{lm}$, before artifact correction, are shown in the left hand columns of FIG. 25 and FIG. 26 for 2010 May 23/21:00-2010 May 24/21:00 and 2015 Nov. 21/06:00-2015 Nov. 22/06:00, respectively. The reconstructed $\delta B$ maps agree very closely with the maps of the binned averages (FIG. 17 right hand column and FIG. 18 left hand column). The reconstructed $\delta B$ maps from the $c_{lm}'$ and $s_{lm}'$, after artifact correction, are shown in the center columns of FIG. 25 and FIG. 26. In both cases the filtered coefficient results retain the patterns in the original binned data with relatively small changes. For example, for the 2010 May 23-24 case near 10° to 30° N latitude there is a positive $\delta B_r$ signal across all longitudes which is not discernible in the filtered map. Thus, the obvious periodicities in some of the $c_{lm}$ and $s_{lm}$ were not significant contributors to the original coherence in the geographically registered residuals relative to IGRF-11.

To check whether the Iridium results are consistent with independent models, we subtracted the IGRF-11 model from the CHAOS 7.4 model (Finlay et al., 2020; https://doi.org/10.5281/zenodo.3352398), both at 780 km altitude. These results are shown in the right hand columns of FIG. 25 and FIG. 26. Considering the November 2015 case first, all three components of the field have similar patterns in the Iridium and CHAOS 7.4 residuals. The linear regression coefficient for $\delta B_r$ between the corrected Iridium and CHAOS 7.4 residuals is 0.82. The standard deviations of the Iridium residuals are 52 nT, 31 nT, and 36 nT for r, θ, and φ, respectively, while for the CHAOS 7.4 residuals the standard deviations are 59 nT, 36 nT, and 40 nT, for r, θ, and φ, respectively. For May 2010, the correspondence between the corrected Iridium residuals and the CHAOS 7.4 residuals is not as strong. The linear regression coefficient for $\delta B_r$ is lower, 0.41, and the standard deviations in $\delta B$ are also different: for the corrected Iridium residuals they are 34 nT, 24 nT, and 19 nT, for r, θ, and φ, respectively, whereas for the CHAOS 7.4 residuals they are 17 nT, 11 nT, and 10 nT, r, θ, and φ, respectively. To compare the change from May 2010 to November 2015 we took the difference in residuals, the November 2015 residuals minus those from May 2010. The statistics of the changes in $\delta B$ residuals are similar, with standard deviations in r, θ, and φ, respectively, of 43 nT, 29 nT, and 33 nT from Iridium and 46 nT, 27 nT, and 32 nT for CHAOS 7.4. The Iridium and CHAOS 7.4 changes in $\delta B$ are well correlated with linear regression coefficients of 0.89, 0.48, and 0.78 for r, θ, and φ, respectively. The standard deviations in the Iridium residuals minus the CHAOS 7.4 residuals are 21, 29, and 22 nT, in r, θ, and φ, respectively. Over the 5.5-year baseline, this suggests that the annual variations agree on average to ~5 nT/yr at the 1-sigma level.

FIG. 27 illustrates maps of the radial component magnetic residuals, $\delta B_r$, relative to IGRF-11 from the filtered spherical harmonic coefficient time series and of CHAOS 7.4 minus IGRF-11 for six different quiet days, one for each year from 2010 through 2015. Dates were chosen to be close to 1 August of each year so the interval between successive maps is approximately one year. The Iridium results are shown in the first and third columns ('Filtered SH-Fit') and the CHAOS 7.4 results in the second and fourth columns ('CHAOS 7.4-IGRF 11'). The Iridium and CHAOS 7.4 results are shown side-by side for each date in columns one and two for 19 Jul. 2010, 2 Aug. 2011, and 31 Jul. 2012, and in columns three and four for 21 Jul. 2013, 10 Aug. 2014, and 19 Jul. 2015. Corresponding figures for the polar and azimuthal components, $\delta B_\theta$ and $\delta B_\phi$, are provided in the supplementary material.

To compare the evolution of residual patterns over the six-year interval analyzed, FIG. 27 shows maps of the $\delta B_r$, corresponding to the top center and right panels of FIG. 25 and FIG. 26, for six dates close to 1 August separated by one year. The correlation between the $\delta B_r$ patterns is generally high and increases over time although there are some systematic differences. Both Iridium and CHAOS have prominent positive $\delta B_r$ features near −60° lon. near the equator and near +60° lon. and −45° lat., although this feature is not initially as strong in the CHAOS-derived maps as in the Iridium residuals. These two positive $\delta B_r$ features are separated by a band of negative $\delta B_r$ extending from −20° lon. and −60° lat. to the equator and 0° lon. in the CHAOS maps for all years, but they are nearly contiguous positive $\delta B_r$ regions in the Iridium results until 2014. Both patterns show the development of a positive $\delta B_r$ feature between −180° and −120° lon. between 50° and 80° lat., although it is a bit narrower in latitude in the Iridium results. This feature is present in all of the CHAOS maps but not initially in the Iridium results. The prominent negative $\delta B_r$ feature near 100° lon. and extending between −20° and +45° lat. develops in both sets of residuals. Initially, the Iridium results have a double peaked $\delta B_r$ feature centered near 145° lon. between the equator and 70° lat. which is not present in the CHAOS residuals but by August 2014 this feature in the Iridium patterns has merged with the positive $\delta B_r$ region at more southern latitudes to form a shape similar to the CHAOS residuals in the southeastern positive $\delta B_r$ feature. The results for $\delta B_\theta$ and SB& are presented in FIG. 28 and FIG. 29.

Figure 28:
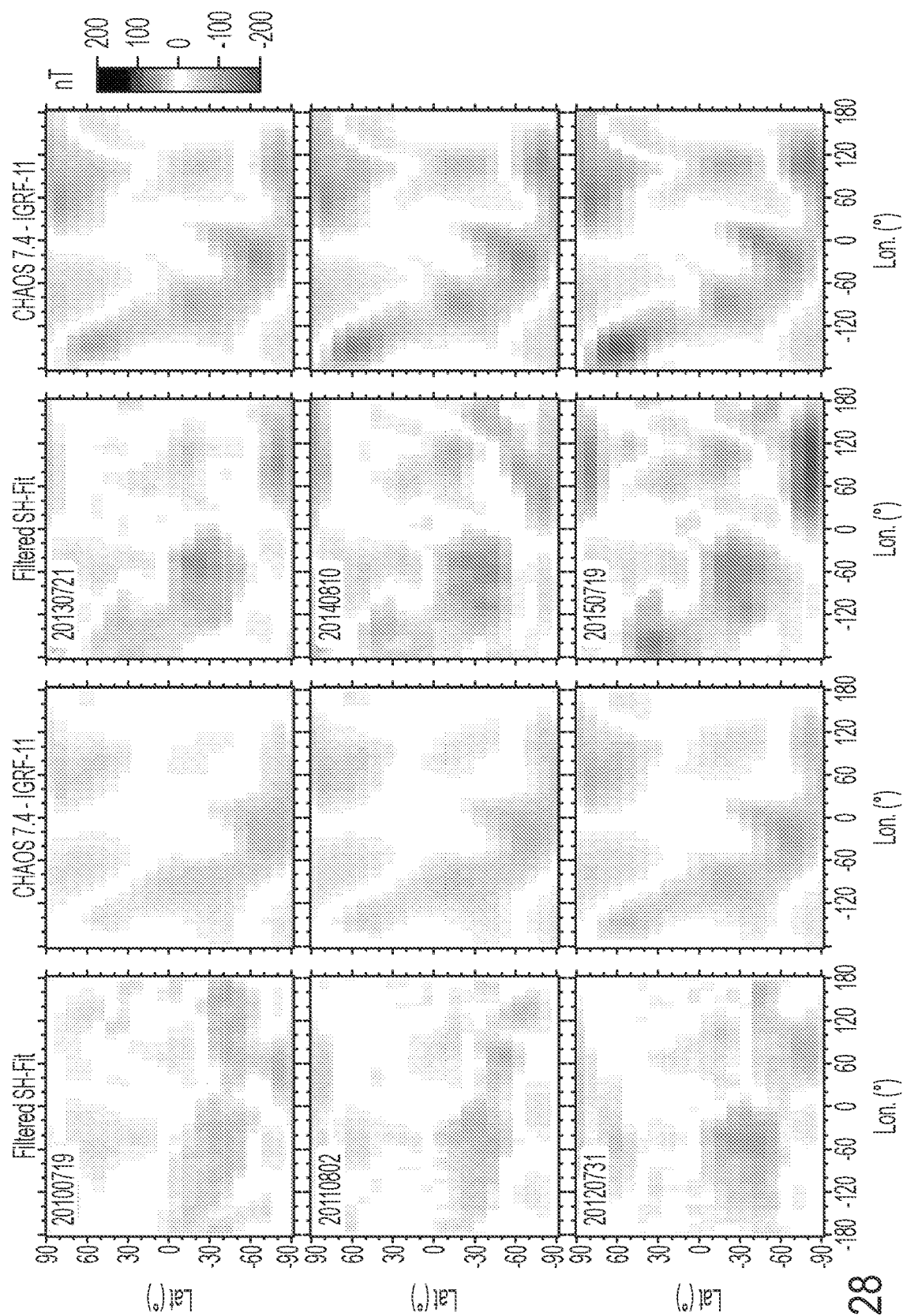
FIG. 28 illustrates maps of the polar angle component magnetic residuals, $\delta B_\theta$, relative to IGRF-11 from the filtered spherical harmonic coefficient time series and of CHAOS 7.4 minus IGRF-11 for six different quiet days, one for each year from 2010 through 2015. The Iridium results are shown in the first and third columns ('Filtered SH-Fit') and the CHAOS 7.4 results in the second and fourth columns ('CHAOS 7.4-IGRF 11'). The Iridium and CHAOS 7.4 results are shown side-by side for each date in columns one and two for 19 Jul. 2010, 2 Aug. 2011, and 31 Jul. 2012, and in columns three and four for 21 Jul. 2013, 10 Aug. 2014, and 19 Jul. 2015.

FIG. 28 illustrates maps of the polar angle component magnetic residuals, $\delta B_\theta$, relative to IGRF-11 from the filtered spherical harmonic coefficient time series and of CHAOS 7.4 minus IGRF-11 for six different quiet days, one for each year from 2010 through 2015. The Iridium results are shown in the first and third columns ('Filtered SH-Fit') and the CHAOS 7.4 results in the second and fourth columns ('CHAOS 7.4-IGRF 11'). The Iridium and CHAOS 7.4 results are shown side-by side for each date in columns one and two for 19 Jul. 2010, 2 Aug. 2011, and 31 Jul. 2012, and in columns three and four for 21 Jul. 2013, 10 Aug. 2014, and 19 Jul. 2015.

Figure 29:
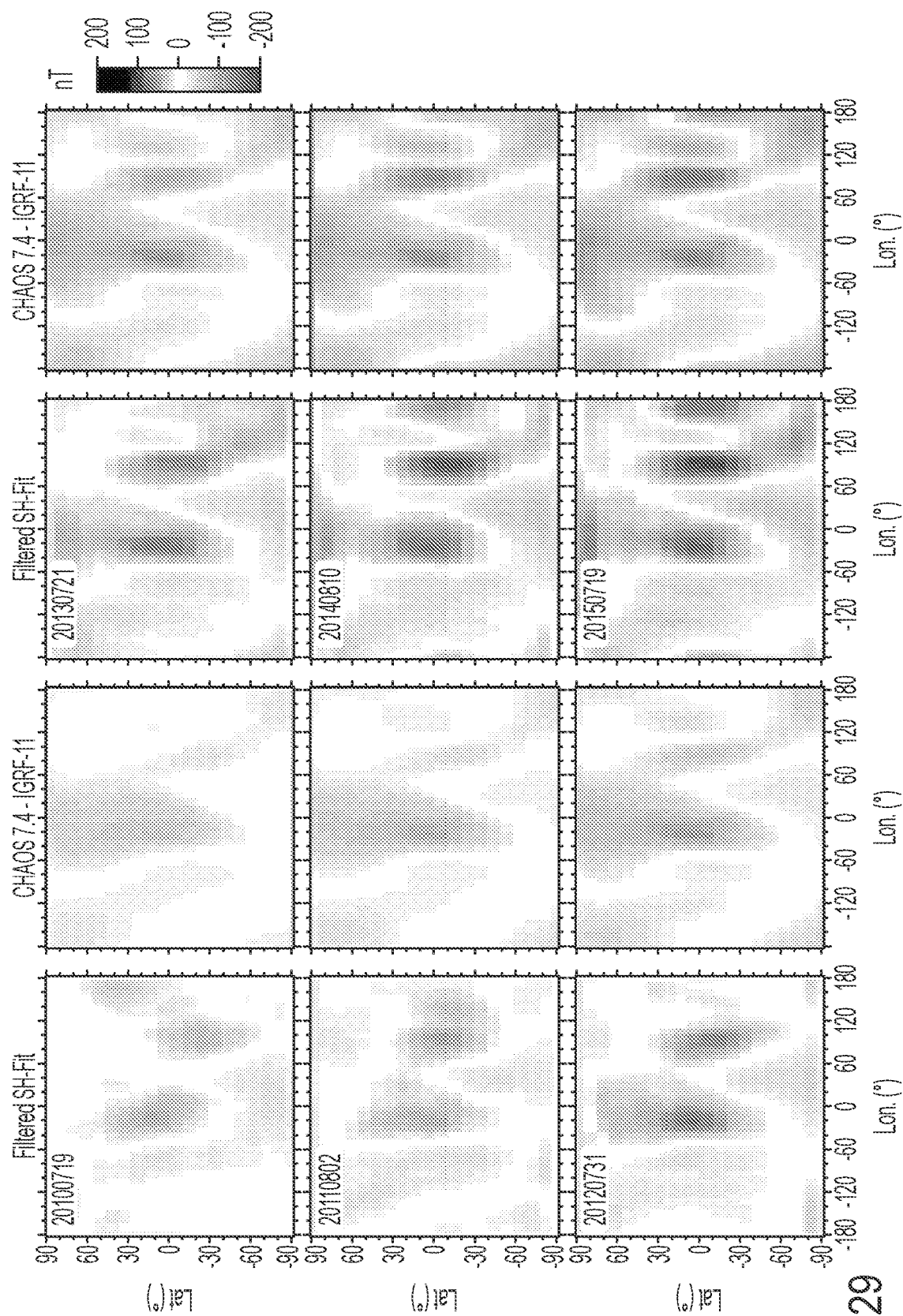
FIG. 29 illustrates maps of the azimuthal component magnetic residuals, $\delta B_\phi$, relative to IGRF-11 from the filtered spherical harmonic coefficient time series and of CHAOS 7.4 minus IGRF-11 for six different quiet days, in the same format as FIG. 28.

FIG. 29 illustrates maps of the azimuthal component magnetic residuals, $\delta B_\phi$, relative to IGRF-11 from the filtered spherical harmonic coefficient time series and of CHAOS 7.4 minus IGRF-11 for six different quiet days, in the same format as FIG. 28.

FIG. 28 and FIG. 29 are in the same format as FIG. 19 and compare differences between the IGRF-11 magnetic field model to the Iridium data and CHAOS 7.4 model for the polar angle, $\delta B_\theta$, and azimuthal, $\delta B_\phi$, components. The Supporting Information Table 1 is the list of the 263 24-hour quiet intervals used for the analysis. The table includes the date and time range of each interval together with the geomagnetic activity measures and the derived activity indices (z-scores) used to rank and select the quietest intervals.

Table 1. Table lists all 263 24-hour quiet intervals selected for the main field analysis. Table columns are as follows: start date and time of interval, 'Quiet 24-hr begin'; end date and time of interval, 'Quiet 24-hr end'; average AE index, 'avg_AE'; average northern hemisphere Birkeland current from AMPERE, 'avg_iN'; average southern hemisphere Birkeland current from AMPERE, 'avg_iS'; average symH index, avg_sH; average asyH index, avg_aH; average over the month for the interval of the sum of northern and southern hemisphere total Birkeland currents from AMPERE, mon_i; standard deviation of sum of northern plus southern hemisphere total Birkeland current for the month of the interval, sd_i; monthly average of the sum of the absolute values of symH and asyH, monH; standard deviation of the sum of the absolute values of symH and asyH for the month, sd_H; monthly averaged AE index, monAE; standard deviation of AE index for the month of the interval, sd_AE; z-score of the interval averaged AE for the month, V_AE; z-score of the interval averaged total Birkeland current, V_i; z-score of the interval averaged sum of the absolute values of symH and asyH, V_H; the net activity index computed as the average of the AE, Birkeland current, and sym/asyH z-scores, Q_indx. All values for the AE, symH, and asyH indices are in nT. All values for total Birkeland currents are in mega-Amperes (MA).

TABLE 1

| Quiet 24-hr begin | Quiet 24-hr end | avg_AE | avg_iN | avg_iS | avg_sH | avg_aH | mon_i | sd_i | monH |
|---|---|---|---|---|---|---|---|---|---|
| Jan. 1, 2010 00:00 | Jan. 2, 2010 00:00 | 9.2 | 0.459 | 0.352 | 1.4 | 10.9 | 1.109 | 0.843 | 14.1 |
| Jan. 6, 2010 18:00 | Jan. 7, 2010 18:00 | 12.2 | 0.374 | 0.446 | −0.5 | 8.1 | 1.109 | 0.843 | 14.1 |
| Jan. 8, 2010 09:00 | Jan. 9, 2010 09:00 | 13.3 | 0.513 | 0.334 | −3.3 | 8.7 | 1.109 | 0.843 | 14.1 |
| Feb. 8, 2010 15:00 | Feb. 9, 2010 15:00 | 26.0 | 0.335 | 0.798 | −0.4 | 16.0 | 1.208 | 1.162 | 17.9 |
| Feb. 20, 2010 06:00 | Feb. 21, 2010 06:00 | 17.8 | 0.163 | 0.452 | −3.2 | 9.4 | 1.208 | 1.162 | 17.9 |
| Feb. 26, 2010 15:00 | Feb. 27, 2010 15:00 | 28.1 | 0.138 | 0.301 | −4.3 | 12.5 | 1.208 | 1.162 | 17.9 |
| Feb. 27, 2010 21:00 | Feb. 28, 2010 21:00 | 36.4 | 0.316 | 0.433 | 4.2 | 10.3 | 1.208 | 1.162 | 17.9 |
| Mar. 8, 2010 21:00 | Mar. 9, 2010 21:00 | 34.4 | 0.484 | 0.530 | 0.7 | 8.9 | 1.335 | 0.761 | 13.9 |
| Mar. 18, 2010 06:00 | Mar. 19, 2010 06:00 | 37.6 | 0.536 | 0.573 | −0.7 | 14.0 | 1.335 | 0.761 | 13.9 |
| Mar. 21, 2010 15:00 | Mar. 22, 2010 15:00 | 30.2 | 0.259 | 0.332 | −1.2 | 5.5 | 1.335 | 0.761 | 13.9 |
| Mar. 23, 2010 12:00 | Mar. 24, 2010 12:00 | 35.7 | 0.326 | 0.340 | 2.5 | 8.5 | 1.335 | 0.761 | 13.9 |
| Mar. 27, 2010 03:00 | Mar. 28, 2010 03:00 | 43.8 | 0.558 | 0.482 | 4.2 | 10.3 | 1.335 | 0.761 | 13.9 |
| Apr. 16, 2010 18:00 | Apr. 17, 2010 18:00 | 36.9 | 0.520 | 0.356 | −6.7 | 10.8 | 1.237 | 2.124 | 16.9 |
| Apr. 18, 2010 06:00 | Apr. 19, 2010 06:00 | 50.0 | 0.657 | 0.448 | −2.0 | 12.0 | 1.237 | 2.124 | 16.9 |
| Apr. 25, 2010 09:00 | Apr. 26, 2010 09:00 | 38.3 | 0.479 | 0.295 | −1.1 | 8.6 | 1.237 | 2.124 | 16.9 |
| Apr. 27, 2010 06:00 | Apr. 28, 2010 06:00 | 49.2 | 0.703 | 0.326 | 1.6 | 6.9 | 1.237 | 2.124 | 16.9 |
| May 13, 2010 15:00 | May 14, 2010 15:00 | 39.7 | 0.675 | 0.259 | −1.6 | 10.5 | 1.208 | 2.231 | 14.3 |
| May 15, 2010 15:00 | May 16, 2010 15:00 | 44.3 | 0.617 | 0.355 | −1.6 | 9.5 | 1.208 | 2.231 | 14.3 |
| May 22, 2010 12:00 | May 23, 2010 12:00 | 37.4 | 0.825 | 0.261 | −0.2 | 7.4 | 1.208 | 2.231 | 14.3 |
| May 23, 2010 21:00 | May 24, 2010 21:00 | 39.3 | 0.625 | 0.190 | 1.4 | 10.3 | 1.208 | 2.231 | 14.3 |
| May 27, 2010 03:00 | May 28, 2010 03:00 | 59.4 | 0.744 | 0.276 | −1.7 | 8.8 | 1.208 | 2.231 | 14.3 |
| Jun. 12, 2010 06:00 | Jun. 13, 2010 06:00 | 49.8 | 0.933 | 0.379 | −1.1 | 10.2 | 1.673 | 1.345 | 16.1 |
| Jun. 19, 2010 21:00 | Jun. 20, 2010 21:00 | 45.2 | 0.974 | 0.303 | −3.9 | 10.3 | 1.673 | 1.345 | 16.1 |
| Jun. 21, 2010 09:00 | Jun. 22, 2010 09:00 | 40.7 | 1.234 | 0.196 | 0.3 | 13.8 | 1.673 | 1.345 | 16.1 |
| Jul. 6, 2010 12:00 | Jul. 7, 2010 12:00 | 42.5 | 0.778 | 0.325 | −3.6 | 10.2 | 1.360 | 1.045 | 16.1 |
| Jul. 10, 2010 12:00 | Jul. 11, 2010 12:00 | 42.3 | 0.879 | 0.364 | 0.5 | 11.4 | 1.360 | 1.045 | 16.1 |
| Jul. 16, 2010 15:00 | Jul. 17, 2010 15:00 | 43.1 | 0.647 | 0.243 | −4.8 | 9.3 | 1.360 | 1.045 | 16.1 |
| Jul. 17, 2010 15:00 | Jul. 18, 2010 15:00 | 42.5 | 0.818 | 0.302 | −2.4 | 8.3 | 1.360 | 1.045 | 16.1 |
| Jul. 18, 2010 15:00 | Jul. 19, 2010 15:00 | 40.0 | 0.671 | 0.301 | −0.7 | 12.0 | 1.360 | 1.045 | 16.1 |
| Aug. 19, 2010 12:00 | Aug. 20, 2010 12:00 | 34.9 | 0.886 | 0.405 | −4.7 | 11.6 | 1.732 | 1.826 | 17.7 |
| Aug. 29, 2010 15:00 | Aug. 30, 2010 15:00 | 33.2 | 0.488 | 0.293 | −5.0 | 8.8 | 1.732 | 1.826 | 17.7 |
| Aug. 30, 2010 18:00 | Aug. 31, 2010 18:00 | 34.8 | 0.487 | 0.344 | −1.3 | 10.0 | 1.732 | 1.826 | 17.7 |
| Aug. 31, 2010 12:00 | Sep. 1, 2010 12:00 | 35.3 | 0.760 | 0.414 | −0.6 | 10.3 | 0.937 | 1.089 | 13.6 |
| Sep. 3, 2010 21:00 | Sep. 4, 2010 21:00 | 36.9 | 0.466 | 0.228 | −3.8 | 11.0 | 0.937 | 1.089 | 13.6 |
| Sep. 4, 2010 21:00 | Sep. 5, 2010 21:00 | 43.5 | 0.635 | 0.332 | −0.6 | 9.5 | 0.937 | 1.089 | 13.6 |
| Sep. 11, 2010 06:00 | Sep. 12, 2010 06:00 | 31.8 | 0.326 | 0.208 | −3.5 | 7.4 | 0.937 | 1.089 | 13.6 |
| Sep. 12, 2010 09:00 | Sep. 13, 2010 09:00 | 34.0 | 0.497 | 0.290 | 0.1 | 11.1 | 0.937 | 1.089 | 13.6 |
| Sep. 22, 2010 06:00 | Sep. 23, 2010 06:00 | 34.5 | 0.455 | 0.414 | −1.2 | 6.9 | 0.937 | 1.089 | 13.6 |
| Oct. 1, 2010 18:00 | Oct. 2, 2010 18:00 | 20.8 | 0.250 | 0.271 | −5.0 | 7.2 | 1.142 | 1.525 | 15.7 |
| Oct. 3, 2010 12:00 | Oct. 4, 2010 12:00 | 25.4 | 0.359 | 0.323 | −0.9 | 3.9 | 1.142 | 1.525 | 15.7 |
| Oct. 14, 2010 09:00 | Oct. 15, 2010 09:00 | 23.7 | 0.283 | 0.354 | 0.6 | 7.0 | 1.142 | 1.525 | 15.7 |
| Oct. 31, 2010 12:00 | Nov. 1, 2010 12:00 | 24.3 | 0.348 | 0.687 | 1.8 | 12.0 | 1.380 | 1.000 | 14.5 |
| Nov. 1, 2010 06:00 | Nov. 2, 2010 06:00 | 26.4 | 0.336 | 0.643 | 1.6 | 9.2 | 1.380 | 1.000 | 14.5 |
| Nov. 6, 2010 15:00 | Nov. 7, 2010 15:00 | 28.1 | 0.296 | 0.548 | −0.4 | 10.1 | 1.380 | 1.000 | 14.5 |
| Nov. 9, 2010 15:00 | Nov. 10, 2010 15:00 | 34.6 | 0.420 | 0.755 | −4.7 | 7.6 | 1.380 | 1.000 | 14.5 |
| Nov. 19, 2010 06:00 | Nov. 20, 2010 06:00 | 25.8 | 0.329 | 0.848 | −1.9 | 8.2 | 1.380 | 1.000 | 14.5 |
| Dec. 2, 2010 06:00 | Dec. 3, 2010 06:00 | 23.2 | 0.406 | 0.659 | −2.6 | 10.9 | 1.162 | 1.038 | 12.8 |
| Dec. 3, 2010 06:00 | Dec. 4, 2010 06:00 | 19.2 | 0.359 | 0.645 | 3.2 | 6.2 | 1.162 | 1.038 | 12.8 |
| Dec. 4, 2010 21:00 | Dec. 5, 2010 21:00 | 35.3 | 0.271 | 0.678 | 0.0 | 9.1 | 1.162 | 1.038 | 12.8 |
| Dec. 9, 2010 09:00 | Dec. 10, 2010 09:00 | 28.3 | 0.307 | 0.607 | −1.5 | 7.9 | 1.162 | 1.038 | 12.8 |
| Dec. 11, 2010 00:00 | Dec. 12, 2010 00:00 | 14.0 | 0.368 | 0.674 | 0.4 | 5.2 | 1.162 | 1.038 | 12.8 |
| Dec. 22, 2010 09:00 | Dec. 23, 2010 09:00 | 24.0 | 0.323 | 0.618 | −4.7 | 8.9 | 1.162 | 1.038 | 12.8 |
| Jan. 4, 2011 21:00 | Jan. 5, 2011 21:00 | 44.6 | 0.699 | 0.861 | −0.5 | 8.3 | 1.689 | 0.845 | 13.5 |

TABLE 1-continued

| | | | | | | | | | |
|---|---|---|---|---|---|---|---|---|---|
| Jan. 23, 2011 15:00 | Jan. 24, 2011 15:00 | 37.4 | 0.444 | 0.743 | 4.9 | 11.1 | 1.689 | 0.845 | 13.5 |
| Jan. 30, 2011 03:00 | Jan. 31, 2011 03:00 | 16.1 | 0.365 | 0.378 | 2.3 | 9.0 | 1.689 | 0.845 | 13.5 |
| Feb. 3, 2011 03:00 | Feb. 4, 2011 03:00 | 29.5 | 0.400 | 0.448 | −4.8 | 12.5 | 1.321 | 1.436 | 15.5 |
| Feb. 13, 2011 09:00 | Feb. 14, 2011 09:00 | 25.4 | 0.513 | 0.424 | 3.3 | 11.0 | 1.321 | 1.436 | 15.5 |
| Feb. 17, 2011 03:00 | Feb. 18, 2011 03:00 | 35.0 | 0.436 | 0.404 | −1.0 | 12.1 | 1.321 | 1.436 | 15.5 |
| Feb. 24, 2011 00:00 | Feb. 25, 2011 00:00 | 33.8 | 0.511 | 0.408 | 0.2 | 12.7 | 1.321 | 1.436 | 15.5 |
| Feb. 27, 2011 03:00 | Feb. 28, 2011 03:00 | 41.3 | 0.662 | 0.419 | −0.3 | 7.1 | 1.321 | 1.436 | 15.5 |
| Mar. 14, 2011 18:00 | Mar. 15, 2011 18:00 | 25.5 | 0.587 | 0.294 | −7.6 | 8.7 | 1.286 | 2.250 | 13.8 |
| Mar. 15, 2011 18:00 | Mar. 16, 2011 18:00 | 24.9 | 0.503 | 0.227 | 0.4 | 7.6 | 1.286 | 2.250 | 13.8 |
| Mar. 16, 2011 18:00 | Mar. 17, 2011 18:00 | 29.0 | 0.767 | 0.394 | 4.8 | 8.4 | 1.286 | 2.250 | 13.8 |
| Mar. 26, 2011 06:00 | Mar. 27, 2011 06:00 | 29.2 | 0.528 | 0.139 | −0.2 | 9.3 | 1.286 | 2.250 | 13.8 |
| Mar. 27, 2011 06:00 | Mar. 28, 2011 06:00 | 36.2 | 0.829 | 0.310 | 0.7 | 10.3 | 1.286 | 2.250 | 13.8 |
| Apr. 25, 2011 06:00 | Apr. 26, 2011 06:00 | 48.9 | 1.014 | 0.251 | −5.6 | 9.6 | 1.533 | 1.640 | 16.7 |
| Apr. 26, 2011 15:00 | Apr. 27, 2011 15:00 | 44.4 | 0.812 | 0.193 | 0.0 | 11.1 | 1.533 | 1.640 | 16.7 |
| Apr. 27, 2011 18:00 | Apr. 28, 2011 18:00 | 44.4 | 0.971 | 0.192 | 5.0 | 11.4 | 1.533 | 1.640 | 16.7 |
| May 9, 2011 03:00 | May 10, 2011 03:00 | 53.6 | 0.995 | 0.302 | 1.2 | 11.7 | 1.710 | 1.753 | 16.3 |
| May 12, 2011 12:00 | May 13, 2011 12:00 | 63.8 | 0.880 | 0.289 | 0.2 | 14.2 | 1.710 | 1.753 | 16.3 |
| May 13, 2011 21:00 | May 14, 2011 21:00 | 57.6 | 1.177 | 0.408 | 6.2 | 9.7 | 1.710 | 1.753 | 16.3 |
| May 19, 2011 12:00 | May 20, 2011 12:00 | 52.4 | 1.009 | 0.271 | −0.7 | 11.2 | 1.710 | 1.753 | 16.3 |
| May 20, 2011 12:00 | May 21, 2011 12:00 | 57.7 | 1.012 | 0.377 | 5.4 | 13.2 | 1.710 | 1.753 | 16.3 |
| May 22, 2011 09:00 | May 23, 2011 09:00 | 52.8 | 1.061 | 0.240 | 2.2 | 10.6 | 1.710 | 1.753 | 16.3 |
| May 25, 2011 03:00 | May 26, 2011 03:00 | 72.1 | 1.396 | 0.384 | 0.6 | 11.0 | 1.710 | 1.753 | 16.3 |
| Jun. 3, 2011 21:00 | Jun. 4, 2011 21:00 | 81.4 | 1.082 | 0.458 | −2.7 | 11.9 | 2.102 | 1.344 | 18.4 |
| Jun. 18, 2011 06:00 | Jun. 19, 2011 06:00 | 68.0 | 1.074 | 0.486 | −2.0 | 11.0 | 2.102 | 1.344 | 18.4 |
| Jun. 28, 2011 06:00 | Jun. 29, 2011 06:00 | 42.1 | 0.807 | 0.335 | −0.3 | 9.3 | 2.102 | 1.344 | 18.4 |
| Jul. 16, 2011 09:00 | Jul. 17, 2011 09:00 | 72.2 | 0.934 | 0.620 | 3.0 | 11.2 | 2.211 | 1.266 | 18.9 |
| Jul. 27, 2011 06:00 | Jul. 28, 2011 06:00 | 58.0 | 0.768 | 0.500 | −6.5 | 8.6 | 2.211 | 1.266 | 18.9 |
| Jul. 28, 2011 06:00 | Jul. 29, 2011 06:00 | 47.9 | 0.765 | 0.378 | 0.6 | 9.0 | 2.211 | 1.266 | 18.9 |
| Aug. 2, 2011 18:00 | Aug. 3, 2011 18:00 | 50.7 | 0.601 | 0.376 | −3.2 | 9.5 | 1.453 | 1.448 | 17.4 |
| Aug. 18, 2011 21:00 | Aug. 19, 2011 21:00 | 37.9 | 0.516 | 0.387 | −2.1 | 13.0 | 1.453 | 1.448 | 17.4 |
| Aug. 19, 2011 21:00 | Aug. 20, 2011 21:00 | 60.4 | 0.777 | 0.583 | −0.5 | 10.9 | 1.453 | 1.448 | 17.4 |
| Aug. 21, 2011 00:00 | Aug. 22, 2011 00:00 | 43.4 | 0.675 | 0.473 | −0.1 | 7.4 | 1.453 | 1.448 | 17.4 |
| Aug. 31, 2011 03:00 | Sep. 1, 2011 03:00 | 51.6 | 0.485 | 0.503 | −0.9 | 10.4 | 1.453 | 1.448 | 17.4 |
| Aug. 31, 2011 12:00 | Sep. 1, 2011 12:00 | 49.5 | 0.522 | 0.519 | 0.5 | 11.6 | 1.453 | 1.448 | 17.4 |
| Sep. 8, 2011 12:00 | Sep. 9, 2011 12:00 | 39.4 | 0.528 | 0.531 | 5.1 | 12.6 | 1.644 | 2.313 | 20.5 |
| Sep. 23, 2011 06:00 | Sep. 24, 2011 06:00 | 30.9 | 0.505 | 0.500 | 0.0 | 13.5 | 1.644 | 2.313 | 20.5 |
| Oct. 10, 2011 12:00 | Oct. 11, 2011 12:00 | 34.9 | 0.472 | 0.561 | −0.2 | 12.9 | 1.605 | 1.793 | 14.6 |
| Oct. 13, 2011 21:00 | Oct. 14, 2011 21:00 | 33.6 | 0.524 | 0.692 | 2.7 | 8.8 | 1.605 | 1.793 | 14.6 |
| Oct. 18, 2011 00:00 | Oct. 19, 2011 00:00 | 56.6 | 0.650 | 0.782 | −0.3 | 8.3 | 1.605 | 1.793 | 14.6 |
| Oct. 22, 2011 03:00 | Oct. 23, 2011 03:00 | 29.1 | 0.434 | 0.773 | 0.4 | 9.6 | 1.605 | 1.793 | 14.6 |
| Oct. 28, 2011 12:00 | Oct. 29, 2011 12:00 | 25.5 | 0.354 | 0.364 | −13.4 | 11.2 | 1.605 | 1.793 | 14.6 |
| Nov. 6, 2011 03:00 | Nov. 7, 2011 03:00 | 28.6 | 0.540 | 0.684 | 0.9 | 10.9 | 1.651 | 1.532 | 13.4 |
| Nov. 9, 2011 15:00 | Nov. 10, 2011 15:00 | 27.9 | 0.440 | 0.481 | −5.0 | 10.3 | 1.651 | 1.532 | 13.4 |
| Nov. 12, 2011 18:00 | Nov. 13, 2011 18:00 | 28.9 | 0.482 | 0.552 | −4.5 | 9.4 | 1.651 | 1.532 | 13.4 |
| Nov. 18, 2011 09:00 | Nov. 19, 2011 09:00 | 24.4 | 0.515 | 0.761 | 0.1 | 10.4 | 1.651 | 1.532 | 13.4 |
| Nov. 19, 2011 09:00 | Nov. 20, 2011 09:00 | 19.0 | 0.325 | 0.482 | 2.2 | 7.3 | 1.651 | 1.532 | 13.4 |
| Dec. 6, 2011 00:00 | Dec. 7, 2011 00:00 | 18.7 | 0.453 | 0.448 | −4.0 | 8.7 | 1.253 | 0.994 | 15.1 |
| Dec. 15, 2011 12:00 | Dec. 16, 2011 12:00 | 19.9 | 0.504 | 0.724 | −4.5 | 11.3 | 1.253 | 0.994 | 15.1 |
| Dec. 16, 2011 12:00 | Dec. 17, 2011 12:00 | 14.6 | 0.373 | 0.339 | 0.2 | 9.5 | 1.253 | 0.994 | 15.1 |
| Dec. 25, 2011 12:00 | Dec. 26, 2011 12:00 | 17.2 | 0.561 | 0.499 | −4.6 | 8.5 | 1.253 | 0.994 | 15.1 |
| Dec. 26, 2011 21:00 | Dec. 27, 2011 21:00 | 17.0 | 0.512 | 0.326 | 0.9 | 13.1 | 1.253 | 0.994 | 15.1 |
| Jan. 4, 2012 06:00 | Jan. 5, 2012 06:00 | 24.7 | 0.532 | 0.541 | −7.6 | 13.5 | 1.971 | 1.645 | 17.7 |
| Jan. 14, 2012 15:00 | Jan. 15, 2012 15:00 | 22.4 | 0.699 | 0.599 | 0.6 | 13.5 | 1.971 | 1.645 | 17.7 |
| Jan. 19, 2012 00:00 | Jan. 20, 2012 00:00 | 45.6 | 0.851 | 0.956 | −0.6 | 12.4 | 1.971 | 1.645 | 17.7 |
| Feb. 11, 2012 03:00 | Feb. 12, 2012 03:00 | 59.2 | 0.929 | 0.839 | 4.4 | 11.6 | 2.075 | 1.730 | 17.0 |
| Feb. 16, 2012 09:00 | Feb. 17, 2012 09:00 | 45.6 | 0.626 | 0.642 | −8.4 | 11.3 | 2.075 | 1.730 | 17.0 |
| Feb. 17, 2012 09:00 | Feb. 18, 2012 09:00 | 21.1 | 0.341 | 0.347 | 3.3 | 8.0 | 2.075 | 1.730 | 17.0 |
| Feb. 22, 2012 21:00 | Feb. 23, 2012 21:00 | 35.9 | 0.494 | 0.516 | −3.6 | 13.5 | 2.075 | 1.730 | 17.0 |
| Mar. 21, 2012 21:00 | Mar. 22, 2012 21:00 | 57.4 | 0.725 | 0.716 | −2.9 | 13.1 | 2.343 | 2.830 | 21.1 |
| Mar. 25, 2012 12:00 | Mar. 26, 2012 12:00 | 54.4 | 0.705 | 0.584 | 0.2 | 9.2 | 2.343 | 2.830 | 21.1 |
| Mar. 28, 2012 21:00 | Mar. 29, 2012 21:00 | 45.6 | 0.673 | 0.538 | −5.5 | 11.7 | 2.343 | 2.830 | 21.1 |
| Mar. 30, 2012 12:00 | Mar. 31, 2012 12:00 | 40.5 | 0.566 | 0.549 | 3.3 | 14.6 | 2.343 | 2.830 | 21.1 |
| Apr. 5, 2012 21:00 | Apr. 6, 2012 21:00 | 37.4 | 0.758 | 0.479 | −4.8 | 10.4 | 1.820 | 2.103 | 17.6 |
| Apr. 8, 2012 18:00 | Apr. 9, 2012 18:00 | 45.7 | 0.495 | 0.394 | −0.3 | 14.6 | 1.820 | 2.103 | 17.6 |
| Apr. 15, 2012 21:00 | Apr. 16, 2012 21:00 | 69.7 | 0.683 | 0.521 | −0.8 | 11.4 | 1.820 | 2.103 | 17.6 |
| Apr. 20, 2012 15:00 | Apr. 21, 2012 15:00 | 58.2 | 1.005 | 0.645 | −0.1 | 12.7 | 1.820 | 2.103 | 17.6 |
| Apr. 29, 2012 21:00 | Apr. 30, 2012 21:00 | 62.5 | 0.960 | 0.570 | −3.4 | 13.2 | 1.820 | 2.103 | 17.6 |
| May 4, 2012 03:00 | May 5, 2012 03:00 | 39.0 | 0.803 | 0.318 | −8.9 | 9.3 | 1.728 | 1.733 | 18.8 |
| May 5, 2012 03:00 | May 6, 2012 03:00 | 62.9 | 1.057 | 0.520 | −4.8 | 10.0 | 1.728 | 1.733 | 18.8 |
| May 6, 2012 21:00 | May 7, 2012 21:00 | 45.9 | 0.758 | 0.316 | 2.4 | 14.0 | 1.728 | 1.733 | 18.8 |
| May 21, 2012 03:00 | May 22, 2012 03:00 | 69.4 | 0.871 | 0.491 | −3.0 | 9.8 | 1.728 | 1.733 | 18.8 |
| May 27, 2012 06:00 | May 28, 2012 06:00 | 61.5 | 0.684 | 0.347 | −7.0 | 11.8 | 1.728 | 1.733 | 18.8 |
| May 28, 2012 18:00 | May 29, 2012 18:00 | 76.3 | 1.296 | 0.589 | −0.3 | 11.6 | 1.728 | 1.733 | 18.8 |
| Jun. 13, 2012 09:00 | Jun. 14, 2012 09:00 | 77.2 | 1.308 | 0.452 | 0.3 | 16.3 | 1.754 | 2.456 | 20.6 |
| Jun. 14, 2012 12:00 | Jun. 15, 2012 12:00 | 61.0 | 1.117 | 0.357 | 6.5 | 12.3 | 1.754 | 2.456 | 20.6 |
| Jun. 21, 2012 06:00 | Jun. 22, 2012 06:00 | 56.9 | 1.092 | 0.471 | −1.0 | 12.1 | 1.754 | 2.456 | 20.6 |
| Jun. 22, 2012 15:00 | Jun. 23, 2012 15:00 | 69.2 | 1.060 | 0.438 | 0.8 | 14.0 | 1.754 | 2.456 | 20.6 |
| Jul. 13, 2012 09:00 | Jul. 14, 2012 09:00 | 79.0 | 1.058 | 0.496 | −0.5 | 14.6 | 2.264 | 3.377 | 21.7 |
| Jul. 26, 2012 12:00 | Jul. 27, 2012 12:00 | 38.3 | 0.892 | 0.266 | 5.6 | 11.2 | 2.264 | 3.377 | 21.7 |
| Jul. 31, 2012 03:00 | Aug. 1, 2012 03:00 | 84.3 | 1.215 | 0.433 | −9.3 | 11.8 | 2.264 | 3.377 | 21.7 |

TABLE 1-continued

| | | | | | | | | | |
|---|---|---|---|---|---|---|---|---|---|
| Aug. 10, 2012 09:00 | Aug. 11, 2012 09:00 | 44.6 | 1.035 | 0.282 | −1.0 | 13.0 | 1.835 | 1.169 | 21.0 |
| Aug. 29, 2012 18:00 | Aug. 30, 2012 18:00 | 43.9 | 0.742 | 0.379 | −4.8 | 15.8 | 1.835 | 1.169 | 21.0 |
| Aug. 30, 2012 21:00 | Aug. 31, 2012 21:00 | 42.1 | 0.593 | 0.271 | −1.2 | 9.8 | 1.835 | 1.169 | 21.0 |
| Sep. 10, 2012 15:00 | Sep. 11, 2012 15:00 | 37.2 | 0.742 | 0.229 | −5.1 | 14.9 | 1.355 | 2.608 | 16.5 |
| Sep. 13, 2012 21:00 | Sep. 14, 2012 21:00 | 43.6 | 0.986 | 0.517 | 1.8 | 14.6 | 1.355 | 2.608 | 16.5 |
| Sep. 23, 2012 03:00 | Sep. 24, 2012 03:00 | 29.9 | 0.484 | 0.274 | −3.4 | 8.8 | 1.355 | 2.608 | 16.5 |
| Sep. 24, 2012 06:00 | Sep. 25, 2012 06:00 | 35.2 | 0.827 | 0.443 | 0.1 | 12.6 | 1.355 | 2.608 | 16.5 |
| Sep. 25, 2012 06:00 | Sep. 26, 2012 06:00 | 38.9 | 0.749 | 0.408 | 0.2 | 11.2 | 1.355 | 2.608 | 16.5 |
| Sep. 28, 2012 00:00 | Sep. 29, 2012 00:00 | 38.7 | 0.499 | 0.328 | −0.1 | 13.3 | 1.355 | 2.608 | 16.5 |
| Oct. 19, 2012 18:00 | Oct. 20, 2012 18:00 | 36.1 | 0.378 | 0.356 | −4.9 | 10.4 | 1.410 | 2.661 | 16.9 |
| Oct. 20, 2012 18:00 | Oct. 21, 2012 18:00 | 36.8 | 0.682 | 0.669 | −3.9 | 10.9 | 1.410 | 2.661 | 16.9 |
| Oct. 22, 2012 03:00 | Oct. 23, 2012 03:00 | 33.4 | 0.529 | 0.559 | 3.0 | 7.2 | 1.410 | 2.661 | 16.9 |
| Oct. 30, 2012 06:00 | Oct. 31, 2012 06:00 | 34.9 | 0.631 | 0.523 | 4.1 | 8.9 | 1.410 | 2.661 | 16.9 |
| Nov. 8, 2012 03:00 | Nov. 9, 2012 03:00 | 31.9 | 0.480 | 0.532 | −0.1 | 9.6 | 1.400 | 2.336 | 15.7 |
| Nov. 9, 2012 09:00 | Nov. 10, 2012 09:00 | 25.3 | 0.373 | 0.307 | 3.7 | 13.6 | 1.400 | 2.336 | 15.7 |
| Nov. 27, 2012 21:00 | Nov. 28, 2012 21:00 | 30.3 | 0.491 | 0.843 | −0.4 | 8.1 | 1.400 | 2.336 | 15.7 |
| Dec. 6, 2012 06:00 | Dec. 7, 2012 06:00 | 16.6 | 0.270 | 0.594 | −4.5 | 11.3 | 1.135 | 1.019 | 15.2 |
| Dec. 7, 2012 06:00 | Dec. 8, 2012 06:00 | 18.3 | 0.234 | 0.580 | 0.7 | 12.2 | 1.135 | 1.019 | 15.2 |
| Dec. 10, 2012 21:00 | Dec. 11, 2012 21:00 | 24.2 | 0.339 | 0.778 | 0.2 | 13.2 | 1.135 | 1.019 | 15.2 |
| Dec. 13, 2012 18:00 | Dec. 14, 2012 18:00 | 30.6 | 0.578 | 0.933 | 0.6 | 9.7 | 1.135 | 1.019 | 15.2 |
| Dec. 22, 2012 12:00 | Dec. 23, 2012 12:00 | 22.0 | 0.329 | 0.499 | −3.4 | 12.7 | 1.135 | 1.019 | 15.2 |
| Dec. 27, 2012 12:00 | Dec. 28, 2012 12:00 | 19.4 | 0.356 | 0.697 | −0.4 | 12.9 | 1.135 | 1.019 | 15.2 |
| Jan. 1, 2013 00:00 | Jan. 2, 2013 00:00 | 15.7 | 0.435 | 0.527 | −0.1 | 13.4 | 1.332 | 1.452 | 18.6 |
| Jan. 22, 2013 18:00 | Jan. 23, 2013 18:00 | 21.9 | 0.225 | 0.694 | −3.4 | 12.5 | 1.332 | 1.452 | 18.6 |
| Jan. 30, 2013 21:00 | Jan. 31, 2013 21:00 | 19.8 | 0.293 | 0.603 | −0.2 | 12.8 | 1.332 | 1.452 | 18.6 |
| Feb. 5, 2013 18:00 | Feb. 6, 2013 18:00 | 22.9 | 0.268 | 0.627 | 1.8 | 10.0 | 1.889 | 1.094 | 16.4 |
| Feb. 11, 2013 06:00 | Feb. 12, 2013 06:00 | 57.4 | 0.608 | 0.881 | −1.7 | 9.9 | 1.889 | 1.094 | 16.4 |
| Feb. 24, 2013 21:00 | Feb. 25, 2013 21:00 | 35.0 | 0.529 | 0.689 | 1.7 | 16.1 | 1.889 | 1.094 | 16.4 |
| Mar. 6, 2013 06:00 | Mar. 7, 2013 06:00 | 28.9 | 0.397 | 0.325 | 0.6 | 14.6 | 1.406 | 2.173 | 17.4 |
| Mar. 7, 2013 18:00 | Mar. 8, 2013 18:00 | 32.1 | 0.512 | 0.421 | 0.0 | 8.7 | 1.406 | 2.173 | 17.4 |
| Mar. 11, 2013 09:00 | Mar. 12, 2013 09:00 | 44.9 | 0.545 | 0.515 | 4.3 | 10.9 | 1.406 | 2.173 | 17.4 |
| Mar. 13, 2013 09:00 | Mar. 14, 2013 09:00 | 50.3 | 0.554 | 0.486 | 5.1 | 11.7 | 1.406 | 2.173 | 17.4 |
| Mar. 26, 2013 03:00 | Mar. 27, 2013 03:00 | 38.7 | 0.478 | 0.273 | −2.2 | 13.1 | 1.406 | 2.173 | 17.4 |
| Apr. 15, 2013 15:00 | Apr. 16, 2013 15:00 | 37.9 | 0.733 | 0.238 | −2.3 | 13.8 | 1.316 | 1.536 | 16.4 |
| Apr. 17, 2013 15:00 | Apr. 18, 2013 15:00 | 48.0 | 0.853 | 0.304 | −3.5 | 9.5 | 1.316 | 1.536 | 16.4 |
| Apr. 18, 2013 21:00 | Apr. 19, 2013 21:00 | 31.7 | 0.749 | 0.184 | −1.6 | 10.4 | 1.316 | 1.536 | 16.4 |
| Apr. 20, 2013 18:00 | Apr. 21, 2013 18:00 | 37.2 | 0.687 | 0.125 | 2.6 | 11.0 | 1.316 | 1.536 | 16.4 |
| Apr. 22, 2013 06:00 | Apr. 23, 2013 06:00 | 45.1 | 0.884 | 0.229 | 5.6 | 11.2 | 1.316 | 1.536 | 16.4 |
| May 3, 2013 03:00 | May 4, 2013 03:00 | 89.8 | 1.193 | 0.381 | −12.1 | 13.4 | 3.015 | 2.155 | 24.6 |
| May 8, 2013 21:00 | May 9, 2013 21:00 | 97.1 | 1.612 | 0.626 | 2.0 | 11.8 | 3.015 | 2.155 | 24.6 |
| May 12, 2013 06:00 | May 13, 2013 06:00 | 78.2 | 1.104 | 0.391 | 4.9 | 19.4 | 3.015 | 2.155 | 24.6 |
| Jun. 10, 2013 12:00 | Jun. 11, 2013 12:00 | 83.0 | 1.688 | 0.524 | −5.1 | 12.6 | 2.355 | 2.714 | 18.0 |
| Jun. 12, 2013 09:00 | Jun. 13, 2013 09:00 | 67.8 | 1.216 | 0.345 | −6.4 | 12.7 | 2.355 | 2.714 | 18.0 |
| Jun. 13, 2013 18:00 | Jun. 14, 2013 18:00 | 57.4 | 1.260 | 0.321 | 0.7 | 10.0 | 2.355 | 2.714 | 18.0 |
| Jun. 16, 2013 00:00 | Jun. 17, 2013 00:00 | 53.6 | 1.209 | 0.356 | 2.5 | 7.9 | 2.355 | 2.714 | 18.0 |
| Jun. 25, 2013 21:00 | Jun. 26, 2013 21:00 | 75.0 | 1.052 | 0.445 | −10.1 | 14.7 | 2.355 | 2.714 | 18.0 |
| Jul. 2, 2013 12:00 | Jul. 3, 2013 12:00 | 68.8 | 1.178 | 0.412 | −6.2 | 12.0 | 2.046 | 2.760 | 19.0 |
| Jul. 3, 2013 15:00 | Jul. 4, 2013 15:00 | 78.7 | 1.372 | 0.361 | −0.8 | 12.7 | 2.046 | 2.760 | 19.0 |
| Jul. 16, 2013 21:00 | Jul. 17, 2013 21:00 | 78.1 | 1.236 | 0.517 | −0.3 | 13.6 | 2.046 | 2.760 | 19.0 |
| Jul. 20, 2013 09:00 | Jul. 21, 2013 09:00 | 69.1 | 0.946 | 0.490 | −4.3 | 10.2 | 2.046 | 2.760 | 19.0 |
| Jul. 21, 2013 09:00 | Jul. 22, 2013 09:00 | 98.8 | 1.321 | 0.614 | 0.5 | 13.3 | 2.046 | 2.760 | 19.0 |
| Oct. 5, 2013 12:06 | Oct. 6, 2013 12:06 | 35.1 | 0.230 | 0.309 | −5.7 | 8.7 | 1.075 | 2.216 | 17.1 |
| Oct. 23, 2013 15:06 | Oct. 24, 2013 15:06 | 31.3 | 0.333 | 0.646 | 3.7 | 11.2 | 1.075 | 2.216 | 17.1 |
| Oct. 24, 2013 21:06 | Oct. 25, 2013 21:06 | 29.8 | 0.352 | 0.728 | 3.8 | 8.1 | 1.075 | 2.216 | 17.1 |
| Nov. 18, 2013 12:00 | Nov. 19, 2013 12:00 | 28.7 | 0.332 | 0.671 | 0.3 | 10.0 | 1.728 | 1.768 | 18.5 |
| Nov. 20, 2013 21:00 | Nov. 21, 2013 21:00 | 26.7 | 0.268 | 0.627 | 0.9 | 11.4 | 1.728 | 1.768 | 18.5 |
| Nov. 22, 2013 03:00 | Nov. 23, 2013 03:00 | 27.0 | 0.275 | 0.725 | 3.5 | 9.8 | 1.728 | 1.768 | 18.5 |
| Dec. 2, 2013 03:00 | Dec. 3, 2013 03:00 | 22.6 | 0.376 | 0.905 | −5.6 | 13.2 | 1.346 | 1.261 | 15.0 |
| Dec. 12, 2013 12:00 | Dec. 13, 2013 12:00 | 34.1 | 0.467 | 0.700 | −0.5 | 14.2 | 1.346 | 1.261 | 15.0 |
| Dec. 21, 2013 15:00 | Dec. 22, 2013 15:00 | 18.7 | 0.306 | 0.570 | −0.1 | 8.8 | 1.346 | 1.261 | 15.0 |
| Dec. 22, 2013 15:00 | Dec. 23, 2013 15:00 | 25.7 | 0.407 | 0.674 | 2.7 | 7.2 | 1.346 | 1.261 | 15.0 |
| Dec. 23, 2013 15:00 | Dec. 24, 2013 15:00 | 26.4 | 0.431 | 0.538 | 4.3 | 8.9 | 1.346 | 1.261 | 15.0 |
| Dec. 26, 2013 15:00 | Dec. 27, 2013 15:00 | 18.9 | 0.327 | 0.581 | 0.1 | 7.2 | 1.346 | 1.261 | 15.0 |
| Dec. 28, 2013 06:00 | Dec. 29, 2013 06:00 | 40.3 | 0.661 | 1.011 | 2.5 | 11.8 | 1.346 | 1.261 | 15.0 |
| Jan. 16, 2014 18:00 | Jan. 17, 2014 18:00 | 33.6 | 0.654 | 0.761 | −0.8 | 10.0 | 1.578 | 1.340 | 19.6 |
| Jan. 18, 2014 06:00 | Jan. 19, 2014 06:00 | 24.7 | 0.516 | 0.452 | 0.9 | 11.0 | 1.578 | 1.340 | 19.6 |
| Jan. 19, 2014 06:00 | Jan. 20, 2014 06:00 | 31.7 | 0.389 | 0.306 | −0.6 | 14.6 | 1.578 | 1.340 | 19.6 |
| Jan. 31, 2014 12:00 | Feb. 1, 2014 12:00 | 36.2 | 0.670 | 0.616 | 0.8 | 12.4 | 1.578 | 1.340 | 19.6 |
| Feb. 4, 2014 12:00 | Feb. 5, 2014 12:00 | 27.9 | 0.704 | 0.679 | 5.9 | 13.9 | 1.604 | 2.286 | 18.9 |
| Feb. 12, 2014 18:00 | Feb. 13, 2014 18:00 | 32.1 | 0.642 | 0.766 | 1.6 | 12.3 | 1.604 | 2.286 | 18.9 |
| Feb. 13, 2014 18:00 | Feb. 14, 2014 18:00 | 20.3 | 0.430 | 0.408 | 5.2 | 9.5 | 1.604 | 2.286 | 18.9 |
| Feb. 26, 2014 03:00 | Feb. 27, 2014 03:00 | 33.8 | 0.704 | 0.477 | −3.8 | 12.6 | 1.604 | 2.286 | 18.9 |
| Mar. 7, 2014 03:00 | Mar. 8, 2014 03:00 | 39.8 | 0.524 | 0.364 | −3.4 | 10.3 | 1.421 | 0.878 | 15.3 |
| Mar. 9, 2014 00:00 | Mar. 10, 2014 00:00 | 33.2 | 0.530 | 0.399 | 2.8 | 10.5 | 1.421 | 0.878 | 15.3 |
| Mar. 15, 2014 09:00 | Mar. 16, 2014 09:00 | 54.2 | 0.746 | 0.454 | −3.2 | 11.7 | 1.421 | 0.878 | 15.3 |
| Mar. 16, 2014 09:00 | Mar. 17, 2014 09:00 | 39.8 | 0.434 | 0.209 | 0.2 | 12.9 | 1.421 | 0.878 | 15.3 |
| Mar. 24, 2014 00:00 | Mar. 25, 2014 00:00 | 51.6 | 0.671 | 0.411 | 0.3 | 16.5 | 1.421 | 0.878 | 15.3 |
| Apr. 10, 2014 06:00 | Apr. 11, 2014 06:00 | 47.8 | 0.793 | 0.382 | −1.8 | 12.6 | 1.942 | 2.123 | 19.3 |
| Apr. 27, 2014 03:00 | Apr. 28, 2014 03:00 | 61.7 | 0.829 | 0.427 | −2.7 | 12.6 | 1.942 | 2.123 | 19.3 |
| Apr. 28, 2014 21:00 | Apr. 29, 2014 21:00 | 64.4 | 0.723 | 0.445 | 0.1 | 15.9 | 1.942 | 2.123 | 19.3 |

TABLE 1-continued

| | | | | | | | | |
|---|---|---|---|---|---|---|---|---|
| May 2, 2014 18:00 | May 3, 2014 18:00 | 43.3 | 0.506 | 0.264 | −0.2 | 18.4 | 1.692 | 1.501 | 16.8 |
| May 20, 2014 18:00 | May 21, 2014 18:00 | 46.9 | 0.922 | 0.401 | 0.9 | 11.4 | 1.692 | 1.501 | 16.8 |
| May 30, 2014 21:00 | May 31, 2014 21:00 | 53.8 | 1.234 | 0.441 | 0.1 | 12.8 | 1.692 | 1.501 | 16.8 |
| Aug. 9, 2014 09:00 | Aug. 10, 2014 09:00 | 72.4 | 1.107 | 0.454 | −0.5 | 14.6 | 1.870 | 2.078 | 19.5 |
| Aug. 14, 2014 09:00 | Aug. 15, 2014 09:00 | 71.9 | 0.886 | 0.488 | −4.4 | 12.9 | 1.870 | 2.078 | 19.5 |
| Aug. 15, 2014 21:00 | Aug. 16, 2014 21:00 | 50.8 | 0.657 | 0.394 | −4.7 | 10.8 | 1.870 | 2.078 | 19.5 |
| Aug. 17, 2014 15:00 | Aug. 18, 2014 15:00 | 65.0 | 1.033 | 0.474 | 4.2 | 17.5 | 1.870 | 2.078 | 19.5 |
| Aug. 24, 2014 12:00 | Aug. 25, 2014 12:00 | 50.5 | 0.674 | 0.390 | −1.3 | 13.3 | 1.870 | 2.078 | 19.5 |
| Aug. 25, 2014 15:00 | Aug. 26, 2014 15:00 | 61.7 | 0.939 | 0.627 | −0.7 | 12.0 | 1.870 | 2.078 | 19.5 |
| Sep. 7, 2014 06:00 | Sep. 8, 2014 06:00 | 52.4 | 0.942 | 0.499 | 1.8 | 13.7 | 2.174 | 1.487 | 21.3 |
| Sep. 15, 2014 03:00 | Sep. 16, 2014 03:00 | 31.2 | 0.667 | 0.313 | −2.6 | 12.7 | 2.174 | 1.487 | 21.3 |
| Sep. 20, 2014 21:00 | Sep. 21, 2014 21:00 | 64.5 | 1.126 | 0.731 | 0.9 | 14.0 | 2.174 | 1.487 | 21.3 |
| Oct. 3, 2014 03:00 | Oct. 4, 2014 03:00 | 70.0 | 1.255 | 0.792 | −3.1 | 11.7 | 2.441 | 1.416 | 22.1 |
| Oct. 4, 2014 15:00 | Oct. 5, 2014 15:00 | 44.2 | 1.086 | 1.005 | 6.2 | 10.8 | 2.441 | 1.416 | 22.1 |
| Oct. 7, 2014 06:00 | Oct. 8, 2014 06:00 | 39.4 | 0.755 | 0.567 | −1.0 | 13.4 | 2.441 | 1.416 | 22.1 |
| Oct. 11, 2014 15:00 | Oct. 12, 2014 15:00 | 79.3 | 1.091 | 0.697 | −3.0 | 12.6 | 2.441 | 1.416 | 22.1 |
| Mar. 9, 2015 06:00 | Mar. 10, 2015 06:00 | 40.9 | 0.578 | 0.800 | 0.9 | 15.5 | 2.757 | 3.028 | 19.4 |
| Mar. 10, 2015 12:00 | Mar. 11, 2015 12:00 | 66.2 | 0.892 | 1.059 | 6.7 | 10.7 | 2.757 | 3.028 | 19.4 |
| Mar. 12, 2015 12:00 | Mar. 13, 2015 12:00 | 69.3 | 0.871 | 0.863 | −0.3 | 14.6 | 2.757 | 3.028 | 19.4 |
| Apr. 25, 2015 00:00 | Apr. 26, 2015 00:00 | 43.6 | 0.524 | 0.169 | −0.2 | 10.4 | 1.780 | 2.333 | 21.7 |
| Apr. 26, 2015 03:00 | Apr. 27, 2015 03:00 | 52.4 | 0.787 | 0.316 | 5.1 | 9.3 | 1.780 | 2.333 | 21.7 |
| Apr. 30, 2015 03:00 | May 1, 2015 03:00 | 67.1 | 1.328 | 0.463 | 3.7 | 12.0 | 1.780 | 2.333 | 21.7 |
| May 7, 2015 00:00 | May 8, 2015 00:00 | 47.9 | 1.424 | 0.372 | −6.5 | 14.4 | 2.107 | 2.109 | 17.3 |
| May 21, 2015 18:00 | May 22, 2015 18:00 | 62.4 | 1.356 | 0.316 | −6.6 | 9.5 | 2.107 | 2.109 | 17.3 |
| May 22, 2015 18:00 | May 23, 2015 18:00 | 56.5 | 1.119 | 0.279 | −0.9 | 9.1 | 2.107 | 2.109 | 17.3 |
| May 25, 2015 00:00 | May 26, 2015 00:00 | 57.4 | 0.965 | 0.221 | 3.3 | 10.0 | 2.107 | 2.109 | 17.3 |
| May 30, 2015 15:00 | May 31, 2015 15:00 | 75.9 | 1.471 | 0.417 | 3.1 | 15.0 | 2.107 | 2.109 | 17.3 |
| Jun. 2, 2015 03:00 | Jun. 3, 2015 03:00 | 50.4 | 1.164 | 0.220 | 1.1 | 12.6 | 1.977 | 2.728 | 23.0 |
| Jun. 3, 2015 15:00 | Jun. 4, 2015 15:00 | 54.0 | 0.804 | 0.172 | 0.7 | 10.6 | 1.977 | 2.728 | 23.0 |
| Jun. 4, 2015 21:00 | Jun. 5, 2015 21:00 | 51.2 | 0.915 | 0.180 | 3.0 | 12.4 | 1.977 | 2.728 | 23.0 |
| Jun. 19, 2015 15:00 | Jun. 20, 2015 15:00 | 50.3 | 1.299 | 0.407 | −11.0 | 10.0 | 1.977 | 2.728 | 23.0 |
| Jun. 20, 2015 15:00 | Jun. 21, 2015 15:00 | 55.8 | 1.009 | 0.411 | −1.9 | 12.9 | 1.977 | 2.728 | 23.0 |
| Jul. 2, 2015 03:00 | Jul. 3, 2015 03:00 | 71.1 | 1.045 | 0.358 | −12.8 | 12.0 | 2.225 | 1.827 | 23.9 |
| Jul. 3, 2015 03:00 | Jul. 4, 2015 03:00 | 62.7 | 1.078 | 0.283 | −3.1 | 12.6 | 2.225 | 1.827 | 23.9 |
| Jul. 19, 2015 06:00 | Jul. 20, 2015 06:00 | 63.1 | 1.171 | 0.497 | 0 | 10.5 | 2.225 | 1.827 | 23.9 |
| Aug. 14, 2015 00:00 | Aug. 15, 2015 00:00 | 63.1 | 1.399 | 0.463 | −2.6 | 19.3 | 2.794 | 3.047 | 25.9 |
| Aug. 30, 2015 00:00 | Aug. 31, 2015 00:00 | 78.3 | 1.092 | 0.726 | −12.2 | 13.8 | 2.794 | 3.047 | 25.9 |
| Aug. 31, 2015 06:00 | Sep. 1, 2015 06:00 | 84.7 | 1.207 | 0.730 | −6.0 | 13.6 | 2.794 | 3.047 | 25.9 |
| Aug. 31, 2015 12:00 | Sep. 1, 2015 12:00 | 99.2 | 1.367 | 0.828 | −4.8 | 14.9 | 2.794 | 3.047 | 25.9 |
| Sep. 1, 2015 15:00 | Sep. 2, 2015 15:00 | 75.5 | 1.089 | 0.681 | −1.7 | 17.0 | 2.361 | 2.499 | 23.6 |
| Sep. 25, 2015 15:00 | Sep. 26, 2015 15:00 | 38.2 | 0.792 | 0.771 | −5.1 | 17.3 | 2.361 | 2.499 | 23.6 |
| Sep. 26, 2015 15:00 | Sep. 27, 2015 15:00 | 74.6 | 1.163 | 1.018 | −1.2 | 11.3 | 2.361 | 2.499 | 23.6 |
| Sep. 27, 2015 15:00 | Sep. 28, 2015 15:00 | 34.9 | 0.801 | 0.714 | −0.8 | 10.4 | 2.361 | 2.499 | 23.6 |
| Sep. 29, 2015 12:00 | Sep. 30, 2015 12:00 | 33.7 | 0.439 | 0.547 | 0.5 | 9.9 | 2.361 | 2.499 | 23.6 |
| Oct. 19, 2015 03:00 | Oct. 20, 2015 03:00 | 59.3 | 0.669 | 0.860 | −4.5 | 14.1 | 2.604 | 2.530 | 21.0 |
| Oct. 26, 2015 00:00 | Oct. 27, 2015 00:00 | 27.2 | 0.404 | 0.633 | 5.6 | 12.9 | 2.604 | 2.530 | 21.0 |
| Oct. 27, 2015 00:00 | Oct. 28, 2015 00:00 | 72.4 | 0.831 | 1.109 | 4.7 | 11.8 | 2.604 | 2.530 | 21.0 |
| Oct. 28, 2015 00:00 | Oct. 29, 2015 00:00 | 29.4 | 0.355 | 0.691 | 12.6 | 16.5 | 2.604 | 2.530 | 21.0 |
| Nov. 21, 2015 06:00 | Nov. 22, 2015 06:00 | 38.4 | 0.623 | 1.313 | −6.3 | 9.6 | 2.020 | 2.448 | 16.1 |
| Nov. 22, 2015 06:00 | Nov. 23, 2015 06:00 | 36.9 | 0.478 | 1.131 | −3.6 | 8.4 | 2.020 | 2.448 | 16.1 |

| Quiet 24-hr begin | Quiet 24-hr end | sd_H | monAE | sd_AE | V_AE | V_i | V_H | Q_indx |
|---|---|---|---|---|---|---|---|---|
| Jan. 1, 2010 00:00 | Jan. 2, 2010 00:00 | 9.2 | 21.7 | 38.7 | −0.323 | −0.353 | −0.198 | −0.292 |
| Jan. 6, 2010 18:00 | Jan. 7, 2010 18:00 | 9.2 | 21.7 | 38.7 | −0.245 | −0.343 | −0.611 | −0.400 |
| Jan. 8, 2010 09:00 | Jan. 9, 2010 09:00 | 9.2 | 21.7 | 38.7 | −0.217 | −0.311 | −0.233 | −0.253 |
| Feb. 8, 2010 15:00 | Feb. 9, 2010 15:00 | 10.9 | 41.1 | 63.4 | −0.239 | −0.065 | −0.140 | −0.148 |
| Feb. 20, 2010 06:00 | Feb. 21, 2010 06:00 | 10.9 | 41.1 | 63.4 | −0.368 | −0.510 | −0.491 | −0.457 |
| Feb. 26, 2010 15:00 | Feb. 27, 2010 15:00 | 10.9 | 41.1 | 63.4 | −0.206 | −0.662 | −0.107 | −0.325 |
| Feb. 27, 2010 21:00 | Feb. 28, 2010 21:00 | 10.9 | 41.1 | 63.4 | −0.075 | −0.395 | −0.308 | −0.259 |
| Mar. 8, 2010 21:00 | Mar. 9, 2010 21:00 | 5.7 | 56.3 | 45.6 | −0.481 | −0.422 | −0.747 | −0.550 |
| Mar. 18, 2010 06:00 | Mar. 19, 2010 06:00 | 5.7 | 56.3 | 45.6 | −0.411 | −0.297 | 0.142 | −0.189 |
| Mar. 21, 2010 15:00 | Mar. 22, 2010 15:00 | 5.7 | 56.3 | 45.6 | −0.573 | −0.978 | −1.263 | −0.938 |
| Mar. 23, 2010 12:00 | Mar. 24, 2010 12:00 | 5.7 | 56.3 | 45.6 | −0.452 | −0.879 | −0.489 | −0.607 |
| Mar. 27, 2010 03:00 | Mar. 28, 2010 03:00 | 5.7 | 56.3 | 45.6 | −0.274 | −0.388 | 0.110 | −0.184 |
| Apr. 16, 2010 18:00 | Apr. 17, 2010 18:00 | 24.1 | 57.6 | 172.4 | −0.120 | −0.170 | 0.026 | −0.088 |
| Apr. 18, 2010 06:00 | Apr. 19, 2010 06:00 | 24.1 | 57.6 | 172.4 | −0.044 | −0.062 | −0.120 | −0.076 |
| Apr. 25, 2010 09:00 | Apr. 26, 2010 09:00 | 24.1 | 57.6 | 172.4 | −0.112 | −0.218 | −0.302 | −0.210 |
| Apr. 27, 2010 06:00 | Apr. 28, 2010 06:00 | 24.1 | 57.6 | 172.4 | −0.049 | −0.098 | −0.350 | −0.166 |
| May 13, 2010 15:00 | May 14, 2010 15:00 | 21.9 | 60.5 | 151.2 | −0.138 | −0.123 | −0.098 | −0.120 |
| May 15, 2010 15:00 | May 16, 2010 15:00 | 21.9 | 60.5 | 151.2 | −0.108 | −0.106 | −0.144 | −0.119 |
| May 22, 2010 12:00 | May 23, 2010 12:00 | 21.9 | 60.5 | 151.2 | −0.153 | −0.055 | −0.300 | −0.169 |
| May 23, 2010 21:00 | May 24, 2010 21:00 | 21.9 | 60.5 | 151.2 | −0.140 | −0.176 | −0.114 | −0.143 |
| May 27, 2010 03:00 | May 28, 2010 03:00 | 21.9 | 60.5 | 151.2 | −0.007 | −0.084 | −0.169 | −0.087 |
| Jun. 12, 2010 06:00 | Jun. 13, 2010 06:00 | 14.4 | 75.3 | 102.2 | −0.249 | −0.268 | −0.327 | −0.281 |
| Jun. 19, 2010 21:00 | Jun. 20, 2010 21:00 | 14.4 | 75.3 | 102.2 | −0.295 | −0.294 | −0.129 | −0.239 |
| Jun. 21, 2010 09:00 | Jun. 22, 2010 09:00 | 14.4 | 75.3 | 102.2 | −0.338 | −0.181 | −0.136 | −0.218 |
| Jul. 6, 2010 12:00 | Jul. 7, 2010 12:00 | 7.1 | 59.4 | 73.7 | −0.229 | −0.246 | −0.322 | −0.266 |
| Jul. 10, 2010 12:00 | Jul. 11, 2010 12:00 | 7.1 | 59.4 | 73.7 | −0.232 | −0.112 | −0.576 | −0.307 |
| Jul. 16, 2010 15:00 | Jul. 17, 2010 15:00 | 7.1 | 59.4 | 73.7 | −0.222 | −0.450 | −0.283 | −0.318 |

TABLE 1-continued

| | | | | | | | | |
|---|---|---|---|---|---|---|---|---|
| Jul. 17, 2010 15:00 | Jul. 18, 2010 15:00 | 7.1 | 59.4 | 73.7 | −0.229 | −0.230 | −0.757 | −0.405 |
| Jul. 18, 2010 15:00 | Jul. 19, 2010 15:00 | 7.1 | 59.4 | 73.7 | −0.264 | −0.371 | −0.480 | −0.372 |
| Aug. 19, 2010 12:00 | Aug. 20, 2010 12:00 | 17.9 | 67.7 | 107.3 | −0.307 | −0.242 | −0.075 | −0.208 |
| Aug. 29, 2010 15:00 | Aug. 30, 2010 15:00 | 17.9 | 67.7 | 107.3 | −0.322 | −0.521 | −0.218 | −0.354 |
| Aug. 30, 2010 18:00 | Aug. 31, 2010 18:00 | 17.9 | 67.7 | 107.3 | −0.307 | −0.493 | −0.355 | −0.385 |
| Aug. 31, 2010 12:00 | Sep. 1, 2010 12:00 | 3.5 | 41.4 | 65.8 | −0.093 | 0.218 | −0.312 | −0.062 |
| Sep. 3, 2010 21:00 | Sep. 4, 2010 21:00 | 8.5 | 41.4 | 65.8 | −0.067 | −0.223 | 0.144 | −0.049 |
| Sep. 4, 2010 21:00 | Sep. 5, 2010 21:00 | 8.5 | 41.4 | 65.8 | 0.032 | 0.028 | −0.413 | −0.118 |
| Sep. 11, 2010 06:00 | Sep. 12, 2010 06:00 | 3.5 | 41.4 | 65.8 | −0.146 | −0.370 | −0.322 | −0.279 |
| Sep. 12, 2010 09:00 | Sep. 13, 2010 09:00 | 8.5 | 41.4 | 65.8 | −0.112 | −0.138 | −0.283 | −0.178 |
| Sep. 22, 2010 06:00 | Sep. 23, 2010 06:00 | 8.5 | 41.4 | 65.8 | −0.105 | −0.062 | −0.645 | −0.271 |
| Oct. 1, 2010 18:00 | Oct. 2, 2010 18:00 | 16.4 | 33.3 | 94.4 | −0.133 | −0.407 | −0.214 | −0.251 |
| Oct. 3, 2010 12:00 | Oct. 4, 2010 12:00 | 16.4 | 33.3 | 94.4 | −0.084 | −0.302 | −0.665 | −0.350 |
| Oct. 14, 2010 09:00 | Oct. 15, 2010 09:00 | 16.4 | 33.3 | 94.4 | −0.102 | −0.331 | −0.494 | −0.309 |
| Oct. 31, 2010 12:00 | Nov. 1, 2010 12:00 | 11.2 | 44.4 | 63.7 | −0.315 | −0.345 | −0.063 | −0.241 |
| Nov. 1, 2010 06:00 | Nov. 2, 2010 06:00 | 11.2 | 44.4 | 63.7 | −0.283 | −0.401 | −0.335 | −0.340 |
| Nov. 6, 2010 15:00 | Nov. 7, 2010 15:00 | 11.2 | 44.4 | 63.7 | −0.257 | −0.536 | −0.362 | −0.385 |
| Nov. 9, 2010 15:00 | Nov. 10, 2010 15:00 | 11.2 | 44.4 | 63.7 | −0.155 | −0.205 | −0.196 | −0.185 |
| Nov. 19, 2010 06:00 | Nov. 20, 2010 06:00 | 11.2 | 44.4 | 63.7 | −0.292 | −0.203 | −0.404 | −0.300 |
| Dec. 2, 2010 06:00 | Dec. 3, 2010 06:00 | 10.1 | 34.5 | 61.3 | −0.184 | −0.093 | 0.067 | −0.070 |
| Dec. 3, 2010 06:00 | Dec. 4, 2010 06:00 | 10.1 | 34.5 | 61.3 | −0.249 | −0.152 | −0.331 | −0.244 |
| Dec. 4, 2010 21:00 | Dec. 5, 2010 21:00 | 10.1 | 34.5 | 61.3 | 0.013 | −0.205 | −0.365 | −0.186 |
| Dec. 9, 2010 09:00 | Dec. 10, 2010 09:00 | 10.1 | 34.5 | 61.3 | −0.102 | −0.239 | −0.337 | −0.226 |
| Dec. 11, 2010 00:00 | Dec. 12, 2010 00:00 | 10.1 | 34.5 | 61.3 | −0.334 | −0.116 | −0.721 | −0.390 |
| Dec. 22, 2010 09:00 | Dec. 23, 2010 09:00 | 10.1 | 34.5 | 61.3 | −0.171 | −0.213 | 0.078 | −0.102 |
| Jan. 4, 2011 21:00 | Jan. 5, 2011 21:00 | 7.9 | 59.8 | 41.9 | −0.364 | −0.153 | −0.585 | −0.367 |
| Jan. 23, 2011 15:00 | Jan. 24, 2011 15:00 | 7.9 | 59.8 | 41.9 | −0.537 | −0.594 | 0.321 | −0.270 |
| Jan. 30, 2011 03:00 | Jan. 31, 2011 03:00 | 7.9 | 59.8 | 41.9 | −1.045 | −1.120 | −0.279 | −0.814 |
| Feb. 3, 2011 03:00 | Feb. 4, 2011 03:00 | 11.9 | 41.4 | 77.5 | −0.154 | −0.329 | 0.150 | −0.111 |
| Feb. 13, 2011 09:00 | Feb. 14, 2011 09:00 | 11.9 | 41.4 | 77.5 | −0.207 | −0.267 | −0.099 | −0.191 |
| Feb. 17, 2011 03:00 | Feb. 18, 2011 03:00 | 11.9 | 41.4 | 77.5 | −0.083 | −0.335 | −0.204 | −0.207 |
| Feb. 24, 2011 00:00 | Feb. 25, 2011 00:00 | 11.9 | 41.4 | 77.5 | −0.099 | −0.280 | −0.217 | −0.199 |
| Feb. 27, 2011 03:00 | Feb. 28, 2011 03:00 | 11.9 | 41.4 | 77.5 | −0.002 | −0.167 | −0.682 | −0.283 |
| Mar. 14, 2011 18:00 | Mar. 15, 2011 18:00 | 23.6 | 40.2 | 147.0 | −0.100 | −0.180 | 0.108 | −0.057 |
| Mar. 15, 2011 18:00 | Mar. 16, 2011 18:00 | 23.6 | 40.2 | 147.0 | −0.104 | −0.247 | −0.246 | −0.199 |
| Mar. 16, 2011 18:00 | Mar. 17, 2011 18:00 | 23.6 | 40.2 | 147.0 | −0.076 | −0.056 | −0.023 | −0.051 |
| Mar. 26, 2011 06:00 | Mar. 27, 2011 06:00 | 23.6 | 40.2 | 147.0 | −0.074 | −0.275 | −0.179 | −0.176 |
| Mar. 27, 2011 06:00 | Mar. 28, 2011 06:00 | 23.6 | 40.2 | 147.0 | −0.027 | −0.065 | −0.116 | −0.069 |
| Apr. 25, 2011 06:00 | Apr. 26, 2011 06:00 | 15.6 | 73.7 | 112.6 | −0.220 | −0.163 | −0.102 | −0.162 |
| Apr. 26, 2011 15:00 | Apr. 27, 2011 15:00 | 15.6 | 73.7 | 112.6 | −0.260 | −0.322 | −0.359 | −0.313 |
| Apr. 27, 2011 18:00 | Apr. 28, 2011 18:00 | 15.6 | 73.7 | 112.6 | −0.261 | −0.226 | −0.024 | −0.170 |
| May 9, 2011 03:00 | May 10, 2011 03:00 | 20.0 | 71.7 | 141.9 | −0.128 | −0.236 | −0.170 | −0.178 |
| May 12, 2011 12:00 | May 13, 2011 12:00 | 20.0 | 71.7 | 141.9 | −0.056 | −0.309 | −0.095 | −0.153 |
| May 13, 2011 21:00 | May 14, 2011 21:00 | 20.0 | 71.7 | 141.9 | −0.100 | −0.071 | −0.023 | −0.065 |
| May 19, 2011 12:00 | May 20, 2011 12:00 | 20.0 | 71.7 | 141.9 | −0.136 | −0.245 | −0.222 | −0.201 |
| May 20, 2011 12:00 | May 21, 2011 12:00 | 20.0 | 71.7 | 141.9 | −0.098 | −0.183 | 0.113 | −0.056 |
| May 22, 2011 09:00 | May 23, 2011 09:00 | 20.0 | 71.7 | 141.9 | −0.133 | −0.233 | −0.177 | −0.181 |
| May 25, 2011 03:00 | May 26, 2011 03:00 | 20.0 | 71.7 | 141.9 | 0.003 | 0.040 | −0.238 | −0.065 |
| Jun. 3, 2011 21:00 | Jun. 4, 2011 21:00 | 10.5 | 106.5 | 100.1 | −0.251 | −0.418 | −0.364 | −0.344 |
| Jun. 18, 2011 06:00 | Jun. 19, 2011 06:00 | 10.5 | 106.5 | 100.1 | −0.384 | −0.402 | −0.512 | −0.433 |
| Jun. 28, 2011 06:00 | Jun. 29, 2011 06:00 | 10.5 | 106.5 | 100.1 | −0.643 | −0.714 | −0.838 | −0.732 |
| Jul. 16, 2011 09:00 | Jul. 17, 2011 09:00 | 10.8 | 102.9 | 93.4 | −0.328 | −0.519 | −0.436 | −0.428 |
| Jul. 27, 2011 06:00 | Jul. 28, 2011 06:00 | 10.8 | 102.9 | 93.4 | −0.481 | −0.745 | −0.353 | −0.526 |
| Jul. 28, 2011 06:00 | Jul. 29, 2011 06:00 | 10.8 | 102.9 | 93.4 | −0.588 | −0.844 | −0.861 | −0.764 |
| Aug. 2, 2011 18:00 | Aug. 3, 2011 18:00 | 19.6 | 68.9 | 82.8 | −0.220 | −0.329 | −0.243 | −0.264 |
| Aug. 18, 2011 21:00 | Aug. 19, 2011 21:00 | 19.6 | 68.9 | 82.8 | −0.375 | −0.380 | −0.119 | −0.291 |
| Aug. 19, 2011 21:00 | Aug. 20, 2011 21:00 | 19.6 | 68.9 | 82.8 | −0.103 | −0.064 | −0.304 | −0.157 |
| Aug. 21, 2011 00:00 | Aug. 22, 2011 00:00 | 19.6 | 68.9 | 82.8 | −0.308 | −0.211 | −0.505 | −0.341 |
| Aug. 31, 2011 03:00 | Sep. 1, 2011 03:00 | 19.6 | 68.9 | 82.8 | −0.208 | −0.321 | −0.313 | −0.281 |
| Aug. 31, 2011 12:00 | Sep. 1, 2011 12:00 | 19.6 | 68.9 | 82.8 | −0.235 | −0.285 | −0.270 | −0.263 |
| Sep. 8, 2011 12:00 | Sep. 9, 2011 12:00 | 22.8 | 64.2 | 144.0 | −0.172 | −0.253 | −0.124 | −0.183 |
| Sep. 23, 2011 06:00 | Sep. 24, 2011 06:00 | 22.8 | 64.2 | 144.0 | −0.231 | −0.276 | −0.309 | −0.272 |
| Oct. 10, 2011 12:00 | Oct. 11, 2011 12:00 | 20.1 | 47.0 | 83.6 | −0.145 | −0.319 | −0.075 | −0.180 |
| Oct. 13, 2011 21:00 | Oct. 14, 2011 21:00 | 20.1 | 47.0 | 83.6 | −0.160 | −0.217 | −0.159 | −0.179 |
| Oct. 18, 2011 00:00 | Oct. 19, 2011 00:00 | 20.1 | 47.0 | 83.6 | 0.115 | −0.096 | −0.301 | −0.094 |
| Oct. 22, 2011 03:00 | Oct. 23, 2011 03:00 | 20.1 | 47.0 | 83.6 | −0.214 | −0.222 | −0.230 | −0.222 |
| Oct. 28, 2011 12:00 | Oct. 29, 2011 12:00 | 20.1 | 47.0 | 83.6 | −0.257 | −0.495 | 0.496 | −0.085 |
| Nov. 6, 2011 03:00 | Nov. 7, 2011 03:00 | 16.7 | 30.5 | 90.5 | −0.021 | −0.279 | −0.094 | −0.131 |
| Nov. 9, 2011 15:00 | Nov. 10, 2011 15:00 | 16.7 | 30.5 | 90.5 | −0.029 | −0.477 | 0.115 | −0.130 |
| Nov. 12, 2011 18:00 | Nov. 13, 2011 18:00 | 16.7 | 30.5 | 90.5 | −0.017 | −0.403 | 0.034 | −0.129 |
| Nov. 18, 2011 09:00 | Nov. 19, 2011 09:00 | 16.7 | 30.5 | 90.5 | −0.068 | −0.245 | −0.172 | −0.161 |
| Nov. 19, 2011 09:00 | Nov. 20, 2011 09:00 | 16.7 | 30.5 | 90.5 | −0.128 | −0.551 | −0.233 | −0.304 |
| Dec. 6, 2011 00:00 | Dec. 7, 2011 00:00 | 8.5 | 24.7 | 43.7 | −0.137 | −0.354 | −0.295 | −0.262 |
| Dec. 15, 2011 12:00 | Dec. 16, 2011 12:00 | 8.5 | 24.7 | 43.7 | −0.108 | −0.025 | 0.080 | −0.018 |
| Dec. 16, 2011 12:00 | Dec. 17, 2011 12:00 | 8.5 | 24.7 | 43.7 | −0.231 | −0.544 | −0.642 | −0.472 |
| Dec. 25, 2011 12:00 | Dec. 26, 2011 12:00 | 8.5 | 24.7 | 43.7 | −0.171 | −0.194 | −0.250 | −0.205 |
| Dec. 26, 2011 21:00 | Dec. 27, 2011 21:00 | 8.5 | 24.7 | 43.7 | −0.175 | −0.418 | −0.140 | −0.244 |
| Jan. 4, 2012 06:00 | Jan. 5, 2012 06:00 | 17.9 | 59.5 | 91.4 | −0.381 | −0.546 | 0.191 | −0.245 |
| Jan. 14, 2012 15:00 | Jan. 15, 2012 15:00 | 17.9 | 59.5 | 91.4 | −0.407 | −0.409 | −0.199 | −0.338 |
| Jan. 19, 2012 00:00 | Jan. 20, 2012 00:00 | 17.9 | 59.5 | 91.4 | −0.152 | −0.100 | −0.258 | −0.170 |

TABLE 1-continued

| | | | | | | | | |
|---|---|---|---|---|---|---|---|---|
| Feb. 11, 2012 03:00 | Feb. 12, 2012 03:00 | 15.6 | 77.2 | 105.4 | −0.171 | −0.177 | −0.066 | −0.138 |
| Feb. 16, 2012 09:00 | Feb. 17, 2012 09:00 | 15.6 | 77.2 | 105.4 | −0.300 | −0.466 | 0.173 | −0.198 |
| Feb. 17, 2012 09:00 | Feb. 18, 2012 09:00 | 15.6 | 77.2 | 105.4 | −0.532 | −0.802 | −0.371 | −0.568 |
| Feb. 22, 2012 21:00 | Feb. 23, 2012 21:00 | 15.6 | 77.2 | 105.4 | −0.392 | −0.616 | −0.003 | −0.337 |
| Mar. 21, 2012 21:00 | Mar. 22, 2012 21:00 | 30.3 | 108.7 | 167.8 | −0.306 | −0.319 | −0.167 | −0.264 |
| Mar. 25, 2012 12:00 | Mar. 26, 2012 12:00 | 30.3 | 108.7 | 167.8 | −0.324 | −0.372 | −0.386 | −0.361 |
| Mar. 28, 2012 21:00 | Mar. 29, 2012 21:00 | 30.3 | 108.7 | 167.8 | −0.376 | −0.400 | −0.127 | −0.301 |
| Mar. 30, 2012 12:00 | Mar. 31, 2012 12:00 | 30.3 | 108.7 | 167.8 | −0.406 | −0.434 | −0.108 | −0.316 |
| Apr. 5, 2012 21:00 | Apr. 6, 2012 21:00 | 21.4 | 92.3 | 131.7 | −0.418 | −0.277 | −0.115 | −0.270 |
| Apr. 8, 2012 18:00 | Apr. 9, 2012 18:00 | 21.4 | 92.3 | 131.7 | −0.354 | −0.443 | −0.127 | −0.308 |
| Apr. 15, 2012 21:00 | Apr. 16, 2012 21:00 | 21.4 | 92.3 | 131.7 | −0.172 | −0.293 | −0.251 | −0.239 |
| Apr. 20, 2012 15:00 | Apr. 21, 2012 15:00 | 21.4 | 92.3 | 131.7 | −0.260 | −0.081 | −0.224 | −0.188 |
| Apr. 29, 2012 21:00 | Apr. 30, 2012 21:00 | 21.4 | 92.3 | 131.7 | −0.227 | −0.138 | −0.045 | −0.137 |
| May 4, 2012 03:00 | May 5, 2012 03:00 | 14.1 | 75.4 | 116.6 | −0.312 | −0.350 | −0.042 | −0.235 |
| May 5, 2012 03:00 | May 6, 2012 03:00 | 14.1 | 75.4 | 116.6 | −0.108 | −0.087 | −0.280 | −0.158 |
| May 6, 2012 21:00 | May 7, 2012 21:00 | 14.1 | 75.4 | 116.6 | −0.254 | −0.377 | −0.174 | −0.268 |
| May 21, 2012 03:00 | May 22, 2012 03:00 | 14.1 | 75.4 | 116.6 | −0.052 | −0.211 | −0.421 | −0.228 |
| May 27, 2012 06:00 | May 28, 2012 06:00 | 14.1 | 75.4 | 116.6 | −0.120 | −0.402 | 0.002 | −0.173 |
| May 28, 2012 18:00 | May 29, 2012 18:00 | 14.1 | 75.4 | 116.6 | 0.008 | 0.091 | −0.490 | −0.131 |
| Jun. 13, 2012 09:00 | Jun. 14, 2012 09:00 | 16.7 | 81.0 | 160.2 | −0.024 | 0.002 | −0.239 | −0.087 |
| Jun. 14, 2012 12:00 | Jun. 15, 2012 12:00 | 16.7 | 81.0 | 160.2 | −0.125 | −0.114 | −0.109 | −0.116 |
| Jun. 21, 2012 06:00 | Jun. 22, 2012 06:00 | 16.7 | 81.0 | 160.2 | −0.150 | −0.078 | −0.447 | −0.225 |
| Jun. 22, 2012 15:00 | Jun. 23, 2012 15:00 | 16.7 | 81.0 | 160.2 | −0.073 | −0.104 | −0.348 | −0.175 |
| Jul. 13, 2012 09:00 | Jul. 14, 2012 09:00 | 29.9 | 109.4 | 217.3 | −0.140 | −0.210 | −0.220 | −0.190 |
| Jul. 26, 2012 12:00 | Jul. 27, 2012 12:00 | 29.9 | 109.4 | 217.3 | −0.327 | −0.328 | −0.163 | −0.273 |
| Jul. 31, 2012 03:00 | Aug. 1, 2012 03:00 | 29.9 | 109.4 | 217.3 | −0.116 | −0.182 | −0.021 | −0.106 |
| Aug. 10, 2012 09:00 | Aug. 11, 2012 09:00 | 8.6 | 86.9 | 81.0 | −0.522 | −0.443 | −0.816 | −0.594 |
| Aug. 29, 2012 18:00 | Aug. 30, 2012 18:00 | 8.6 | 86.9 | 81.0 | −0.530 | −0.611 | −0.053 | −0.398 |
| Aug. 30, 2012 21:00 | Aug. 31, 2012 21:00 | 8.6 | 86.9 | 81.0 | −0.553 | −0.138 | −1.166 | −0.850 |
| Sep. 10, 2012 15:00 | Sep. 11, 2012 15:00 | 24.4 | 47.0 | 159.6 | −0.062 | −0.147 | 0.146 | −0.021 |
| Sep. 13, 2012 21:00 | Sep. 14, 2012 21:00 | 24.4 | 47.0 | 159.6 | −0.022 | 0.057 | −0.002 | 0.011 |
| Sep. 23, 2012 03:00 | Sep. 24, 2012 03:00 | 24.4 | 47.0 | 159.6 | −0.107 | −0.229 | −0.173 | −0.170 |
| Sep. 24, 2012 06:00 | Sep. 25, 2012 06:00 | 24.4 | 47.0 | 159.6 | −0.074 | −0.033 | −0.151 | −0.086 |
| Sep. 25, 2012 06:00 | Sep. 26, 2012 06:00 | 24.4 | 47.0 | 159.6 | −0.051 | −0.076 | −0.208 | −0.111 |
| Sep. 28, 2012 00:00 | Sep. 29, 2012 00:00 | 24.4 | 47.0 | 159.6 | −0.052 | −0.202 | −0.126 | −0.127 |
| Oct. 19, 2012 18:00 | Oct. 20, 2012 18:00 | 31.9 | 52.2 | 147.9 | −0.109 | −0.254 | −0.049 | −0.137 |
| Oct. 20, 2012 18:00 | Oct. 21, 2012 18:00 | 31.9 | 52.2 | 147.9 | −0.104 | −0.022 | −0.067 | −0.064 |
| Oct. 22, 2012 03:00 | Oct. 23, 2012 03:00 | 31.9 | 52.2 | 147.9 | −0.127 | −0.121 | −0.211 | −0.153 |
| Oct. 30, 2012 06:00 | Oct. 31, 2012 06:00 | 31.9 | 52.2 | 147.9 | −0.117 | −0.096 | −0.122 | −0.112 |
| Nov. 8, 2012 03:00 | Nov. 9, 2012 03:00 | 22.0 | 39.7 | 120.9 | −0.064 | −0.166 | −0.272 | −0.168 |
| Nov. 9, 2012 09:00 | Nov. 10, 2012 09:00 | 22.0 | 39.7 | 120.9 | −0.119 | −0.308 | 0.069 | −0.119 |
| Nov. 27, 2012 21:00 | Nov. 28, 2012 21:00 | 22.0 | 39.7 | 120.9 | −0.078 | −0.028 | −0.332 | −0.146 |
| Dec. 6, 2012 06:00 | Dec. 7, 2012 06:00 | 6.4 | 23.7 | 54.2 | −0.131 | −0.266 | 0.074 | −0.108 |
| Dec. 7, 2012 06:00 | Dec. 8, 2012 06:00 | 6.4 | 23.7 | 54.2 | −0.099 | −0.315 | −0.374 | −0.263 |
| Dec. 10, 2012 21:00 | Dec. 11, 2012 21:00 | 6.4 | 23.7 | 54.2 | 0.009 | −0.018 | −0.290 | −0.100 |
| Dec. 13, 2012 18:00 | Dec. 14, 2012 18:00 | 6.4 | 23.7 | 54.2 | 0.127 | 0.369 | −0.780 | −0.095 |
| Dec. 22, 2012 12:00 | Dec. 23, 2012 12:00 | 6.4 | 23.7 | 54.2 | −0.031 | −0.301 | 0.129 | −0.068 |
| Dec. 27, 2012 12:00 | Dec. 28, 2012 12:00 | 6.4 | 23.7 | 54.2 | −0.079 | −0.080 | −0.303 | −0.154 |
| Jan. 1, 2013 00:00 | Jan. 2, 2013 00:00 | 11.7 | 26.2 | 71.5 | −0.147 | −0.255 | −0.432 | −0.278 |
| Jan. 22, 2013 18:00 | Jan. 23, 2013 18:00 | 11.7 | 26.2 | 71.5 | −0.061 | −0.284 | −0.228 | −0.191 |
| Jan. 30, 2013 21:00 | Jan. 31, 2013 21:00 | 11.7 | 26.2 | 71.5 | −0.090 | −0.300 | −0.478 | −0.289 |
| Feb. 5, 2013 18:00 | Feb. 6, 2013 18:00 | 10.2 | 68.0 | 67.3 | −0.669 | −0.909 | −0.445 | −0.674 |
| Feb. 11, 2013 06:00 | Feb. 12, 2013 06:00 | 10.2 | 68.0 | 67.3 | −0.157 | −0.366 | −0.466 | −0.330 |
| Feb. 24, 2013 21:00 | Feb. 25, 2013 21:00 | 10.2 | 68.0 | 67.3 | −0.490 | −0.613 | 0.140 | −0.321 |
| Mar. 6, 2013 06:00 | Mar. 7, 2013 06:00 | 27.5 | 58.4 | 138.2 | −0.213 | −0.315 | −0.084 | −0.204 |
| Mar. 7, 2013 18:00 | Mar. 8, 2013 18:00 | 27.5 | 58.4 | 138.2 | −0.190 | −0.218 | −0.318 | −0.242 |
| Mar. 11, 2013 09:00 | Mar. 12, 2013 09:00 | 27.5 | 58.4 | 138.2 | −0.098 | −0.159 | −0.082 | −0.113 |
| Mar. 13, 2013 09:00 | Mar. 14, 2013 09:00 | 27.5 | 58.4 | 138.2 | −0.059 | −0.168 | −0.023 | −0.083 |
| Mar. 26, 2013 03:00 | Mar. 27, 2013 03:00 | 27.5 | 58.4 | 138.2 | −0.143 | −0.301 | −0.078 | −0.174 |
| Apr. 15, 2013 15:00 | Apr. 16, 2013 15:00 | 12.3 | 51.9 | 93.3 | −0.150 | −0.225 | −0.031 | −0.135 |
| Apr. 17, 2013 15:00 | Apr. 18, 2013 15:00 | 12.3 | 51.9 | 93.3 | −0.041 | −0.104 | −0.278 | −0.141 |
| Apr. 18, 2013 21:00 | Apr. 19, 2013 21:00 | 12.3 | 51.9 | 93.3 | −0.216 | −0.249 | −0.356 | −0.274 |
| Apr. 20, 2013 18:00 | Apr. 21, 2013 18:00 | 12.3 | 51.9 | 93.3 | −0.158 | −0.328 | −0.224 | −0.237 |
| Apr. 22, 2013 06:00 | Apr. 23, 2013 06:00 | 12.3 | 51.9 | 93.3 | −0.072 | −0.132 | 0.033 | −0.057 |
| May 3, 2013 03:00 | May 4, 2013 03:00 | 17.9 | 152.7 | 160.8 | −0.392 | −0.669 | 0.051 | −0.336 |
| May 8, 2013 21:00 | May 9, 2013 21:00 | 17.9 | 152.7 | 160.8 | −0.346 | −0.361 | −0.598 | −0.435 |
| May 12, 2013 06:00 | May 13, 2013 06:00 | 17.9 | 152.7 | 160.8 | −0.464 | −0.705 | −0.018 | −0.396 |
| Jun. 10, 2013 12:00 | Jun. 11, 2013 12:00 | 29.0 | 106.5 | 177.6 | −0.132 | −0.053 | −0.007 | −0.064 |
| Jun. 12, 2013 09:00 | Jun. 13, 2013 09:00 | 29.0 | 106.5 | 177.6 | −0.218 | −0.293 | 0.038 | −0.158 |
| Jun. 13, 2013 18:00 | Jun. 14, 2013 18:00 | 29.0 | 106.5 | 177.6 | −0.277 | −0.285 | −0.248 | −0.270 |
| Jun. 16, 2013 00:00 | Jun. 17, 2013 00:00 | 29.0 | 106.5 | 177.6 | −0.298 | −0.291 | −0.262 | −0.284 |
| Jun. 25, 2013 21:00 | Jun. 26, 2013 21:00 | 29.0 | 106.5 | 177.6 | −0.177 | −0.316 | 0.237 | −0.086 |
| Jul. 2, 2013 12:00 | Jul. 3, 2013 12:00 | 23.4 | 106.0 | 209.0 | −0.178 | −0.165 | −0.034 | −0.126 |
| Jul. 3, 2013 15:00 | Jul. 4, 2013 15:00 | 23.4 | 106.0 | 209.0 | −0.131 | −0.113 | −0.237 | −0.160 |
| Jul. 16, 2013 21:00 | Jul. 17, 2013 21:00 | 23.4 | 106.0 | 209.0 | −0.134 | −0.106 | −0.217 | −0.152 |
| Jul. 20, 2013 09:00 | Jul. 21, 2013 09:00 | 23.4 | 106.0 | 209.0 | −0.177 | −0.221 | −0.192 | −0.197 |
| Jul. 21, 2013 09:00 | Jul. 22, 2013 09:00 | 23.4 | 106.0 | 209.0 | −0.034 | −0.040 | −0.218 | −0.098 |
| Oct. 5, 2013 12:06 | Oct. 6, 2013 12:06 | 19.0 | 36.1 | 116.6 | −0.008 | −0.242 | −0.141 | −0.130 |
| Oct. 23, 2013 15:06 | Oct. 24, 2013 15:06 | 19.0 | 36.1 | 116.6 | −0.041 | −0.043 | −0.117 | −0.067 |
| Oct. 24, 2013 21:06 | Oct. 25, 2013 21:06 | 19.0 | 36.1 | 116.6 | −0.054 | 0.002 | −0.275 | −0.109 |

TABLE 1-continued

| | | | | | | | | |
|---|---|---|---|---|---|---|---|---|
| Nov. 18, 2013 12:00 | Nov. 19, 2013 12:00 | 14.8 | 63.0 | 93.7 | −0.367 | −0.410 | −0.558 | −0.445 |
| Nov. 20, 2013 21:00 | Nov. 21, 2013 21:00 | 14.8 | 63.0 | 93.7 | −0.387 | −0.471 | −0.422 | −0.427 |
| Nov. 22, 2013 03:00 | Nov. 23, 2013 03:00 | 14.8 | 63.0 | 93.7 | −0.385 | −0.412 | −0.351 | −0.382 |
| Dec. 2, 2013 03:00 | Dec. 3, 2013 03:00 | 10.7 | 35.7 | 54.1 | −0.242 | −0.052 | 0.359 | 0.022 |
| Dec. 12, 2013 12:00 | Dec. 13, 2013 12:00 | 10.7 | 35.7 | 54.1 | −0.029 | −0.142 | −0.033 | −0.068 |
| Dec. 21, 2013 15:00 | Dec. 22, 2013 15:00 | 10.7 | 35.7 | 54.1 | −0.314 | −0.373 | −0.570 | −0.419 |
| Dec. 22, 2013 15:00 | Dec. 23, 2013 15:00 | 10.7 | 35.7 | 54.1 | −0.185 | −0.210 | −0.478 | −0.291 |
| Dec. 23, 2013 15:00 | Dec. 24, 2013 15:00 | 10.7 | 35.7 | 54.1 | −0.171 | −0.299 | −0.174 | −0.215 |
| Dec. 26, 2013 15:00 | Dec. 27, 2013 15:00 | 10.7 | 35.7 | 54.1 | −0.310 | −0.347 | −0.720 | −0.459 |
| Dec. 28, 2013 06:00 | Dec. 29, 2013 06:00 | 10.7 | 35.7 | 54.1 | 0.086 | 0.259 | −0.059 | 0.095 |
| Jan. 16, 2014 18:00 | Jan. 17, 2014 18:00 | 9.7 | 44.0 | 77.7 | −0.133 | −0.122 | −0.900 | −0.385 |
| Jan. 18, 2014 06:00 | Jan. 19, 2014 06:00 | 9.7 | 44.0 | 77.7 | −0.248 | −0.455 | −0.791 | −0.498 |
| Jan. 19, 2014 06:00 | Jan. 20, 2014 06:00 | 9.7 | 44.0 | 77.7 | −0.158 | −0.659 | −0.449 | −0.422 |
| Jan. 31, 2014 12:00 | Feb. 1, 2014 12:00 | 9.7 | 44.0 | 77.7 | −0.100 | −0.218 | −0.654 | −0.324 |
| Feb. 4, 2014 12:00 | Feb. 5, 2014 12:00 | 27.5 | 47.6 | 130.2 | −0.152 | −0.097 | 0.034 | −0.072 |
| Feb. 12, 2014 18:00 | Feb. 13, 2014 18:00 | 27.5 | 47.6 | 130.2 | −0.120 | −0.086 | −0.183 | −0.129 |
| Feb. 13, 2014 18:00 | Feb. 14, 2014 18:00 | 27.5 | 47.6 | 130.2 | −0.210 | −0.335 | −0.150 | −0.232 |
| Feb. 26, 2014 03:00 | Feb. 27, 2014 03:00 | 27.5 | 47.6 | 130.2 | −0.106 | −0.185 | −0.091 | −0.127 |
| Mar. 7, 2014 03:00 | Mar. 8, 2014 03:00 | 9.3 | 56.2 | 39.6 | −0.414 | −0.607 | −0.173 | −0.398 |
| Mar. 9, 2014 00:00 | Mar. 10, 2014 00:00 | 9.3 | 56.2 | 39.6 | −0.580 | −0.560 | −0.217 | −0.452 |
| Mar. 15, 2014 09:00 | Mar. 16, 2014 09:00 | 9.3 | 56.2 | 39.6 | −0.050 | −0.252 | −0.044 | −0.115 |
| Mar. 16, 2014 09:00 | Mar. 17, 2014 09:00 | 9.3 | 56.2 | 39.6 | −0.415 | −0.886 | −0.224 | −0.508 |
| Mar. 24, 2014 00:00 | Mar. 25, 2014 00:00 | 9.3 | 56.2 | 39.6 | −0.115 | −0.386 | 0.169 | −0.111 |
| Apr. 10, 2014 06:00 | Apr. 11, 2014 06:00 | 21.3 | 82.2 | 113.8 | −0.303 | −0.361 | −0.227 | −0.297 |
| Apr. 27, 2014 03:00 | Apr. 28, 2014 03:00 | 21.3 | 82.2 | 113.8 | −0.180 | −0.323 | −0.190 | −0.231 |
| Apr. 28, 2014 21:00 | Apr. 29, 2014 21:00 | 21.3 | 82.2 | 113.8 | −0.157 | −0.365 | −0.156 | −0.226 |
| May 2, 2014 18:00 | May 3, 2014 18:00 | 12.9 | 75.3 | 94.6 | −0.339 | −0.614 | 0.145 | −0.269 |
| May 20, 2014 18:00 | May 21, 2014 18:00 | 12.9 | 75.3 | 94.6 | −0.300 | −0.246 | −0.354 | −0.300 |
| May 30, 2014 21:00 | May 31, 2014 21:00 | 12.9 | 75.3 | 94.6 | −0.228 | −0.011 | −0.305 | −0.181 |
| Aug. 9, 2014 09:00 | Aug. 10, 2014 09:00 | 20.6 | 80.7 | 122.8 | −0.068 | −0.149 | −0.219 | −0.145 |
| Aug. 14, 2014 09:00 | Aug. 15, 2014 09:00 | 20.6 | 80.7 | 122.8 | −0.071 | −0.239 | −0.112 | −0.141 |
| Aug. 15, 2014 21:00 | Aug. 16, 2014 21:00 | 20.6 | 80.7 | 122.8 | −0.244 | −0.394 | −0.195 | −0.278 |
| Aug. 17, 2014 15:00 | Aug. 18, 2014 15:00 | 20.6 | 80.7 | 122.8 | −0.128 | −0.175 | 0.104 | −0.066 |
| Aug. 24, 2014 12:00 | Aug. 25, 2014 12:00 | 20.6 | 80.7 | 122.8 | −0.246 | −0.388 | −0.235 | −0.290 |
| Aug. 25, 2014 15:00 | Aug. 26, 2014 15:00 | 20.6 | 80.7 | 122.8 | −0.155 | −0.146 | −0.333 | −0.211 |
| Sep. 7, 2014 06:00 | Sep. 8, 2014 06:00 | 10.4 | 86.7 | 102.0 | −0.337 | −0.493 | −0.561 | −0.464 |
| Sep. 15, 2014 03:00 | Sep. 16, 2014 03:00 | 10.4 | 86.7 | 102.0 | −0.545 | −0.803 | −0.576 | −0.641 |
| Sep. 20, 2014 21:00 | Sep. 21, 2014 21:00 | 10.4 | 86.7 | 102.0 | −0.218 | −0.213 | −0.613 | −0.348 |
| Oct. 3, 2014 03:00 | Oct. 4, 2014 03:00 | 14.7 | 94.9 | 98.8 | −0.252 | −0.278 | −0.498 | −0.343 |
| Oct. 4, 2014 15:00 | Oct. 5, 2014 15:00 | 14.7 | 94.9 | 98.8 | −0.513 | −0.247 | −0.347 | −0.369 |
| Oct. 7, 2014 06:00 | Oct. 8, 2014 06:00 | 14.7 | 94.9 | 98.8 | −0.562 | −0.790 | −0.527 | −0.627 |
| Oct. 11, 2014 15:00 | Oct. 12, 2014 15:00 | 14.7 | 94.9 | 98.8 | −0.158 | −0.461 | −0.442 | −0.354 |
| Mar. 9, 2015 06:00 | Mar. 10, 2015 06:00 | 41.6 | 106.6 | 130.0 | −0.505 | −0.455 | −0.074 | −0.345 |
| Mar. 10, 2015 12:00 | Mar. 11, 2015 12:00 | 41.6 | 106.6 | 130.0 | −0.311 | −0.266 | −0.049 | −0.208 |
| Mar. 12, 2015 12:00 | Mar. 13, 2015 12:00 | 41.6 | 106.6 | 130.0 | −0.287 | −0.338 | −0.109 | −0.245 |
| Apr. 25, 2015 00:00 | Apr. 26, 2015 00:00 | 22.1 | 79.9 | 135.5 | −0.268 | −0.466 | −0.504 | −0.413 |
| Apr. 26, 2015 03:00 | Apr. 27, 2015 03:00 | 22.1 | 79.9 | 135.5 | −0.203 | −0.290 | −0.331 | −0.275 |
| Apr. 30, 2015 03:00 | May 1, 2015 03:00 | 22.1 | 79.9 | 135.5 | −0.095 | 0.005 | −0.277 | −0.122 |
| May 7, 2015 00:00 | May 8, 2015 00:00 | 17.6 | 77.8 | 128.1 | −0.234 | −0.147 | 0.205 | −0.059 |
| May 21, 2015 18:00 | May 22, 2015 18:00 | 17.6 | 77.8 | 128.1 | −0.121 | −0.206 | −0.067 | −0.131 |
| May 22, 2015 18:00 | May 23, 2015 18:00 | 17.6 | 77.8 | 128.1 | −0.167 | −0.336 | −0.415 | −0.306 |
| May 25, 2015 00:00 | May 26, 2015 00:00 | 17.6 | 77.8 | 128.1 | −0.159 | −0.437 | −0.227 | −0.274 |
| May 30, 2015 15:00 | May 31, 2015 15:00 | 17.6 | 77.8 | 128.1 | −0.015 | −0.104 | 0.043 | −0.025 |
| Jun. 2, 2015 03:00 | Jun. 3, 2015 03:00 | 39.6 | 73.1 | 162.2 | −0.140 | −0.217 | −0.236 | −0.198 |
| Jun. 3, 2015 15:00 | Jun. 4, 2015 15:00 | 39.6 | 73.1 | 162.2 | −0.118 | −0.367 | −0.297 | −0.261 |
| Jun. 4, 2015 21:00 | Jun. 5, 2015 21:00 | 39.6 | 73.1 | 162.2 | −0.135 | −0.323 | −0.192 | −0.217 |
| Jun. 19, 2015 15:00 | Jun. 20, 2015 15:00 | 39.6 | 73.1 | 162.2 | −0.140 | −0.099 | −0.051 | −0.097 |
| Jun. 20, 2015 15:00 | Jun. 21, 2015 15:00 | 39.6 | 73.1 | 162.2 | −0.107 | −0.204 | −0.209 | −0.173 |
| Jul. 2, 2015 03:00 | Jul. 3, 2015 03:00 | 18.2 | 98.6 | 119.8 | −0.229 | −0.450 | 0.048 | −0.210 |
| Jul. 3, 2015 03:00 | Jul. 4, 2015 03:00 | 18.2 | 98.6 | 119.8 | −0.300 | −0.473 | −0.455 | −0.409 |
| Jul. 19, 2015 06:00 | Jul. 20, 2015 06:00 | 18.2 | 98.6 | 119.8 | −0.296 | −0.305 | −0.705 | −0.435 |
| Aug. 14, 2015 00:00 | Aug. 15, 2015 00:00 | 31.2 | 149.0 | 176.5 | −0.487 | −0.306 | −0.127 | −0.307 |
| Aug. 30, 2015 00:00 | Aug. 31, 2015 00:00 | 31.2 | 149.0 | 176.5 | −0.401 | −0.320 | 0.003 | −0.239 |
| Aug. 31, 2015 06:00 | Sep. 1, 2015 06:00 | 31.2 | 149.0 | 176.5 | −0.365 | −0.281 | −0.200 | −0.282 |
| Aug. 31, 2015 12:00 | Sep. 1, 2015 12:00 | 31.2 | 149.0 | 176.5 | −0.282 | −0.197 | −0.197 | −0.225 |
| Sep. 1, 2015 15:00 | Sep. 2, 2015 15:00 | 27.9 | 99.5 | 161.4 | −0.149 | −0.236 | −0.173 | −0.186 |
| Sep. 25, 2015 15:00 | Sep. 26, 2015 15:00 | 27.9 | 99.5 | 161.4 | −0.380 | −0.319 | −0.044 | −0.248 |
| Sep. 26, 2015 15:00 | Sep. 27, 2015 15:00 | 27.9 | 99.5 | 161.4 | −0.154 | −0.072 | −0.398 | −0.208 |
| Sep. 27, 2015 15:00 | Sep. 28, 2015 15:00 | 27.9 | 99.5 | 161.4 | −0.400 | −0.339 | −0.443 | −0.394 |
| Sep. 29, 2015 12:00 | Sep. 30, 2015 12:00 | 27.9 | 99.5 | 161.4 | −0.408 | −0.550 | −0.472 | −0.477 |
| Oct. 19, 2015 03:00 | Oct. 20, 2015 03:00 | 25.9 | 109.7 | 170.9 | −0.295 | −0.425 | −0.093 | −0.271 |
| Oct. 26, 2015 00:00 | Oct. 27, 2015 00:00 | 25.9 | 109.7 | 170.9 | −0.483 | −0.619 | −0.093 | −0.398 |
| Oct. 27, 2015 00:00 | Oct. 28, 2015 00:00 | 25.9 | 109.7 | 170.9 | −0.218 | −0.262 | −0.171 | −0.217 |
| Oct. 28, 2015 00:00 | Oct. 29, 2015 00:00 | 25.9 | 109.7 | 170.9 | −0.470 | −0.616 | 0.317 | −0.256 |
| Nov. 21, 2015 06:00 | Nov. 22, 2015 06:00 | 25.9 | 57.5 | 163.8 | −0.117 | −0.034 | −0.006 | −0.053 |
| Nov. 22, 2015 06:00 | Nov. 23, 2015 06:00 | 25.9 | 57.5 | 163.8 | −0.126 | −0.168 | −0.158 | −0.151 |

Three of the quiet days are not in the VGO database. Of the 263 intervals, two proved to have substantial noise in the residuals: Feb. 13, 2014 18:00 to Feb. 14, 2014 18:00; and Sep. 26, 2015 15:00 to Sep. 27, 2015 15:00. These two days were excluded from the VGO analysis. For one quiet interval, Apr. 16, 2010 18:00 to Apr. 17, 2010 18:00, a complete 24-hour interval of data was not available so it was not included in the subsequent analysis.

There are three pairs of days in the quiet list have some overlap in time. For completeness, they were included in the VGO database for completeness. The pairs of days are: Oct. 31, 2010 12:00 to Nov. 1, 2010 12:00 and Nov. 1, 2010 6:00 to Nov. 2, 2010 6:00, having 6 hours of overlap; Aug. 31, 2011 3:00 to Sep. 1, 2011 3:00 and Aug. 31, 2011 12:00 to Sep. 1, 2011 12:00, having 15 hours of overlap; and Aug. 31, 2015 6:00 to Sep. 1, 2015 6:00 and Aug. 31, 2015 12:00 to Sep. 1, 2015 12:00, having 18 hours of overlap. This occurred because of the way month boundaries were treated between different stages in the selection. Rather than exclude members of these pairs, they are included with their activity level indices so that other investigators can choose for themselves which to exclude in their own analysis.

Analysis of magnetometer data from the Iridium Communications Block 1 satellites revealed coherent signatures and distributions in the departures of the calibrated observations relative to the IGRF-11 model when registered in geographic coordinates. Although there are substantial standard deviations (up to ~80 nT) in the localized latitude-longitude ranges used for the field mapping analysis (9° latitude by 9° longitude solid angle bins), the values are consistent with uncertainties in the Iridium Block 1 attitude determination system. The magnetic field residuals form Gaussian distributions consistent with a random error in the data. The large number of measurements in each solid angle bin afforded by the constellation in one day (~350 independent measurements) therefore imply standard errors in the mean of 2 to 4 nT, possibly low enough to yield information about Earth's main magnetic field. This level of sensitivity is sufficient for detecting secular variations and geomagnetic jerks related to variations in the magnetic field at the Earth's core-mantle boundary. The Iridium Block 1 constellation data therefore offer the promise of revealing the global behavior of Earth's field on time scales shorter than ever before resolved.

The global coverage allows a tight constraint on geomagnetically quiet periods, yielding 260 very quiet 24-hour intervals from the full dataset used for this study, spanning from January 2010 through November 2015. To study the time behavior of the magnetic field patterns, the patterns from the quiet dataset were convolved with spherical harmonic orthogonal functions to directly calculate the cosine and sine harmonic function coefficients. The time series of these coefficients were then used to assess the time dependence of each component of the signal. This revealed both gradual variations in the field, indicative of a discrepancy in the predicted and actual secular variation of the field as well as a gradual acceleration of the field relative to a secular variation, and shorter period variations matching annual and orbit local time precession periods. The precession and seasonal signals are attributed to artifacts in the magnetic field data arising from thermal gradients or other unidentified magnetic contaminations. Fourier analysis of the spherical harmonic coefficients allowed quantification and removal of these signals, as well as identification of components proportional to unphysical magnetic signals (i.e., the monopole term in the harmonic expansion). After removal of all of these artifacts, the patterns in the magnetic maps retained the basic features initially found in the original, registered data, indicating that these basic patterns are not readily associated with artificial signals. Because of the global nature of the observations, it is difficult to attribute the persistent geographically fixed patterns to external current systems.

The resultant reconstructed maps of perturbations over the 260 quiet intervals are a potential resource for study of the dynamics of Earth's magnetic field. The series of maps are essentially time series of magnetic field residuals at 800 virtual geomagnetic observatories (cf. Mandea and Olsen, 2006; Olsen and Mandea, 2007) albeit at an irregularly spaced set of quiet days. These time series represent what we consider to be the best data product of the Block 1 Iridium magnetic field data for core field science. There are various potential values of this novel data product. First, it is an independent estimation of Earth's field that does not use the regularization techniques employed in other studies. Second, it provides global maps of the field on much shorter time scales than previously possible. Third, it can augment standard techniques for co-estimating the field as an additional regularization constraint, thereby potentially enhancing standard techniques for deriving the changes in Earth's core field.

There are of course limitations with this dataset owing to the fact that the Iridium Block 1 instrumentation and spacecraft were never designed for high-precision science applications. Very importantly, the approach as described here does not provide an estimate of the field intensity but yields only the shape of the field relative to the mean intensity of the model field used for the calibration step in the analysis. A co-estimation analysis might potentially overcome this limitation, but the stability of the magnetometer calibration is a major challenge as the magnetometers are not thermally stable or precisely calibrated instruments. Moreover, onboard calibrations were changed throughout the lifetime of the Block 1 satellites to update operational performance, but these calibration records are not complete. The corrections applied in this analysis subsume these calibration updates and do not provide a record of calibration stability. Additionally, artifact analysis performed in this study suggests that orbit variations in the temperature and/or thermal environment remained after the application of the pre-flight temperature calibration. However, analysis of the residual correlation with temperature indicated that there was no remaining signature of temperature dependence, and so the thermal environment behavior possibly contributing to artifacts in the dataset may be due to some other effect such as a temperature gradient. As seen in comparisons between the original, binned magnetic field residuals and the corrected, reconstructed residuals, the consistency of the patterns, independent of the set of satellites in different local times, points to a real, natural source for the coherency in the patterns rather than artifacts in the analysis.

Even with these substantial limitations in mind, the global nature of the observations and persistent consistency of the patterns suggest that future analyses with these data may prove valuable. First, the residual maps derived here can be compared against other main field estimates such as WMM, IGRF-2015, or CHAOS-7 and later generations of the CHAOS model. Comparison of the residuals from these models vis-à-vis IGRF-11 may provide insight into whether the present derived data products afford new useful information. Independent of these comparisons, the short cadence and global coverage of the data product lends itself naturally to the study of the more rapid variations of the core-generated field, such as geomagnetic jerks. The dataset is particularly attractive for this application as it provides the first opportunity to characterize the global distribution of jerk signals to assess their temporal and spatial signatures independently.

Iridium NEXT data being collected for the continuation of the AMPERE dataset are presently in the calibration development phase, but the higher precision of the attitude sensors on the NEXT satellites suggest that the uncertainty due to attitude knowledge errors may be substantially lower. An assessment of the Iridium NEXT data for potential application to the continued study of the geomagnetic field is therefore future work that may be of great utility.

As described herein, the techniques described herein may improve the modeling of the Earth's magnetic field while substantially expediting the time required to obtain magnetic field estimates. The magnetic field estimates (as derived using aspects of the present disclosure) may be used for any variety of applications of practical importance including navigation and space weather specification/forecasting in addition to providing new fundamental information of signatures indicative of hydrodynamics of Earth's liquid Iron core.

Figure 30:
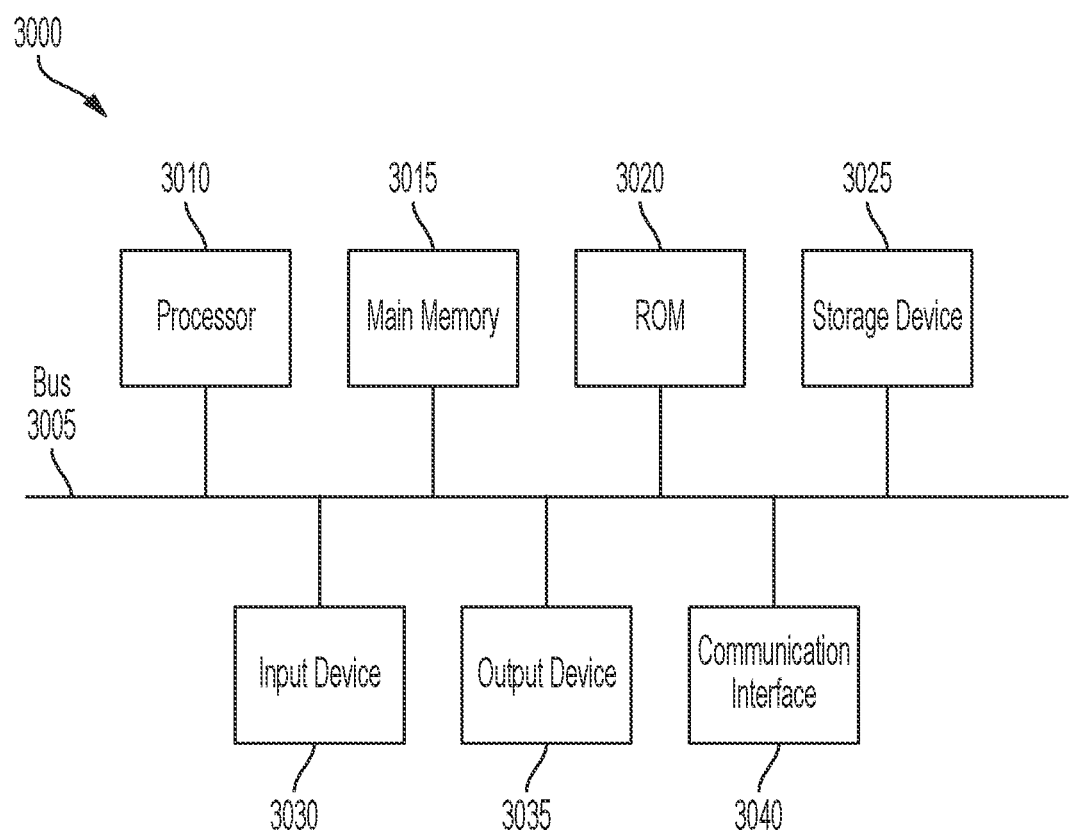
FIG. 30 illustrates example components of a device that may be used within environment of the above figures as described herein.

FIG. 30 illustrates example components of a device 3000 that may be used within environment 200 of FIG. 2. Device 3000 may correspond to the satellites 110 and/or the magnetic field estimation system 120. Each of the satellites 110 and/or the magnetic field estimation system 120 may include one or more devices 3000 and/or one or more components of device 3000.

As shown in FIG. 30, device 3000 may include a bus 3005, a processor 3010, a main memory 3015, a read only memory (ROM) 3020, a storage device 3025, an input device 3030, an output device 3035, and a communication interface 3040.

Bus 3005 may include a path that permits communication among the components of device 3000. Processor 3010 may include a processor, a microprocessor, an application specific integrated circuit (ASIC), a field programmable gate array (FPGA), or another type of processor that interprets and executes instructions. Main memory 3015 may include a random access memory (RAM) or another type of dynamic storage device that stores information or instructions for execution by processor 3010. ROM 3020 may include a ROM device or another type of static storage device that stores static information or instructions for use by processor 3010. Storage device 3025 may include a magnetic storage medium, such as a hard disk drive, or a removable memory, such as a flash memory.

Input device 3030 may include a component that permits an operator to input information to device 3000, such as a control button, a keyboard, a keypad, or another type of input device. Output device 3035 may include a component that outputs information to the operator, such as a light emitting diode (LED), a display, or another type of output device. Communication interface 3040 may include any transceiver-like component that enables device 3000 to communicate with other devices or networks. In some implementations, communication interface 3040 may include a wireless interface, a wired interface, or a combination of a wireless interface and a wired interface. In embodiments, communication interface 3040 may receiver computer readable program instructions from a network and may forward the computer readable program instructions for storage in a computer readable storage medium (e.g., storage device 3025).

Device 3000 may perform certain operations, as described in detail below. Device 3000 may perform these operations in response to processor 3010 executing software instructions contained in a computer-readable medium, such as main memory 3015. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 3015 from another computer-readable medium, such as storage device 3025, or from another device via communication interface 3040. The software instructions contained in main memory 3015 may direct processor 3010 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 3000 may include additional components, fewer components, different components, or differently arranged components than are shown in FIG. 30.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, by a computing device, magnetometer measurements from a plurality of globally distributed satellites, wherein the magnetometer measurements from the plurality of globally distributed satellites globally and simultaneously cover magnetic field measurements of an area encompassing the Earth;
   generating, by the computing device, a magnetic field model of the Earth based on the receiving the magnetometer measurements;
   refining the magnetic field model by grouping the magnetometer measurements into area groupings and applying spherical harmonic functions to calculate amplitudes at each area grouping to generate a refined magnetic field model; and
   storing or outputting, by the computing device, the magnetic field model, the refined magnetic field model, or both.

2. The method of claim 1, wherein the magnetic field model is refined prior to storing or outputting the magnetic field model.

3. The method of claim 1, wherein the refining the magnetic field model further comprises filter out artifacts and contaminates after applying the spherical harmonic functions.

4. The method of claim 1 further comprising intercalibrating the plurality of globally distributed satellites prior to receiving the magnetometer measurements.

5. The method of claim 1, wherein the plurality of globally distributed satellites perform functions that are unrelated to global magnetic field measuring.

6. The method of claim 1, wherein the plurality of globally distributed satellites are pre-deployed.

7. The method of claim 1, further comprising applying the magnetic field model as an input to a simulation or and input into an application.

8. A system comprising: a processor, a computer readable memory, a non-transitory computer readable storage medium associated with a computing device, and program instructions executable by the computing device to cause the computing device to perform operations comprising:
   receiving, by a computing device, magnetometer measurements from a plurality of globally distributed satellites, wherein the magnetometer measurements from the plurality of globally distributed satellites globally and simultaneously cover magnetic field measurements of an area encompassing the Earth;
   generating, by the computing device, a magnetic field model of the Earth based on the receiving the magnetometer measurements;
   refining the magnetic field model by grouping the magnetometer measurements into area groupings and applying spherical harmonic functions to calculate amplitudes at each area grouping to generate a refined magnetic field model; and
   storing or outputting, by the computing device, the magnetic field model, the refined magnetic field model, or both.

9. The system of claim 8, wherein the magnetic field model prior is refined to storing or outputting the magnetic field model.

10. The system of claim 8, wherein the refining the magnetic field model further comprises filter out artifacts and contaminates after applying the spherical harmonic functions.

11. The method of claim 8, wherein the operations further comprise intercalibrating the plurality of globally distributed satellites prior to receiving the magnetometer measurements.

12. The system of claim 8, wherein the plurality of globally distributed satellites perform functions that are unrelated to global magnetic field measuring.

13. The system of claim 8, wherein the plurality of globally distributed satellites are pre-deployed.

14. The system of claim 8, wherein the operations further comprise applying the magnetic field model as an input to a simulation or and input into an application.

15. A computer-implemented method comprising:
receiving, by a computing device, magnetometer measurements from a plurality of globally distributed satellites, wherein the magnetometer measurements from the plurality of globally distributed satellites globally and simultaneously cover magnetic field measurements of an area encompassing the Earth;
generating, by the computing device, a magnetic field model of the Earth based on the receiving the magnetometer measurements;
refining the magnetic field model by grouping the magnetometer measurements into a latitude bin and a longitude bin, taking averages within each of the latitude bin and the longitude bin, applying a convolution calculation to derive spherical harmonic coefficients representing unique wavelength components in one or residual maps, and correcting the magnetic field model from the time series of the spherical harmonic coefficients by filtering out artifacts and other contamination signals to generate a refined magnetic field model; and
storing or outputting, by the computing device, the magnetic field model, the refined magnetic field model, or both.

16. The computer-implemented method of claim 15, further comprising intercalibrating the plurality of globally distributed satellites prior to receiving the magnetometer measurements.

17. The computer-implemented method of claim 15, further comprising applying the magnetic field model as an input to a simulation or and input into an application.

* * * * *